United States Patent
MolavianJazi et al.

(10) Patent No.: US 12,317,327 B2
(45) Date of Patent: May 27, 2025

(54) RADIO FREQUENCY EXPOSURE MITIGATION VIA BEAM SELECTION AND POWER CONTROL FOR RANDOM ACCESS PROCEDURE

(71) Applicant: Samsung Electronics Co., Ltd., Suwon-si (KR)

(72) Inventors: Ebrahim MolavianJazi, San Jose, CA (US); Emad N. Farag, Flanders, NJ (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 17/660,807

(22) Filed: Apr. 26, 2022

(65) Prior Publication Data

US 2022/0377799 A1  Nov. 24, 2022

Related U.S. Application Data

(60) Provisional application No. 63/183,477, filed on May 3, 2021, provisional application No. 63/183,484, filed on May 3, 2021.

(51) Int. Cl.
| | | |
|---|---|---|
| *H04W 74/0833* | (2024.01) | |
| *H04L 5/00* | (2006.01) | |
| *H04W 52/36* | (2009.01) | |

(52) U.S. Cl.
CPC ....... *H04W 74/0833* (2013.01); *H04L 5/0048* (2013.01); *H04W 52/367* (2013.01)

(58) Field of Classification Search
CPC .......... H04W 74/0833; H04W 52/365; H04W 52/367; H04L 5/0048; H04L 5/0053; H04L 5/0073

See application file for complete search history.

(56) References Cited

U.S. PATENT DOCUMENTS

| | | |
|---|---|---|
| 10,708,789 B2 | 7/2020 | Tsai et al. |
| 2018/0279136 A1* | 9/2018 | Tsai ............... H04W 16/28 |

(Continued)

FOREIGN PATENT DOCUMENTS

| | | | |
|---|---|---|---|
| WO | 2020221957 A2 | 11/2020 | |
| WO | WO-2021025439 A1 * | 2/2021 | ........... H04B 17/318 |

(Continued)

OTHER PUBLICATIONS

"5G; NR; Physical channels and modulation (3GPP TS 38.211 version 16.5.0, Release 16)", ETSI TS 138 211 V16.5.0, Apr. 2021, 138 pgs.

(Continued)

*Primary Examiner* — Kevin D Mew

(57) ABSTRACT

Methods and apparatuses for radio frequency exposure mitigation via beam selection for random access procedure. A method for performing a random access (RA) procedure includes receiving information for a set of downlink reference signals (DL RSs). The method further includes determining: a set of DL reference signal received powers (RSRPs) corresponding to the set of DL RSs, a set of spatial filters corresponding to the set of DL RSs, a set of exposure levels corresponding to the set of spatial filters, a first DL RS from the set of DL RSs based on the set of DL RSRPs and the set of exposure levels, and a first spatial filter corresponding to the first DL RS. The method further includes transmitting a physical random access channel (PRACH), a physical uplink shared channel (PUSCH), or a physical uplink control channel (PUCCH) using the first spatial filter.

20 Claims, 16 Drawing Sheets

(56) References Cited

U.S. PATENT DOCUMENTS

| | | | |
|---|---|---|---|
| 2019/0053080 A1 | 2/2019 | Ryu et al. | |
| 2019/0254071 A1* | 8/2019 | Park | H04W 74/006 |
| 2020/0252967 A1 | 8/2020 | Ozturk et al. | |
| 2021/0281334 A1* | 9/2021 | Li | H04B 17/26 |
| 2021/0314931 A1* | 10/2021 | Farag | H04B 7/0617 |
| 2021/0344558 A1* | 11/2021 | Lee | H04L 41/0803 |
| 2021/0345410 A1* | 11/2021 | Zhou | H04W 74/004 |
| 2022/0191940 A1* | 6/2022 | MolavianJazi | H04B 17/318 |
| 2022/0200680 A1* | 6/2022 | Farag | H04W 72/23 |

FOREIGN PATENT DOCUMENTS

| | | | | |
|---|---|---|---|---|
| WO | WO-2021207402 A1 * | 10/2021 | | H04B 7/024 |
| WO | WO-2021207467 A1 * | 10/2021 | | H04L 1/1607 |
| WO | WO-2022133009 A2 * | 6/2022 | | H04L 5/0048 |
| WO | WO-2022235033 A1 * | 11/2022 | | H04B 7/0695 |

OTHER PUBLICATIONS

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

"5G; NR; NR and NG-RAN Overall description; Stage-2 (3GPP TS 38.300 version 16.5.0 Release 16)", ETSI TS 138 300 V16.5.0, Apr. 2021, 153 pages.

"5G; NR; User Equipment (UE) radio transmission and reception; Part 1: Range 1 Standalone (3GPP TS 38.101-1 version 16.7.0 Release 16)", ETSI TS 138 101-1 V16.7.0, May 2021, 452 pages.

"5G; NR; User Equipment (UE) radio transmission and reception; Part 2: Range 2 Standalone (3GPP TS 38.101-2 version 16.7.0 Release 16)", ETSI TS 138 101-2 V16.7.0, Apr. 2021, 184 pages.

"5G; NR; User Equipment (UE) radio transmission and reception; Part 3: Range 1 and Range 2 Interworking operation with other radios (3GPP TS 38.101-3 version 16.7.0 Release 16)", ETSI TS 138 101-3 V16.7.0, Apr. 2021, 532 pages.

"5G; NR; Requirements for support of radio resource management (3GPP TS 38.133 version 16.7.0 Release 16)", ETSI TS 138 133 V16.7.0, Jun. 2021, 2196 pages.

International Search Report and Written Opinion issued Aug. 10, 2022 regarding International Application No. PCT/KR2022/006254, 7 pages.

CATT, 'Discussions on enhancements on multi-beam operation', 3GPP TSG RAN WG1 #104b-e, R1-2102598, Apr. 2021, 16 pages.

Convida Wireless, 'Enhancements on Multi-beam Operation', 3GPP TSG RAN WG1 #104b-e, R1-2103408, Apr. 2021, 8 pages.

Huawei et al., 'Enhancements on multi-beam operation', 3GPP TSG RAN WG1 #104bis-e, R1-2102333, Apr. 2021, 15 pages.

OPPO, 'Enhancements on Multi-Beam Operation', 3GPP TSG RAN WG1 #104b-e, R1-2102378, Apr. 2021, 20 pages.

Extended European Search Report issued Jul. 25, 2024 regarding Application No. 22799076.9, 10 pages.

Qualcomm Incorporated, "Remaining Details on RACH Procedure", 3GPP TSG-RAN WG1 Meeting RAN1 AH 1801, R1-1800851, Jan. 2018, 12 pages.

* cited by examiner

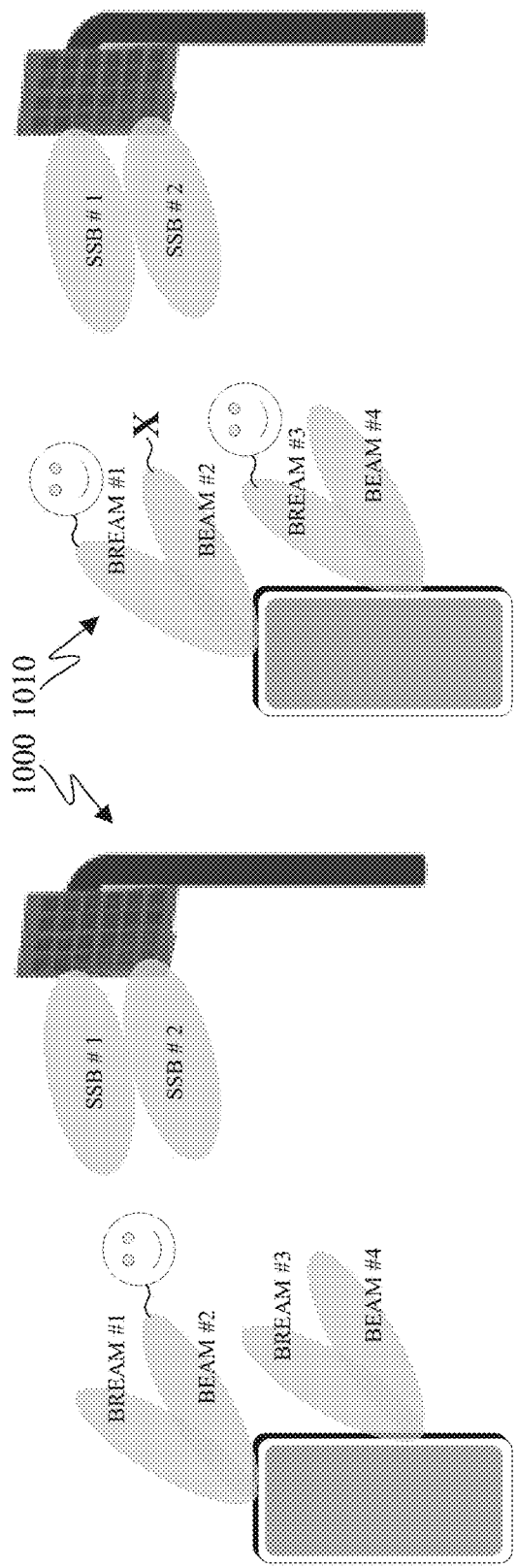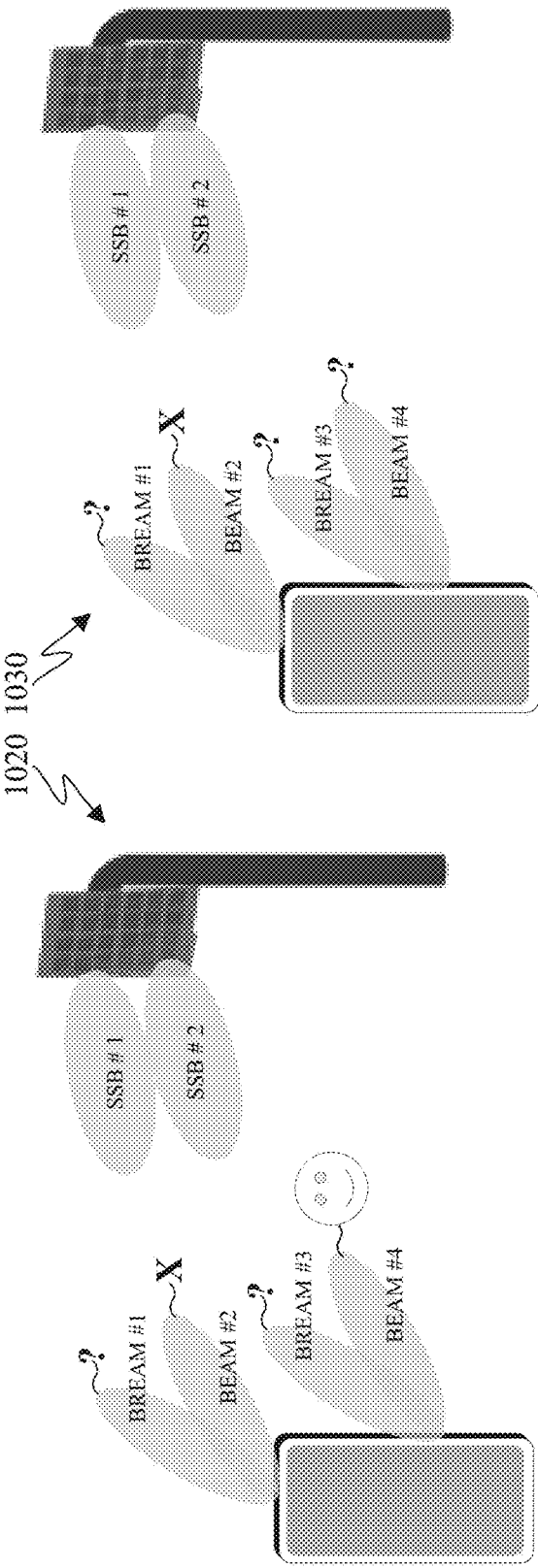
FIG. 10A  FIG. 10B  FIG. 10C  FIG. 10D

RADIO FREQUENCY EXPOSURE MITIGATION VIA BEAM SELECTION AND POWER CONTROL FOR RANDOM ACCESS PROCEDURE

CROSS-REFERENCE TO RELATED APPLICATION AND CLAIM OF PRIORITY

This application claims priority under 35 U.S.C. § 119(e) to U.S. Provisional Patent Application No. 63/183,477 filed on May 3, 2021 and U.S. Provisional Patent Application No. 63/183,484 filed on May 3, 2021. The above-identified provisional patent applications are hereby incorporated by reference in their entirety.

TECHNICAL FIELD

The present disclosure relates generally to wireless communication systems and, more specifically, the present disclosure relates to radio frequency exposure mitigation via beam selection and power control for random access procedure.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to radio frequency exposure mitigation via beam selection and power control for random access procedure.

In one embodiment, a method for performing a random access (RA) procedure is provided. The method includes receiving information for a set of downlink reference signals (DL RSs) and determining: a set of DL reference signal received powers (RSRPs) corresponding to the set of DL RSs, a set of spatial filters corresponding to the set of DL RSs, a set of exposure levels corresponding to the set of spatial filters, a first DL RS from the set of DL RSs based on the set of DL RSRPs and the set of exposure levels, and a first spatial filter corresponding to the first DL RS. The method further includes transmitting a physical random access channel (PRACH), a physical uplink shared channel (PUSCH), or a physical uplink control channel (PUCCH) using the first spatial filter.

In another embodiment, a user equipment (UE) is provided. The UE includes a transceiver configured to receive information for a set of DL RSs and a processor operably coupled to the transceiver. The processor is configured to determine: a set of DL RSRPs corresponding to the set of DL RSs, a set of spatial filters corresponding to the set of DL RSs, a set of exposure levels corresponding to the set of spatial filters, a first DL RS from the set of DL RSs based on the set of DL RSRPs and the set of exposure levels, and a first spatial filter corresponding to the first DL RS. The transceiver is further configured to transmit a PRACH, a PUSCH, or a PUCCH using the first spatial filter.

In yet another embodiment, a base station is provided. The base station includes a transceiver configured to transmit information for: a set of DL RSs, first ROs corresponding to a first DL RS from the set of DL RSs, first sets of PRACH preambles corresponding to the first ROs, and a mapping among the first sets of PRACH preambles and subsets of the set of DL RSs, and receive a PRACH using a PRACH preamble from the first sets of PRACH preambles in an RO from the first ROs. The base station further includes a processor operably coupled to the transceiver. The processor is configured to determine: a set of PRACH preambles, from the first sets of PRACH preambles, that includes the PRACH preamble, a subset of DL RSs, from subsets of the set of DL RSs, that is mapped to the set of PRACH preambles, and a second DL RS from the subset of DL RSs based on the first DL RS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A-10D illustrate example scenarios for beam selection according to embodiments of the present disclosure;

DETAILED DESCRIPTION

Figure 1:
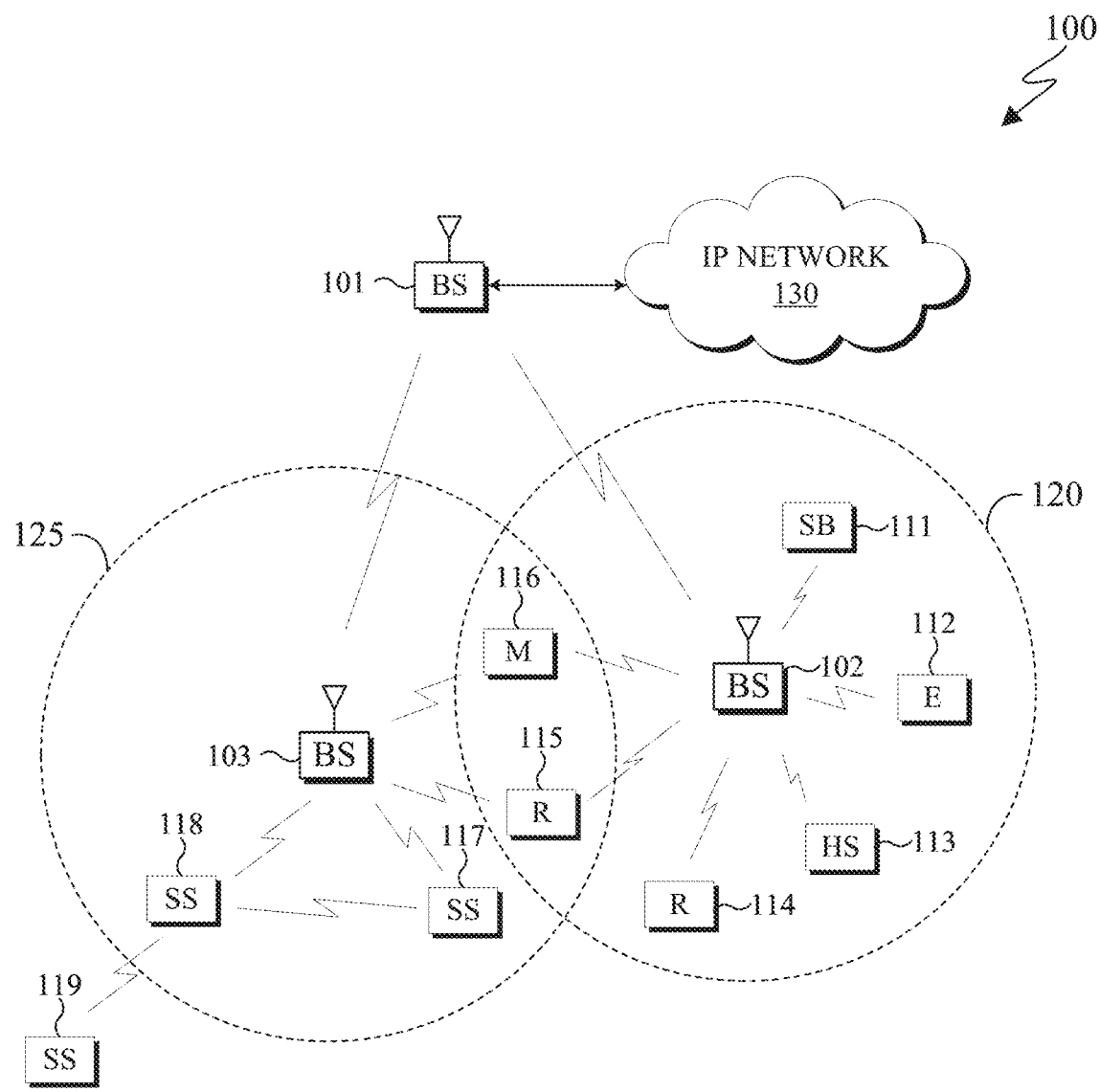
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ("REF1"); 3GPP TS 38.212 Rel-16 v16.5.0, "NR; Multiplexing and channel coding" ("REF2"); 3GPP TS 38.213 Rel-16 v16.5.0, "NR; Physical layer procedures for control" ("REF3"); 3GPP TS 38.214 Rel-16 v16.5.0, "NR; Physical layer procedures for data" ("REF4"); 3GPP TS 38.321 Rel-16 v16.4.0, "NR; Medium Access Control (MAC) protocol specification" ("REF5"); 3GPP TS 38.331 Rel-16 v16.4.1, "NR; Radio Resource Control (RRC) protocol specification" ("REF6"); 3GPP TS 38.300 Rel-16 v16.5.0, "NR; NR and NG-RAN Overall Description; Stage 2" ("REF7"); 3GPP TS 38.101-1 Rel-16 v16.7.0, "NR; User Equipment (UE) radio transmission and reception; Part 1: Range 1 Standalone" ("REF8"); 3GPP TS 38.101-2 Rel-16 v16.7.0, "NR; User Equipment (UE) radio transmission and reception; Part 2: Range 2 Standalone" ("REF9"); 3GPP TS 38.101-3 Rel-16 v16.7.0, "NR; User Equipment (UE) radio transmission and reception; Part 3: Range 1 and Range 2 Interworking operation" ("REF10"); and 3GPP TS 38.133 Rel-16 v16.7.0, "NR; Requirements for support of radio resource management" ("REF11").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macro-cell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
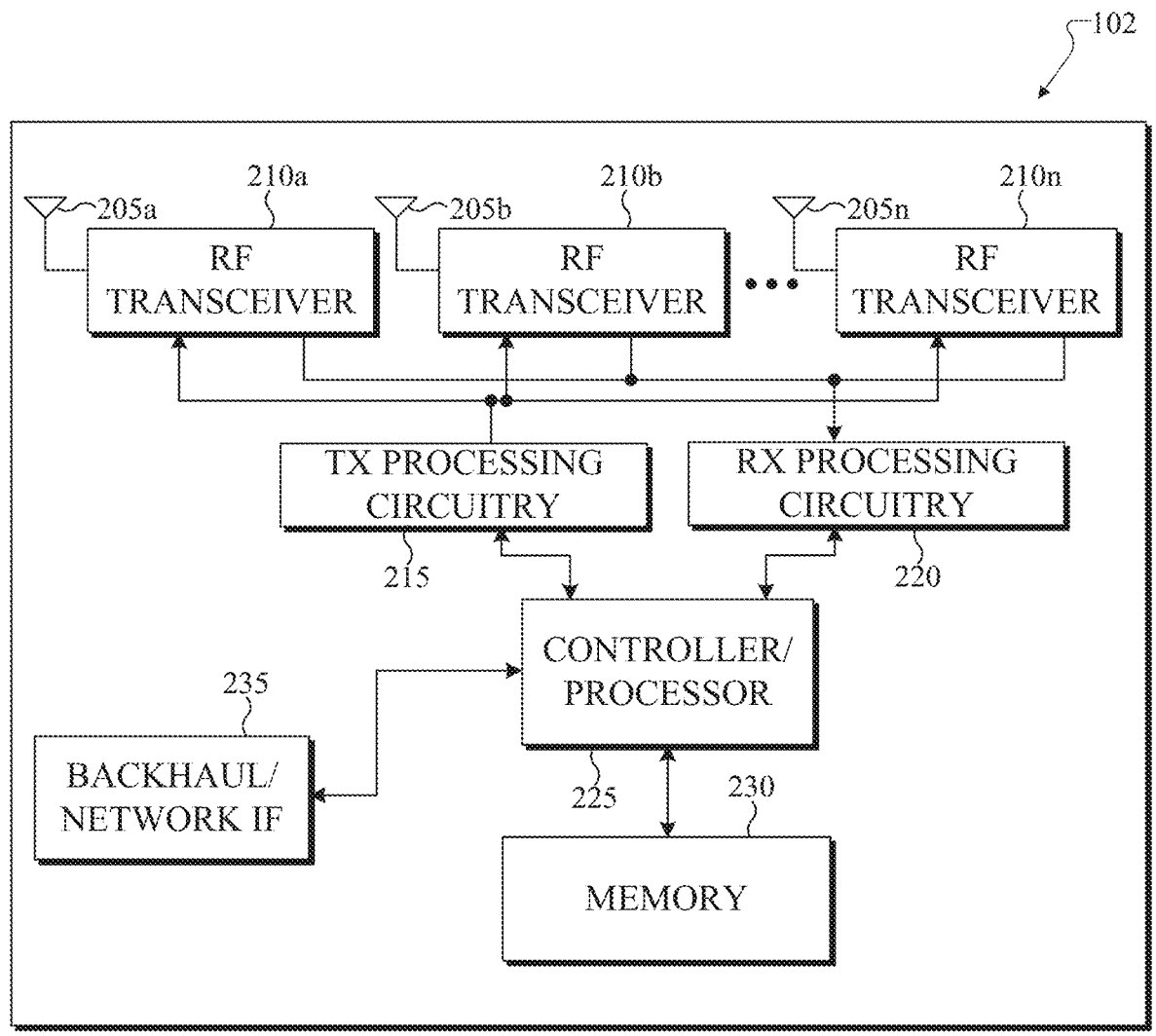
FIG. 2 illustrates an example base station (BS) according to embodiments of the present disclosure.
Figure 3:
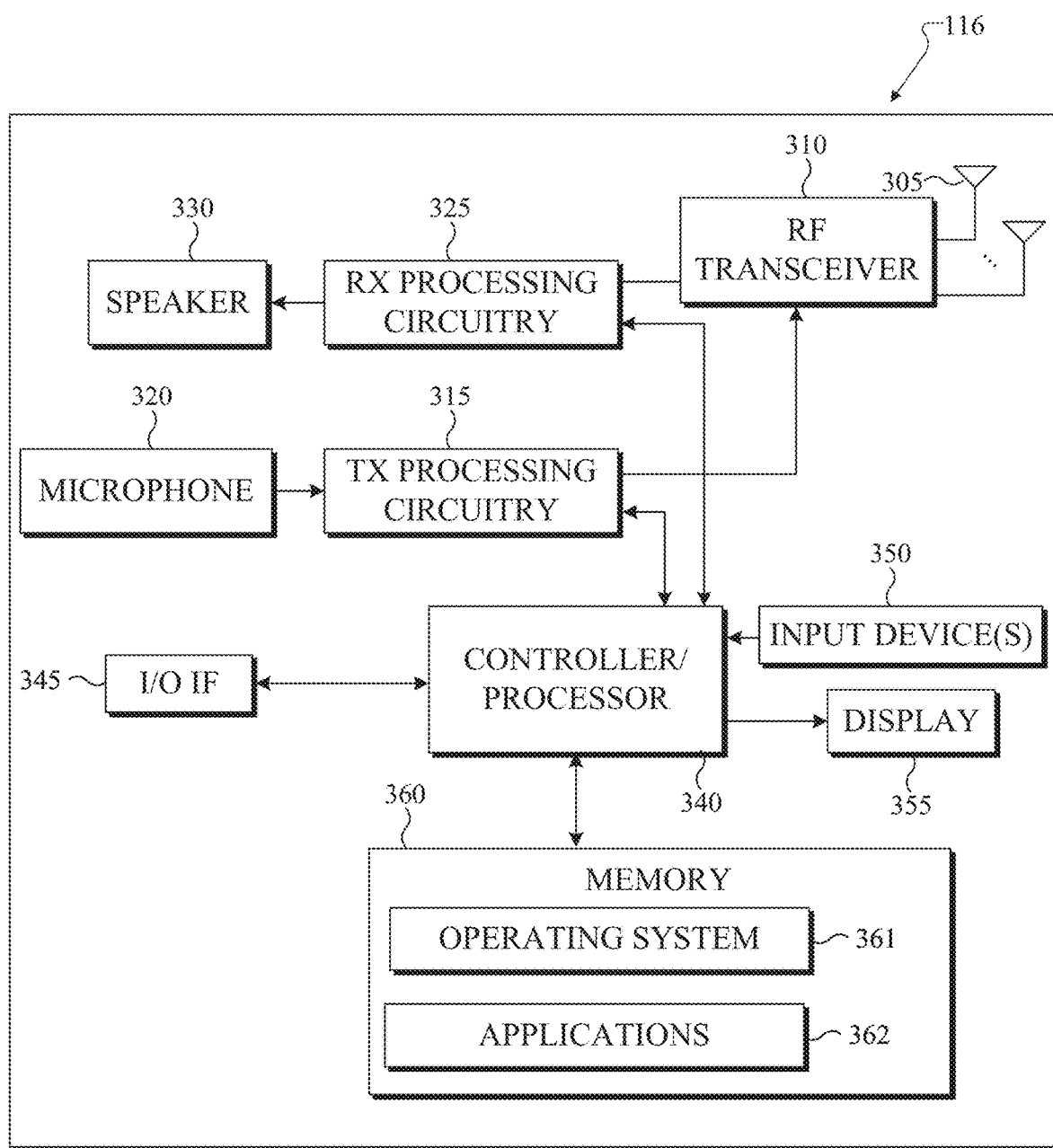
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BS s 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 perform radio frequency exposure mitigation via beam selection for random access procedure. Additionally, as described in more detail below, one or more of the UEs 111-119 include circuitry, circuitry, programming, or a combination thereof for radio frequency exposure mitigation via beam selection for random access procedure. In certain embodiments, and one or more of the BSs 101-103 includes circuitry, programming, or a combination thereof for radio frequency exposure mitigation via beam selection for random access procedure.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support radio frequency exposure mitigation via beam selection for random access procedure. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a RAM, and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
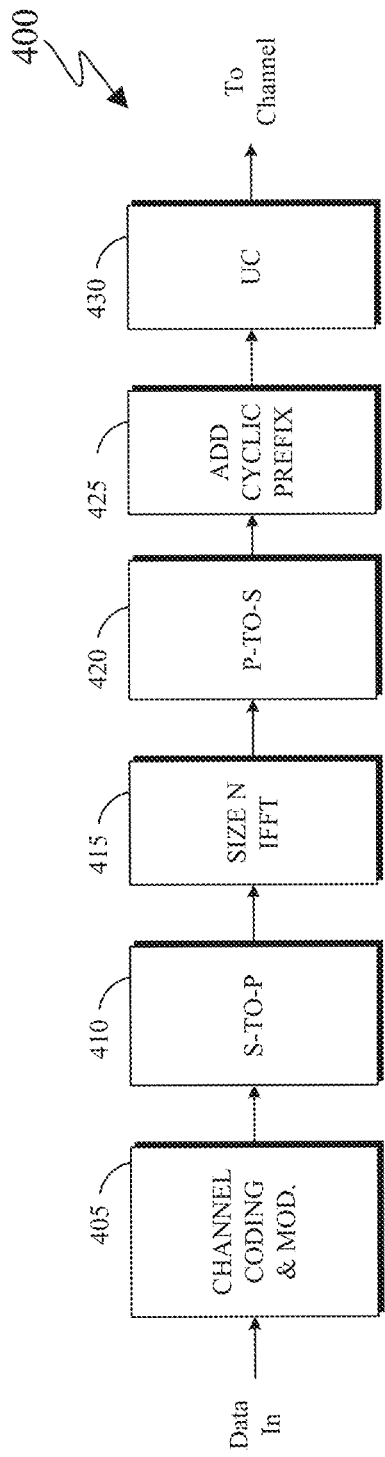
FIGS. 4 and 5 illustrate example wireless transmit and receive paths according to embodiments of the present disclosure.
Figure 5:
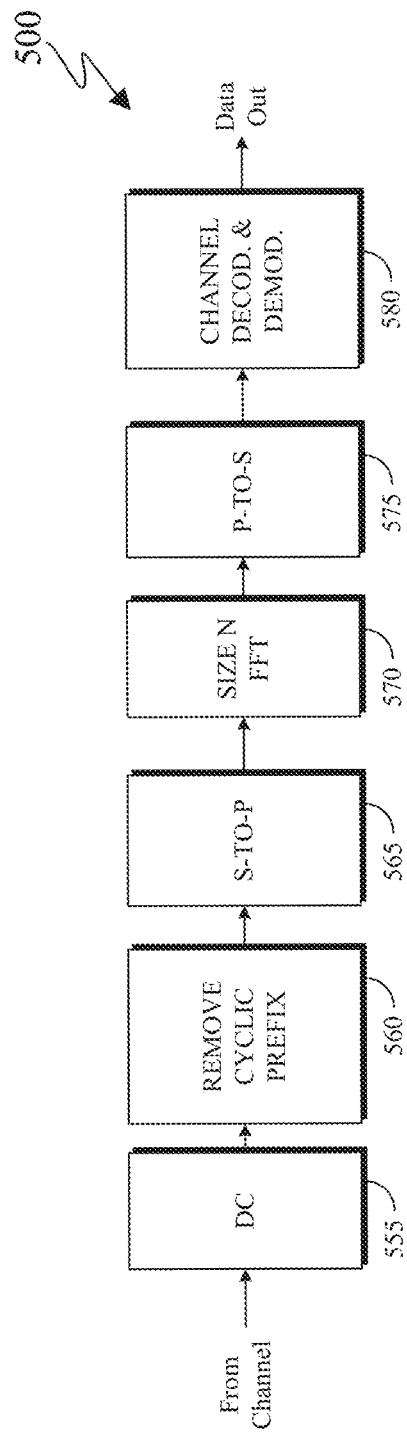

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support radio frequency exposure mitigation via beam selection for random access procedure as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure relate to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure describe enhancements for a random access (RA) procedure by incorporating RF exposure issues such as regulatory limitations due to maximum permissible exposure (MPE) in mm-wave frequency bands, also referred to as frequency range 2 (FR2). Such limitations restrict the UE beamforming operation for uplink (UL) transmissions in directions where regulatory limitations require reduced transmission power, such as towards a human body. While the corresponding downlink (DL) beam may operate with high signal/channel quality such as large reference signal received power (RSRP) or signal to interference and noise ratio (SINR), the UL beam may not be operable due to MPE issues.

In legacy 5G NR systems, MPE limitations can be resolved via UE implementation solutions. For example, when determining a maximum configured transmission power (Pcmax), a UE can apply a regulatory-based power back-off term, referred to as power management maximum power reduction (P-MPR). Later releases of 5G NR consider more effective methods for MPE mitigation. NR Rel-16 supports a new UE reporting mechanism so that the UE can report a P-MPR value that the UE applies to meet the regulatory MPE limitations in FR2. In NR Rel-17, for a connected mode UE, mechanisms are being developed so that the UE can report an existing or anticipated MPE event, and initiate a fast UL panel selection procedure, so that the UE can operate with an alternative UL panel without MPE issues.

However, embodiments of the present disclosure take into consideration that existing methods for MPE mitigation are not applicable to a RA procedure by a UE, especially for initial access. Before RRC connection, the UE may not be configured reference signals (RSs) for panel association/selection, and it may not be possible for the UE to report to a serving gNB an existing or anticipated MPE event that can serve as a request for the gNB to resolve the MPE issues.

Consequently, enhancements to the UE operation are needed during an initial RA procedure to mitigate the MPE effects. Enhanced beam management is important so that the UE can use alternative beams, whenever possible, that satisfy the MPE requirements. For example, the UE should not be mandated to select a synchronized signal (SS) physical broadcast channel (PBCH) (SS/PBCH) block (SSB) (it is noted that SS/PBCH and SSB are used interchangeably) for the RA procedure solely due to a large respective RSRP without considering an MPE impact for the corresponding spatial filter of the UL transmissions. Similar, selection of an uplink carrier (normal uplink (NUL) or supplementary uplink (SUL)) or selection of RA type (2-step RA or 4-step RA) should not be only based on an RSRP threshold since UL coverage for the UE is not determined only based on downlink RSRP, but is also determined based on the uplink transmission power that can be limited in the event of an MPE issue. Therefore, in case of MPE limitations, a UE Rx beam/panel with high RSRP for SSB reception can be different from a UE Tx beam/panel without MPE issues that is suitable for physical random access channel (PRACH) transmission.

Therefore, embodiments of the present disclosure take into consideration that there is a need to determine beam/SSB selection mechanisms for a RA procedure by a UE that consider MPE limitations.

Embodiments of the present disclosure also take into consideration that there is need to define procedures for a UE to consider MPE issues when determining an uplink carrier (NUL or SUL) or when selecting a RA type (2-step RA or 4-step RA) for a RA procedure.

Additionally, enhancements to the UE operation are needed during an initial RA procedure to mitigate the MPE effects. In case of MPE limitations, a UE Rx beam/panel with high RSRP for SSB reception can be different from a UE Tx beam/panel without MPE issues that is suitable for PRACH transmission. However, such UE Tx beam/panel may experience lower RSRP and a corresponding reception power may not be as large. It would be beneficial to achieve a PRACH reception power at the gNB that is almost similar to the one that would be achieved if the UE uses a strong(est) beam/panel with MPE to transmit the PRACH. To achieve that objective, a PRACH power control formula needs to distinguish different UE beams/panels, the corresponding signal quality such as RSRP or SINR, and the corresponding MPE requirements.

Therefore, embodiments of the present disclosure take into consideration that there is a need to enhance PRACH power control, so that a UE can compensate for a reduced transmission power when using an alternative beam/panel without MPE issues that is associated with a reference signal with lower RSRP.

Accordingly, the present disclosure provides methods and apparatus for MPE mitigation for a RA procedure. Various enhancements are considered for beam selection, uplink carrier selection, and power control operation by a UE that experiences MPE limitations. The enhancements enable the UE to satisfy the MPE requirements while increasing coverage for the random access procedure.

This disclosure describes methods for beam selection by a UE (such as the UE 116) when the UE experiences MPE issues. Various approaches are described for SSB selection during a random access procedure and the UE jointly considers the RSRP measurements, such as beam-/panel-specific RSRP, and the MPE states/levels corresponding to different UE panels. The approaches include methods where the UE Tx beam/panel corresponds to a same UE Rx beam/panel and methods where the UE Tx beam/panel is separate from the UE Rx beam/panel. The methods described herein apply to beam management for Msg1/A PRACH, Msg3/A physical uplink shared channel (PUSCH), physical uplink control channel (PUCCH) in response to the contention resolution message in Msg4/B, and any later UL transmissions before receiving dedicated higher layer configuration.

It is noted that the methods extend to selecting an uplink carrier (NUL or SUL) for a UE that performs a random access procedure and is also impacted by MPE. The methods also extend to select a RA type (2-step RA or 4-step RA) for a UE that is impacted by MPE.

This disclosure also describes power control mechanisms to mitigate MPE issues. The mechanisms consider beam-/panel-specific configuration, selection of power control parameters, such as a pathloss value, PRACH power ramping step and counter, and so on so that both RSRP levels and MPE levels for each UE Tx beam/panel are considered. For example, the UE can maintain multiple pathloss values corresponding to multiple UE Tx beams/panels, even for a single SSB. In addition, the UE can operate with multiple PRACH power ramping step sizes or multiple power ramping counters to handle different groups of UE Tx beams/panels, such as ones with or without MPE issues. The power control enhancements described herein also apply to Msg1/A PRACH, Msg3/A PUSCH, PUCCH in response to Msg4/B, and any later UL transmissions before receiving dedicated higher layer configuration. For example, the UE can determine a pathloss reference for a Msg3/A PUSCH transmission to be a second SSB (or a non-zero power (NZP) channel state information (CSI)-RS) different from a first SSB that the UE used to obtain the Master Information Block (MIB) or to determine a RO for a corresponding Msg1/A PRACH transmission.

One motivation for a random access procedure with MPE handling is to increase coverage in frequency bands above 6 GHz, referred to as FR2. In general, the embodiments apply to any deployments, verticals, or scenarios including for operation in frequency bands below 6 GHz, for enhanced mobile broadband (eMBB), ultrareliable and low latency communication (URLLC) and industrial internet of things (IIoT) and eXtended reality (XR), massive machine type communication (mMTC) and internet of things (IoT), for sidelink/vehicle to anything (V2X) communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Various Embodiments of the disclosure for supporting MPE mitigation for the random access procedure are summarized below.

For example, an embodiment, described in greater detail below, denoted as E-0, describes MPE determination for PRACH. For example, a UE (such as the UE 116) can determine an MPE issue or event for an UL transmission such as PRACH based on an MPE state or an MPE level, wherein the RSRP and the MPE state/level can be specific to a UE Tx beam-/panel. The UE can use various methods to determine an MPE issue for an UL transmission such as PRACH, such as an applicable P-MPR, an actual or virtual power headroom (PH) such as a PRACH PH, or a modified RSRP or SINR.

For another example, an embodiment, described in greater detail below, denoted as E-1, describes beam selection for transmissions associated with a random access procedure in presence of MPE. For example, a UE (such as the UE 116) can determine a DL RS, such as an SSB or a CSI-RS, associated with transmissions of a random access procedure, such as a PRACH transmission, based on an RSRP for reception of the DL RS and an MPE state/level for the transmissions associated with the DL RS, wherein the RSRP and the MPE state/level can be specific to a UE Tx beam-/panel.

For another example, an embodiment, described in greater detail below, denoted as E-1-0, describes beam management for other UL transmissions during random access in presence of MPE. For example, in the presence of MPE issues, a UE (such as the UE 116) can determine a spatial transmission filter for other uplink transmissions during initial/random access, after Msg1/A PRACH, based on a DL RS associated with the corresponding PRACH transmission, a beam-/panel-specific RSRP for reception of the DL RS and an MPE state/level associated with the UE Tx beam(s)/panel(s) that the UE can use for the UL transmission.

For another example, an embodiment, described in greater detail below, denoted as E-1-1, describes an association of DL and UL transmissions with different SSBs in presence of MPE. For example, a UE (such as the UE 116) can indicate a preference for association of downlink receptions and uplink transmissions with different DL RSs. For example, the UE can indicate a preference for association of downlink receptions to a first SSB, and association of uplink transmission to a second SSB, wherein the first SSB is different from the second SSB.

For another example, an embodiment, described in greater detail below, denoted as E-1-2, describes uplink carrier (NUL/SUL) selection for the RA procedure in presence of MPE. For example, when a UE (such as the UE 116) is configured with both a normal uplink (NUL) carrier and a supplementary uplink (SUL) carrier for a cell, the UE determines an uplink carrier, namely NUL or SUL, for a random access procedure based on a beam-/panel-specific RSRP and an MPE state/level for the corresponding UE Tx beam/panel.

For another example, an embodiment, described in greater detail below, denoted as E-1-3, describes an MPE reporting and mitigation during initial/random access procedure. For example, a UE (such as the UE 116) can indicate an existing or anticipated MPE issue for an uplink transmission during initial/random access procedure by MPE reporting to the gNB and selecting an alternative Tx beam/panel with low/no MPE issues based on gNB response. An MPE reporting and corresponding gNB response during initial/random access procedure can be beneficial, for example, to inform the gNB of a necessary adjustment or update to spatial transmission/reception settings when the UE operates with a default beam, or for future configuration and scheduling of the UE in RRC_CONNECTED state.

For another example, an embodiment, described in greater detail below, denoted as E-1-4, describes selecting random access type (2-step or 4-step) in presence of MPE. For example, a UE (such as the UE 116) can determine a random access type between 4-step RA, also referred to as Type-1 RA, and 2-step RA, also referred to as Type-2 RA, based on both a signal quality for a DL RS associated with the RA procedure such as SS reference signal received power (SS-RSRP), as well as a MPE state/level corresponding to a Tx beam/panel that the UE uses for a PRACH transmission corresponding to the RA procedure.

For another example, an embodiment, described in greater detail below, denoted as E-2, describes enhancements to a PRACH transmission triggered by physical downlink control channel (PDCCH)-order in presence of MPE. For example, for a UE (such as the UE 116) in RRC_CONNECTED state, when the UE receives a PDCCH order that triggers a PRACH transmission and the PDCCH order indicates an SSB (or CSI-RS) having corresponding UE Tx beam(s) with MPE issues, or indicates a UE Tx beam/panel with MPE issues, the UE can apply a number of methods to mitigate the PRACH MPE issues by temporarily or completely stopping the random access procedure or by selecting an alternative SSB or Tx beam without MPE issues and reporting the selected SSB/beam.

For another example, an embodiment, described in greater detail below, denoted as E-3, describes enhancements to power control for a random access procedure in presence of MPE. For example, for a UE (such as the UE 116) can determine a transmission power for various channels prior to RRC connections, such as for a PRACH or a Msg3 PUSCH transmission during a random access procedure, based on power control parameters that are specific to a UE Tx beam/panel (such as UE Tx beam-/panel-specific PRACH preamble power ramping, pathloss value, additional power offset value, and so on), or MPE state/level for the transmissions using a certain UE Tx beam/panel.

For another example, an embodiment, described in greater detail below, denoted as E-3-1, describes enhancements to pathloss determination in presence of MPE. For example, for a UE (such as the UE 116) maintain and operate with multiple values/processes for each power control (PC) parameter, such as multiple pathloss values, corresponding to multiple UE Tx beams/panels, even when the PC parameter (for example, the pathloss value) corresponds to a same DL RS such as a same SSB or a same CSI-RS.

For another example, an embodiment, described in greater detail below, denoted as E-3-2, describes enhancements to PRACH preamble power in presence of MPE. A PRACH preamble power ramping step size or power ramping counter/accumulation can depend on the MPE state/level or a beam-/panel-specific RSRP corresponding to a UE Tx beam/panel used for the PRACH transmission.

For another example, an embodiment, described in greater detail below, denoted as E-3-3, describes additional power offset for PRACH in presence of MPE. For example, for a UE (such as the UE 116) apply a power offset to the PRACH power control formula to compensate for a reduced RSRP when using a UE Tx beam/panel without MPE issues.

For another example, an embodiment, described in greater detail below, denoted as E-3-4, describes multiple power control processes in presence of MPE. For example, for a UE (such as the UE 116) can operate with two or multiple power control processes, for example for a PRACH or for a Msg3 transmission, wherein each process corresponds to a group of UE Tx beams/panels. The UE transmits a first PRACH or a first Msg3 using a first Tx beam with a first transmission power determined from a corresponding first power control process, and transmits a second PRACH or a second Msg3 using a second Tx beam with a second transmission power determined from a corresponding second power control process. The power control processes can be independent.

For another example, an embodiment, described in greater detail below, denoted as E-3-5, describes RS-specific (e.g., SSB-specific) configuration of PRACH preamble target power. For example, for a UE (such as the UE 116) can be configured with multiple values for PRACH preamble received target power as provided by a higher layer parameter preambleReceivedTargetPower, corresponding to multiple SSBs associated with PRACH transmission.

For yet another example, an embodiment, described in greater detail below, denoted as E-3-6, describes power control enhancements for other UL transmissions during random access procedure in presence of MPE. Various power control enhancement methods described in the previous embodiments in the context of PRACH power control can also apply for MPE mitigation for other UL and SL signals and channels, including later UL transmission after PRACH until receiving dedicated higher layer configuration, and even after RRC connection. For example, maintaining multiple UE Tx beam-/panel-specific pathloss values for a same DL RS can be used for PUSCH/PUCCH/sounding reference signal (SRS) in a similar manner. Also, application of power offset values to compensate for reduced RSRP of alternative beams without MPE issues can be used for PUSCH/PUCCH/SRS.

The present disclosure enables an improved operation of 3GPP 5G NR system by enhanced MPE mitigation for the random access procedure to achieve increased coverage in frequency bands above 6 GHz. The embodiments are generic and can also apply to various frequency bands in different frequency ranges (FR) such as FR1, FR2, FR3, and FR4, e.g., low frequency bands such as below 1 GHz, mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation with multi-TRP/beam/panel, operation in NR-U, NTN, aerial systems such as drones, operation with RedCap UEs, private or NPN, and so on.

It is noted that throughout the present disclosure, the terms "SSB" and "SS/PBCH block" are used interchangeably.

Additionally, throughout the present disclosure, the term "configuration" or "higher layer configuration" and variations thereof (such as "configured" and so on) are used to refer to one or more of: a system information signaling such as by a MIB or a system information block (SIB) (such as SIB1), a common or cell-specific higher layer/RRC signaling, or a dedicated or UE-specific or bandwidth part (BWP)-specific higher layer/RRC signaling.

Throughout the present disclosure, the term signal quality is used to refer to e.g. RSRP, reference signal received quality (RSRQ), received signal strength indicator (RSSI), signal to noise (SNR) or SINR, with or without filtering such as L1 or L3 filtering, of a channel or a signal such as a RS including SSB, CSI-RS, or SRS.

SS-RSRP is defined as the linear average over the power contributions (in [W]) of the resource elements that carry secondary synchronization signals. The measurement time resource(s) for SS-RSRP are confined within SS/PBCH Block Measurement Time Configuration (SMTC) window duration. If SS-RSRP is used for L1-RSRP as configured by reporting configurations as defined in REF4, the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal can be measured by linear averaging over the power contributions of the resource elements that carry corresponding reference signals taking into account power scaling for the reference signals as defined in REF3. If SS-RSRP is not used for L1-RSRP, the additional use of CSI reference signals for SS-RSRP determination is not applicable.

SS-RSRP can be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP can be the antenna connector of the UE. For frequency range 2, SS-RSRP can be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches.

CSI-RSRP, is defined as the linear average over the power contributions (in [W]) of the resource elements of the antenna port(s) that carry CSI reference signals configured for RSRP measurements within the considered measurement frequency bandwidth in the configured CSI-RS occasions.

For CSI-RSRP determination CSI reference signals transmitted on antenna port 3000 according to REF1 can be used. If CSI-RSRP is used for L1-RSRP, CSI reference signals transmitted on antenna ports 3000, 3001 can be used for CSI-RSRP determination.

For intra-frequency CSI-RSRP measurements, if the measurement gap is not configured, UE is not expected to measure the CSI-RS resource(s) outside of the active downlink bandwidth part.

For frequency range 1, the reference point for the CSI-RSRP can be the antenna connector of the UE. For frequency range 2, CSI-RSRP can be measured based on the combined signal from antenna elements corresponding to a given receiver branch. For frequency range 1 and 2, if receiver diversity is in use by the UE, the reported CSI-RSRP value shall not be lower than the corresponding CSI-RSRP of any of the individual receiver branches.

The number of resource elements within the considered measurement frequency bandwidth and within the measurement period that are used by the UE to determine CSI-RSRP is left up to the UE implementation with the limitation that corresponding measurement accuracy requirements have to be fulfilled. The power per resource element is determined from the energy received during the useful part of the symbol, excluding the cyclic prefix (CP).

The term Xn interface refers to a network interface between NG-RAN nodes. F1 interface refers to a network interface between a gNB central unit (CU) and a gNB distributed unite (DU).

An antenna port is defined such that the channel over which a symbol on the antenna port is conveyed can be inferred from the channel over which another symbol on the same antenna port is conveyed.

For demodulation (DM)-RS associated with a physical downlink shared channel (PDSCH), the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports can be said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE (such as the UE 116) may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DM-RS ports associated with a PDSCH are quasi co-located (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with downlink control information (DCI) intended for the UE and the given serving cell, where M depends on the UE capability maxNumberConfiguredT-CIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info.

For example, a quasi co-location type of 'QCL-TypeA' can correspond to {Doppler shift, Doppler spread, average delay, delay spread}. For another example, a quasi co-location type of 'QCL-TypeB' can correspond to {Doppler shift, Doppler spread}. For another example, a quasi co-location type of 'QCL-TypeC' can correspond to {Doppler shift, average delay}. For yet another example, a quasi co-location type of 'QCL-TypeD' can correspond to 'QCL-TypeD': {Spatial Rx parameter}.

In certain embodiments, a UE (such as the UE 116) receives a MAC-CE activation command to map up to N, e.g., N=8 TCI states to the codepoints of the DCI field 'Transmission Configuration Indication'. When the hybrid automatic repeat request (HARM)-acknowledgement (ACK) information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$. Here, $N_{slot}^{subframe,\mu}$ is a number of slot per subframe for subcarrier spacing (SCS) configuration μ.

A gNB (such as the BS 102) can transmit multiple SSBs within a cell bandwidth or within the frequency span of a carrier. The physical cell identifications (PCIs) of SSBs transmitted in different frequency locations can have different PCIs. When an SSB is associated with a SIB such as an Remaining Minimum SI (RMSI), the SSB is referred to as a Cell-Defining SSB (CD-SSB). A primary cell (PCell) is always associated to a CD-SSB located on the synchronization raster. From a UE perspective, each serving cell is associated with at most a single SSB.

For a UE in RRC_CONNECTED state, the BWPs configured to the UE by a serving cell may overlap in frequency with BWPs configured to other UEs by other cells within a carrier.

CORESET #0 refers to a control resource set used for PDCCH transmission for at least SIB1 scheduling. CORESET #0 can be configured either by the MIB or by UE-dedicated RRC signaling.

System Information (SI) consists of a MIB and a number of SIBs. Here, minimum SI includes information required for initial access and information for acquiring any other SI. Minimum SI consists of MIB and a first SIB (SIB1). It is noted that MIB contains cell barred status information and essential physical layer information of the cell required to receive further system information, e.g. CORESET #0 configuration. MIB is periodically broadcast on BCH. Additionally, SIB1 defines the scheduling of other system information blocks and contains information required for initial access. SIB1 is also referred to as RMSI and is periodically broadcasted on DL-SCH or transmitted in a UE-dedicated manner on DL-SCH to a UE in RRC_CONNECTED state.

Other SIBs can either be periodically broadcasted on DL-shared channel (SCH), broadcasted on-demand on DL-SCH (i.e., upon request from UEs in RRC_IDLE, RRC_INACTIVE, or RRC_CONNECTED), or provided in a dedicated manner on DL-SCH to a UE in RRC_CONNECTED state (i.e., upon request, if configured by the network, from UEs in RRC_CONNECTED or when the UE has an active BWP with no common search space configured).

For a cell/frequency that is considered for camping by the UE, the UE is not required to acquire the contents of MIB/SIB1 of that cell/frequency from another cell/frequency layer. This does not preclude the case that the UE applies stored SI from previously visited cell(s).

If the UE cannot determine the full contents of the MIB/SIB1 of a cell by receiving from that cell, the UE shall consider that cell as barred.

In case of bandwidth adaptation and BWP operation, the UE only acquires SI on the active BWP. An initial BWP can be for example 24, 48, or 96 RBs in the frequency domain.

The MIB is mapped on broadcast control channel the (BCCH) and carried on BCH while all other SI messages are mapped on the BCCH, where they are dynamically carried on DL-SCH.

For a UE to be allowed to camp on a cell, the UE needs to have acquired the MIB/SIB1 from that cell. There may be cells in the system that do not broadcast MIB/SIB1 and therefore a UE cannot camp on such cells.

A dual active protocol stack (DAPS) handover refers to a handover procedure that maintains the source gNB connection after reception of RRC message for handover and until releasing the source cell after successful random access to the target gNB.

A MAC entity is defined per cell group, one for the MCG and one for the SCG. Two MAC entities can be considered for a UE when the UE is configured with DAPS handover: one for the source cell (source MAC entity) and one for the target cell (target MAC entity).

A UE has at most one ongoing Random Access procedure at a given time in a MAC entity. It is up to UE implementation whether to continue with an ongoing procedure or start a new procedure (e.g., for SI request). PRACH initiation on a PCell can be by RRC (e.g., for SI request), MAC entity, or PDCCH order. PRACH initiation on a secondary cell (SCell) can by a PDCCH order.

A random access procedure (for PCell) can be triggered by a number of events such as the following: (i) Initial access from RRC_IDLE to establish RRC connection→contention-based random access (CBRA); (ii) RRC Connection Re-establishment procedure (after radio link failure (RLF))→CBRA; (iii) Transition from RRC_INACTIVE to RRC_CONNECTED→CBRA (iv) Request by RRC upon synchronous reconfiguration (e.g. handover)→CBRA or contention-free random access (CFRA); (v) Request for other (on-demand) system information (OSI)→CBRA or CFRA; (vi) DL data arrival during RRC_CONNECTED when UL synchronisation status is "non-synchronised" i.e., Out-of-Sync→CBRA or CFRA; (vii) UL data arrival during RRC_CONNECTED when UL synchronisation status is "non-synchronised" i.e., Out-of-Sync→CBRA; (viii) To establish time alignment for a secondary TAG→CBRA or CFRA; (ix) Scheduling request "SR" issues, such as UL data arrival during RRC_CONNECTED when there are no PUCCH resources for SR available, or failure of PUCCH-based SR→CBRA; (x) Link recovery procedure—also known as beam failure recovery (BFR)→CBRA or CFRA; and (xi) Consistent UL Listen before-talk (LBT) failure on special cell (SpCell).

For PRACH on a SCell, some of the above triggers may not apply. For example, a PRACH trigger for SCell can include Out-of-sync and BFR.

Two types of random access procedure are supported. A first type, denoted as 4-step RA type with MSG1 and a second type, denoted as 2-step RA type with MSGA. Both types of RA procedure support CBRA and CFRA.

There can be a number of cases for selection of a RA procedure type (4-step RA or 2-step RA). For example, a UE can select a 2-step RA when only 2-step RA resources are provided, or when both 2-step and 4-step RA resources are provided and a RSRP that a UE measures is larger than a threshold, or when a PRACH transmission is triggered by reconfiguration with sync (for example, for handover purposes) and CFRA resources for a 2-step RA procedure are provided. Otherwise, the UE can select a 4-step RA procedure including when a PRACH transmission is triggered by PDCCH order, or by RRC for SI request with explicit RACH resources, or by BFR with explicit CFRA resources for 4-step RA procedure, or by reconfiguration with sync (e.g., handover) with explicit CFRA resources for 4-step RA procedure.

For example, when CFRA resources are not configured, a UE uses an RSRP threshold to select between 2-step RA type and 4-step RA type. In another example, when CFRA resources for 4-step RA type are configured, the UE performs random access with 4-step RA type. In yet another example, when CFRA resources for 2-step RA type are configured, the UE performs random access with 2-step RA type. In a further example, CFRA with 2-step RA type is only supported for handover. In one example, the network does not configure CFRA resources for 4-step and 2-step RA types at the same time for a bandwidth part (BWP).

The UE selects the RA procedure type at the initiation of the RA procedure based on network configuration. For example, when CFRA resources are not configured, the UE uses an RSRP threshold to select between 2-step RA type and 4-step RA type, depending on whether (or not) an RSRP measurement is larger than the RSRP threshold, respectively. For another example, when CFRA resources for 4-step RA type are configured, the UE performs random access with 4-step RA type. For yet another example, when CFRA resources for 2-step RA type are configured, the UE performs random access with 2-step RA type.

In certain embodiments, msgA-RSRP-Threshold is an RSRP threshold for selection between 2-step RA type and 4-step RA type when both 2-step and 4-step RA type Random Access Resources are configured in the UL BWP. Syntax (1), below, describes a random access procedure.

Syntax (1)
1> if the Random Access procedure is initiated by PDCCH order and if the ra-PreambleIndex explicitly provided by PDCCH is not 0b000000; or
1> if the Random Access procedure was initiated for SI request (as specified in REF6) and the Random Access Resources for SI request have been explicitly provided by RRC; or
1> if the Random Access procedure was initiated for SpCell beam failure recovery (as specified in REF5) and if the contention-free Random Access Resources for beam failure recovery request for 4-step RA type have been explicitly provided by RRC for the BWP selected for Random Access procedure; or
1> if the Random Access procedure was initiated for reconfiguration with sync and if the contention-free Random Access Resources for 4-step RA type have been explicitly provided in rach-ConfigDedicated for the BWP selected for Random Access procedure:
2> set the RA_TYPE to 4-stepRA.
1> else if the BWP selected for Random Access procedure is configured with both 2-step and 4-step RA type Random Access Resources and the RSRP of the downlink pathloss reference is above msgA-RSRP-Threshold; or
1> if the BWP selected for Random Access procedure is only configured with 2-step RA type Random Access resources (i.e. no 4-step RACH RA type resources configured); or
1> if the Random Access procedure was initiated for reconfiguration with sync and if the contention-free Random Access Resources for 2-step RA type have been explicitly provided in rach-ConfigDedicated for the BWP selected for Random Access procedure:
2> set the RA_TYPE to 2-stepRA.
1> else:
2> set the RA_TYPE to 4-stepRA.

The network does not configure CFRA resources for 4-step and 2-step RA types at the same time for a BWP. CFRA with 2-step RA type is only supported for handover.

Msg1 refers to PRACH preamble transmission of the RA procedure for 4-step RA type. MsgA refers to PRACH preamble and PUSCH transmissions of the RA procedure for 2-step RA type.

Msg3 refers to first scheduled transmission of the RA procedure. MsgB refers to response to MsgA in the 2-step RA procedure. MsgB may consist of response(s) for contention resolution, fallback indication(s), and backoff indication.

The MSG1 of the 4-step RA type includes a preamble on PRACH. After MSG1 transmission, the UE (such as the UE 116) monitors PDCCH for scheduling of a random access response (RAR) reception within a configured window. For CFRA, the UE is assigned by the network a dedicated preamble for MSG1 transmission and, upon receiving RAR from the network, the UE ends the RA procedure. For CBRA, upon RAR reception, the UE transmits a MSG3 PUSCH that is scheduled by an UL grant in the RAR response and monitors PDCCH for scheduling of a MSG4 PDSCH reception that provides contention resolution (can be a first PDSCH reception or a later PDSCH reception after MSG3 PUSCH transmission). If contention resolution is not successful after MSG3 (re)transmission(s), the UE goes back to MSG1 transmission and repeats the RA procedure.

The MSGA of the 2-step RA type includes a preamble on PRACH and a payload on PUSCH. After MSGA transmission, the UE monitors PDCCH for scheduling a PDSCH reception providing a RAR within a configured window. For CFRA, dedicated preamble and PUSCH resource are configured for MSGA transmission and, upon receiving a RAR from the network, the UE ends the RA procedure. For CBRA, if contention resolution is successful upon receiving the RAR, the UE ends the RA procedure; while if fallback indication is received in MSGB, the UE transmits a MSG3 PUSCH using the UL grant in the fallback indication and monitors PDCCH for scheduling of PDSCH receptions for contention resolution. If contention resolution is not successful after MSG3 (re)transmission(s), the UE goes back to MSGA transmission.

In certain embodiments, if the UE does not complete a RA procedure with 2-step RA type after a number of MSGA transmissions, the UE can be configured to switch to CBRA with 4-step RA type.

For random access on a cell configured with a SUL carrier, the network can indicate which carrier to use (UL or SUL). Otherwise, the UE selects the SUL carrier when the measured RSRP is smaller than a broadcast RSRP threshold. The UE performs carrier selection before selecting between a 2-step and a 4-step RA type. The RSRP threshold for selecting between a 2-step and a 4-step RA type can be configured separately for UL and SUL carriers. The UE performs all transmissions of a RA procedure on the selected carrier. In one example, the UE can perform some of the RA steps on a different UL carrier, based on gNB configuration or indication.

In certain embodiments, when a UE (such as the UE 116) is configured with CA operation, the UE performs a 2-step RA type only on the PCell while a PDSCH reception for contention resolution can be cross-scheduled on a SCell by the PCell.

In certain embodiments, when a UE (such as the UE 116) is configured for CA operation and for a 4-step RA type, the UE always performs the first three steps of CBRA on the PCell while PDSCH reception for contention resolution (step 4) can be cross-scheduled by the PCell. For a CFRA on PCell, the UE performs all RA steps on the PCell. CFRA on SCell can (only) be initiated by the gNB to establish timing advance for a secondary TAG; the gNB initiates the CFRA with a PDCCH order (step 0) on a scheduling cell of an activated SCell of the secondary TAG, the UE transmits a PRACH (step 1) on the SCell indicated by the PDCCH order, and receives a PDSCH with RAR (step 2) on the PCell. In one example, for CFRA on PCell or SCell, the UE can receive a PDSCH reception with RAR on an SCell that is configured by the network or indicated in the PDCCH scheduling the RAR.

The PRACH preamble sequences can be of different lengths such as four lengths. For example, a sequence length 839 applies with subcarrier spacing (SCS) of 1.25 kHz or 5 kHz, a sequence length 139 applies with SCS of 15, 30, 60 or 120 kHz, and sequence lengths of 571 and 1151 apply with SCS of 30 kHz and 15 kHz, respectively. For another example, sequence length 839 supports unrestricted sets and restricted sets of Type A and Type B, while sequence lengths 139, 571, and 1151 support unrestricted sets only. In certain embodiments, a sequence length 839 is only used for operation with licensed channel access while sequence length 139 can be used for operation with either licensed or shared spectrum channel access. Sequence lengths of 571 and 1151 can be used only for operation with shared spectrum channel access.

A long PRACH preamble with L=839 subcarriers and an SCS=1.25 kHz or SCS=5 kHZ can span a bandwidth of about 6 RBs or 24 RBs (with respect to a 15-kHz frequency grid), respectively. For FR2, a short PRACH preamble with L=139 subcarriers can span about 12 RBs in the numerology of the PRACH preamble.

In certain embodiments, multiple PRACH preamble formats are defined with one or more symbols and different cyclic prefix and guard time. A UE (such as the UE 116) is indicated a PRACH preamble configuration to use by system information.

The UE calculates the PRACH transmit power for a PRACH retransmission based on a most recent pathloss estimate and a value of a power ramping counter. If prior to a PRACH retransmission, a UE (such as the UE 116) changes the spatial domain transmission filter, Layer 1 notifies higher layers to suspend the power ramping counter. If the UE transmits a PRACH with reduced power in a transmission occasion, or if the UE does not transmit a PRACH in a transmission occasion, due a CA/DC power allocation, Layer 1 may notify higher layers to suspend the corresponding power ramping counter.

System information provides to a UE (such as the UE 116) information for an association between a corresponding SSB and resources for a RA procedure. The RSRP threshold for SSB selection for RACH resource association is configurable by the network.

During the RA procedure, the following identities are also used. One identity, denoted as RA-radio network temporary identifier (RA-RNTI), corresponds to an identification of the DCI format scheduling a PDSCH reception with a RAR. Another identity denoted as temporary cell-RNTI (C-RNTI), corresponds to a UE identification temporarily used for scheduling during the RA procedure. Another identity denoted as random value for contention resolution (also known as a contention resolution identity), corresponds to a UE identification temporarily used for contention resolution purposes during the RA procedure.

Random access preambles can only be transmitted in the time resources obtained from predetermined Tables depending on a frequency range and a spectrum type (shared or non-shared). The PRACH configuration index is given by the higher-layer parameter prach-ConfigurationIndex, or by msgA-PRACH-ConfigurationIndex if configured.

Random access preambles can only be transmitted in the frequency resources given by either the higher-layer parameter msg1-FrequencyStart or msgA-RO-FrequencyStart, if configured. The PRACH frequency resources $n_{RA} \in \{0, 1, \ldots, M-1\}$, where M equals the higher-layer parameter msg1-FDM or msgA-RO-FDM if configured, are numbered in increasing order within the initial uplink bandwidth part during initial access, starting from the lowest frequency. Otherwise, $n_{RA}$ are numbered in increasing order within the active uplink bandwidth part, starting from the lowest frequency.

For the purpose of slot numbering, subcarrier spacing can be based on 15 kHz for FR1 and 60 kHz for FR2.

During initialization of a random access procedure, when the Random Access procedure is initiated on a Serving Cell, to determine an uplink carrier for the random access procedure, the MAC entity shall perform a task, as described in Syntax (2).

Syntax (2)
1> if the carrier to use for the Random Access procedure is explicitly signaled:
 2> select the signaled carrier for performing Random Access procedure;
 2> set the PCMAX to PCMAX,f,c of the signaled carrier.
1> else if the carrier to use for the Random Access procedure is not explicitly signaled; and
1> if the Serving Cell for the Random Access procedure is configured with supplementary uplink as specified in REF6; and
1> if the RSRP of the downlink pathloss reference is less than rsrp-ThresholdSSB-SUL:
 2> select the SUL carrier for performing Random Access procedure;
 2> set the PCMAX to PCMAX,f,c of the SUL carrier.
1> else:
 2> select the NUL carrier for performing Random Access procedure;
 2> set the PCMAX to PCMAX,f,c of the NUL carrier.

In certain embodiments, msgA-RSRP-Threshold is an RSRP threshold for selection between 2-step RA type and 4-step RA type when both 2-step and 4-step RA type Random Access Resources are configured in the UL BWP.

When the Random Access procedure is initiated on a Serving Cell, for selection of RA type between Type-1 RA (2-step RA) vs. Type-2 RA (4-step RA), the MAC entity shall perform a task, as described in Syntax (3).

Syntax (3)
1> if the Random Access procedure is initiated by PDCCH order and if the ra-PreambleIndex explicitly provided by PDCCH is not 0b000000; or
1> if the Random Access procedure was initiated for SI request (as specified in REF6) and the Random Access Resources for SI request have been explicitly provided by RRC; or
1> if the Random Access procedure was initiated for SpCell beam failure recovery (as specified in REF5) and if the contention-free Random Access Resources for beam failure recovery request for 4-step RA type have been explicitly provided by RRC for the BWP selected for Random Access procedure; or
1> if the Random Access procedure was initiated for reconfiguration with sync and if the contention-free Random Access Resources for 4-step RA type have been explicitly provided in rach-ConfigDedicated for the BWP selected for Random Access procedure:
 2> set the RA_TYPE to 4-stepRA.
1> else if the BWP selected for Random Access procedure is configured with both 2-step and 4-step RA type Random Access Resources and the RSRP of the downlink pathloss reference is above msgA-RSRP-Threshold; or 1> if the BWP selected for Random Access procedure is only configured with 2-step RA type Random Access resources (i.e., no 4-step RACH RA type resources configured); or 1> if the Random Access procedure was initiated for reconfiguration with sync and if the contention-free Random Access Resources for 2-step RA type have been explicitly provided in rach-ConfigDedicated for the BWP selected for Random Access procedure:
   2> set the RA_TYPE to 2-stepRA.

1> else:
   2> set the RA_TYPE to 4-stepRA.

In certain embodiments the UE performs random access resource selection as follows.

If the selected RA_TYPE is set to 4-stepRA, the MAC entity shall perform a task, as described in Syntax (4).

Syntax (4)

1> if the Random Access procedure was initiated for SpCell beam failure recovery; and 1> if the beamFailureRecoveryTimer is either running or not configured; and 1> if the contention-free Random Access Resources for beam failure recovery request associated with any of the SSBs and/or CSI-RSs have been explicitly provided by RRC; and 1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in REF4.
   2> else:
      3> set the PREAMBLE_INDEX to a ra-PreambleIndex corresponding to the selected SSB or CSI-RS from the set of Random Access Preambles for beam failure recovery request.

1> else if the ra-PreambleIndex has been explicitly provided by PDCCH; and

1> if the ra-PreambleIndex is not 0b000000:
   2> set the PREAMBLE_INDEX to the signaled ra-PreambleIndex;
   2> select the SSB signaled by PDCCH.

1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.

1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.

1> else if the Random Access procedure was initiated for SI request (as specified in REF6); and 1> if the Random Access Resources for SI request have been explicitly provided by RRC:
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> select a Random Access Preamble corresponding to the selected SSB, from the Random Access Preamble(s) determined according to ra-PreambleStartIndex as specified in REF6];
   2> set the PREAMBLE_INDEX to selected Random Access Preamble.

1> else (i.e. for the contention-based Random Access preamble selection):
   2> if at least one of the SSBs with SS-RSRP above rsrp-ThresholdSSB is available:
      3> select an SSB with SS-RSRP above rsrp-ThresholdSSB.
   2> else:
      3> select any SSB.

If the selected RA_TYPE is set to 2-stepRA, the MAC entity shall perform a task, as described in Syntax (5).

Syntax (5)

1> if the contention-free 2-step RA type Resources associated with SSBs have been explicitly provided in rach-ConfigDedicated and at least one SSB with SS-RSRP above msgA-RSRP-ThresholdSSB amongst the associated SSBs is available:
   2> select an SSB with SS-RSRP above msgA-RSRP-ThresholdSSB amongst the associated SSBs;
   2> set the PREAMBLE_INDEX to a ra-PreambleIndex corresponding to the selected SSB.

1> else (i.e. for the contention-based Random Access Preamble selection):
   2> if at least one of the SSBs with SS-RSRP above msgA-RSRP-ThresholdSSB is available:
      3> select an SSB with SS-RSRP above msgA-RSRP-ThresholdSSB.
   2> else:
      3> select any SSB.

In certain embodiments, prior to initiation of the physical random access procedure, Layer 1 receives from higher layers a set of SS/PBCH block indexes and provides to higher layers a corresponding set of RSRP measurements.

In certain embodiments, prior to initiation of the physical random access procedure, Layer 1 may receive from higher layers an indication to perform a Type-1 random access procedure or a Type-2 random access procedure.

In certain embodiments, prior to initiation of the physical random access procedure, Layer 1 receives information from the higher layers. For example, Layer 1 can receives information from the higher that includes configuration of physical random access channel (PRACH) transmission parameters (PRACH preamble format, time resources, and frequency resources for PRACH transmission). For example, Layer 1 can receives information from the higher that includes parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the Type-1 L1 random access procedure includes the transmission of random access preamble (Msg1) in a PRACH, RAR message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random access preamble in a PRACH and of a PUSCH (MsgA) and the reception of a RAR message with a PDCCH/PDSCH (MsgB), and when applicable, the transmission of a PUSCH scheduled by a fallback RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

Physical random access procedure is triggered upon request of a PRACH transmission by higher layers or by a PDCCH order. A configuration by higher layers for a PRACH transmission includes (i) a configuration for PRACH transmission and (ii) a preamble index, a preamble SCS, $P_{PRACH,target}$, a corresponding RA-RNTI, and a PRACH resource.

A PRACH is transmitted using the selected PRACH format with transmission power $P_{PRACH,b,f,c}(i)$ on the indicated PRACH resource.

For Type-1 random access procedure, a UE is provided a number N of SS/PBCH block indexes associated with one PRACH occasion and a number R of contention based preambles per SS/PBCH block index per valid PRACH occasion by ssb-perRACH-OccasionAndCB-PreamblesPerSSB.

For Type-2 random access procedure with common configuration of PRACH occasions with Type-1 random access procedure, a UE is provided a number N of SS/PBCH block indexes associated with one PRACH occasion by ssb-perRACH-OccasionAndCB-PreamblesPerSSB and a number Q of contention based preambles per SS/PBCH block index per valid PRACH occasion by msgA-CB-Preambles-PerSSB-PerSharedRO. The PRACH transmission can be on a subset of PRACH occasions associated with a same SS/PBCH block index within an SSB-RO mapping cycle for a UE provided with a PRACH mask index by msgA-SSB-SharedRO-MaskIndex.

For Type-2 random access procedure with separate configuration of PRACH occasions with Type-1 random access procedure, a UE is provided a number N of SS/PBCH block indexes associated with one PRACH occasion and a number R of contention based preambles per SS/PBCH block index per valid PRACH occasion by msgA-SSB-PerRACH-OccasionAndCB-PreamblesPerSSB when provided; otherwise, by ssb-perRACH-OccasionAndCB-PreamblesPerSSB.

For Type-1 random access procedure, or for Type-2 random access procedure with separate configuration of PRACH occasions from Type 1 random access procedure, if N<1, one SS/PBCH block index is mapped to 1/N consecutive valid PRACH occasions and R contention based preambles with consecutive indexes associated with the SS/PBCH block index per valid PRACH occasion starting from preamble index 0. If N≥1, R contention based preambles with consecutive indexes associated with SS/PBCH block index n, 0≤n≤N−1, per valid PRACH occasion start from preamble index $n \cdot N_{preamble}^{total}/N$ where $N_{preamble}^{total}$ is provided by totalNumberOfRA-Preambles for Type-1 random access procedure, or by msgA-TotalNumberOfRA-Preambles for Type-2 random access procedure with separate configuration of PRACH occasions from a Type 1 random access procedure, and is an integer multiple of N.

For Type-2 random access procedure with common configuration of PRACH occasions with Type-1 random access procedure, if N<1, one SS/PBCH block index is mapped to 1/N consecutive valid PRACH occasions and Q contention based preambles with consecutive indexes associated with the SS/PBCH block index per valid PRACH occasion start from preamble index R. If N≥1, Q contention based preambles with consecutive indexes associated with SS/PBCH block index n, 0≤n≤N−1, per valid PRACH occasion start from preamble index $n \cdot N_{preamble}^{total}/N + R$, where $N_{preamble}^{total}$ is provided by totalNumberOfRA-Preambles for Type-1 random access procedure.

For link recovery, a UE is provided N SS/PBCH block indexes associated with one PRACH occasion by ssb-perRACH-Occasion in BeamFailureRecoveryConfig. For a dedicated RACH configuration provided by RACH-ConfigDedicated, if cfra is provided, a UE is provided N SS/PBCH block indexes associated with one PRACH occasion by ssb-perRACH-Occasion in occasions. If N<1, one SS/PBCH block index is mapped to 1/N consecutive valid PRACH occasions. If N≥1, all consecutive N SS/PBCH block indexes are associated with one PRACH occasion.

In certain embodiments, SS/PBCH block indexes provided by ssb-PositionsInBurst in SIB1 or in ServingCellConfigCommon are mapped to valid PRACH occasions in the following order. First, in increasing order of preamble indexes within a single PRACH occasion. Second, in increasing order of frequency resource indexes for frequency multiplexed PRACH occasions. Third, in increasing order of time resource indexes for time multiplexed PRACH occasions within a PRACH slot. Fourth, in increasing order of indexes for PRACH slots.

An association period, starting from frame zero, for mapping SS/PBCH block indexes to PRACH occasions is the smallest value in the set determined by the PRACH configuration period such that $N_{Tx}^{SSB}$ SS/PBCH block indexes are mapped at least once to the PRACH occasions within the association period, where a UE obtains $N_{Tx}^{SSB}$ from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $N_{Tx}^{SSB}$ SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions.

For a PRACH transmission triggered by a PDCCH order, the PRACH mask index field, if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

In certain embodiments, for the indicated preamble index, the ordering of the PRACH occasions is based on the following. First, in increasing order of frequency resource indexes for frequency multiplexed PRACH occasions. Second, in increasing order of time resource indexes for time multiplexed PRACH occasions within a PRACH slot. Third, in increasing order of indexes for PRACH slots.

For a PRACH transmission triggered upon request by higher layers, a value of ra-OccasionList, if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

In response to a PRACH transmission, a UE attempts to detect a DCI format 1_0 with CRC scrambled by a corresponding RA-RNTI during a window controlled by higher layers REF5. The window starts at the first symbol of the earliest CORESET the UE is configured to receive PDCCH for Type1-PDCCH CSS set, that is at least one symbol, after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by ra-ResponseWindow.

If the UE detects the DCI format 1_0 with CRC scrambled by the corresponding RA-RNTI and least significant bits (LSBs) of a SFN field in the DCI format 1_0, if included and applicable, are same as corresponding LSBs of the SFN where the UE transmitted PRACH, and the UE receives a transport block in a corresponding PDSCH within the window, the UE passes the transport block to higher layers. The higher layers parse the transport block for a random access preamble identity (RAPID) associated with the PRACH transmission. If the higher layers identify the RAPID in RAR message(s) of the transport block, the higher layers indicate an uplink grant to the physical layer. This is referred to as RAR UL grant in the physical layer.

A RAR UL grant schedules a PUSCH transmission from the UE. The contents of the RAR UL grant, starting with the MSB and ending with the LSB, are given in Table 8.2-1 of REF3.

If the value of the frequency hopping flag is zero, the UE transmits the PUSCH without frequency hopping; otherwise, the UE transmits the PUSCH with frequency hopping.

The UE determines the MCS of the PUSCH transmission from the first sixteen indexes of the applicable MCS index table for PUSCH as described in REF4.

The TPC command value $\delta_{msg2,b,f,c}$ is used for setting the power of the PUSCH transmission.

The CSI request field is reserved.

The ChannelAccess-CPext field indicates a channel access type and CP extension for operation with shared spectrum channel access REF3 if ChannelAccessMode-r16="semistatic" is provided in Table (1), below. It is noted that Table (1) describes Random Access Response Grant Content field size.

TABLE 1

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

In certain embodiments, a UE (such as the UE 116) transmits a transport block in a PUSCH scheduled by a RAR UL grant in a corresponding RAR message using redundancy version number 0. If a temporary cell-RNTI (TC-RNTI) is provided by higher layers, the scrambling initialization of the PUSCH corresponding to the RAR UL grant is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message REF5. The UE always transmits the PUSCH scheduled by a RAR UL grant without repetitions.

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity REF5. In response to the PDSCH reception with the UE contention resolution identity, the UE transmits HARQ-ACK information in a PUCCH. The PUCCH transmission is within a same active UL BWP as the PUSCH transmission. A minimum time between the last symbol of the PDSCH reception and the first symbol of the corresponding PUCCH transmission with the HARQ-ACK information is equal to $N_{T,1}+0.5$ msec. $N_{T,1}$ is a time duration of $N_1$ symbols corresponding to a PDSCH processing time for UE processing capability 1 when additional PDSCH DM-RS is configured. For $\mu=0$, the UE assumes $N_{1,0}=14$, REF4.

When detecting a DCI format in response to a PUSCH transmission scheduled by a RAR UL grant, as described in REF5, or corresponding PUSCH retransmission scheduled by a DCI format 0_0 with CRC scrambled by a TC-RNTI provided in the corresponding RAR message REF5, the UE may assume the PDCCH carrying the DCI format has the same DM-RS antenna port quasi co-location properties, as described in REF4, as for a SS/PBCH block the UE used for PRACH association, regardless of whether or not the UE is provided TCI-State for the CORESET where the UE receives the PDCCH with the DCI format.

If a UE does not have dedicated PUCCH resource configuration, provided by PUCCH-ResourceSet in PUCCH-Config, a PUCCH resource set is provided by pucch-ResourceCommon through an index to a row of a predetermined Table for transmission of HARQ-ACK information on PUCCH in an initial UL BWP of $N_{BWP}^{size}$ PRBs.

The PUCCH resource set includes sixteen resources, each corresponding to a PUCCH format, a first symbol, a duration, a PRB offset $RB_{BWP}^{offset}$, and a cyclic shift index set for a PUCCH transmission.

The UE transmits a PUCCH using frequency hopping if not provided useInterlacePUCCH-PUSCH in BWP-Uplink-Common; otherwise, the UE transmits a PUCCH without frequency hopping.

An orthogonal cover code with index 0 is used for a PUCCH resource with PUCCH format 1 in the predetermined Table.

The UE transmits the PUCCH using the same spatial domain transmission filter as for a PUSCH transmission scheduled by a RAR UL grant.

For a Type-2 random access procedure, a UE transmits a PUSCH, when applicable, after transmitting a PRACH. The UE encodes a transport block provided for the PUSCH transmission using redundancy version number 0. The PUSCH transmission is after the PRACH transmission by at least N symbols where N=2 for µ=0 or µ=1, N=4 for µ=2 or µ=3, and µ is the SCS configuration for the active UL BWP.

A UE (such as the UE 116) does not transmit a PUSCH in a PUSCH occasion if the PUSCH occasion associated with a DMRS resource is not mapped to a preamble of valid PRACH occasions or if the associated PRACH preamble is not transmitted. A UE can transmit a PRACH preamble in a valid PRACH occasion if the PRACH preamble is not mapped to a valid PUSCH occasion.

A mapping between one or multiple PRACH preambles and a PUSCH occasion associated with a DMRS resource is per PUSCH configuration.

A UE determines time resources and frequency resources for PUSCH occasions in an active UL BWP from msgA-PUSCH-Config for the active UL BWP. If the active UL BWP is not the initial UL BWP and msgA-PUSCH-Config is not provided for the active UL BWP, the UE uses the msgA-PUSCH-Config provided for the initial UL BWP.

For mapping one or multiple preambles of a PRACH slot to a PUSCH occasion associated with a DMRS resource, a UE determines a first slot for a first PUSCH occasion in an active UL BWP from msgA-PUSCH-TimeDomainOffset that provides an offset, in number of slots in the active UL BWP, relative to the start of a PUSCH slot including the start of each PRACH slot. The UE does not expect to have a PRACH preamble transmission and a PUSCH transmission with a msgA in a PRACH slot or in a PUSCH slot, or to have overlapping msgA PUSCH occasions for a MsgA PUSCH configuration. The UE expects that a first PUSCH occasion in each slot has a same start and length indicator value (SLIV) for a PUSCH transmission that is provided by startSymbolAndLengthMsgA-PO or msgA-PUSCH-timeDomainAllocation.

Consecutive PUSCH occasions within each slot are separated by guardPeriodMsgA-PUSCH symbols and have same duration. A number $N_t$ of time domain PUSCH occasions in each slot is provided by nrofMsgA-PO-perSlot and a number $N_s$ of consecutive slots that include PUSCH occasions is provided by nrofSlotsMsgA-PUSCH.

A UE (such as the UE 116) is provided a DMRS configuration for a PUSCH transmission in a PUSCH occasion in an active UL BWP by msgA-DMRS-Config.

A UE is provided an MCS for data information in a PUSCH transmission for a PUSCH occasion by msgA-MCS.

A PUSCH transmission uses a same spatial filter as an associated PRACH transmission.

A UE (such as the UE 116) determines whether (or not) to apply transform precoding for a MsgA PUSCH transmission.

A PUSCH occasion for PUSCH transmission is defined by a frequency resource and a time resource, and is associated with a DMRS resource. The DMRS resources are provided by msgA-DMRS-Config.

Each consecutive number of $N_{preamble}$ preamble indexes from valid PRACH occasions in a PRACH slot (first, in increasing order of preamble indexes within a single PRACH occasion, second, in increasing order of frequency resource indexes for frequency multiplexed PRACH occasions, and third, in increasing order of time resource indexes for time multiplexed PRACH occasions within a PRACH slot) are mapped to a valid PUSCH occasion and the associated DMRS resource (first, in increasing order of frequency resource indexes $f_{id}$ for frequency multiplexed PUSCH occasions, second, in increasing order of DMRS resource indexes within a PUSCH occasion, where a DMRS resource index $DMRS_{id}$ is determined first in an ascending order of a DMRS port index and second in an ascending order of a DMRS sequence index, third, in increasing order of time resource indexes $t_{id}$ for time multiplexed PUSCH occasions within a PUSCH slot, and fourth, in increasing order of indexes for $N_s$ PUSCH slots). It is noted that Equation (1), describes $N_{preamble}$.

$$N_{preamble} = \text{ceil}(T_{preamble}/T_{PUSCH}) \qquad (1)$$

Here, $T_{preamble}$ is a total number of valid PRACH occasions per association pattern period multiplied by the number of preambles per valid PRACH occasion provided by rach-ConfigCommonTwoStepRA, and $T_{PUSCH}$ is a total number of valid PUSCH occasions per PUSCH configuration per association pattern period multiplied by the number of DMRS resource indexes per valid PUSCH occasion provided by msgA-DMRS-Config.

In response to a transmission of a PRACH, if the PRACH preamble is not mapped to a valid PUSCH occasion, a UE attempts to detect a DCI format 1_0 with CRC scrambled by a corresponding MsgB-RNTI during a window controlled by higher layers REF5. The window starts at the first symbol of the earliest CORESET the UE is configured to receive PDCCH for Type1-PDCCH CSS set, that is at least one symbol, after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by msgB-ResponseWindow.

If the UE detects the DCI format 1_0, with CRC scrambled by the corresponding MsgB-RNTI and LSBs of a SFN field in the DCI format 1_0, if applicable, are same as corresponding LSBs of the SFN where the UE transmitted PRACH, and the UE receives a transport block in a corresponding PDSCH within the window, the UE passes the transport block to higher layers. The higher layers indicate to the physical layer (i) an uplink grant if the RAR message(s) is for fallbackRAR and a random access preamble identity (RAPID) associated with the PRACH transmission is identified, and the UE procedure continues as described in a Type-1 random access procedure, when the UE detects a RAR UL grant, or (ii) transmission of a PUCCH with HARQ-ACK information having ACK value if the RAR message(s) is for successRAR. Here a PUCCH resource for the transmission of the PUCCH is indicated by PUCCH resource indicator field of 4 bits in the successRAR from a PUCCH resource set that is provided by pucch-ResourceCommon. Additionally, a slot for the PUCCH transmission is indicated by a HARQ Feedback Timing Indicator field of 3 bits in the successRAR having a value k from {1, 2, 3, 4, 5, 6, 7, 8} and, with reference to slots for PUCCH transmission having duration $T_{slot}$, the slot is determined as n+k+Δ, where n is a slot of the PDSCH reception and Δ is as defined in REF4. It is noted that the UE does not expect the first symbol of the PUCCH transmission to be after the last symbol of the PDSCH reception by a time smaller than $N_{T,1}$+0.5 msec where $N_{T,1}$ is the PDSCH processing time for UE processing capability 1 REF4. For operation with shared spectrum channel access, a channel access type and CP extension REF3 for a PUCCH transmission is indicated by a ChannelAccess-CPext field in the successRAR if ChannelAccessMode-r16="semistatic" is provided. The PUCCH transmission is with a same spatial domain transmission filter and in a same active UL BWP as a last PUSCH transmission.

For Msg1/PRACH, a UE Tx beam/spatial transmission filter can be up to UE implementation.

For Msg2/RAR, a UE Rx beam can be same as a UE Rx beam for reception of DL RS associated with PRACH. If the UE detects a DCI format 1_0 with CRC scrambled by the corresponding RA-RNTI and LSBs of a SFN field in the DCI format 1_0, if included and applicable, are same as corresponding LSBs of the SFN where the UE transmitted the PRACH, and the UE receives a transport block in a corresponding PDSCH, the UE may assume same DM-RS antenna port quasi co-location properties as for a SS/PBCH block or a CSI-RS resource the UE used for PRACH association, regardless of whether or not the UE is provided TCI-State for the CORESET where the UE receives the PDCCH with the DCI format 1_0.

For Msg2/RAR PDSCH, an MCS is provided in a scheduling DCI format 1_0 that is carried by Msg2/RAR PDCCH. In response to a PRACH transmission, a UE attempts to detect a DCI format 1_0 with CRC scrambled by a corresponding RA-RNTI during a window controlled by higher layers. The window starts at the first symbol of the earliest CORESET the UE is configured to receive PDCCH for Type1-PDCCH CSS set that is at least one symbol after the last symbol of the PRACH occasion corresponding to the PRACH transmission, where the symbol duration corresponds to the SCS for Type1-PDCCH CSS set. The length of the window in number of slots, based on the SCS for Type1-PDCCH CSS set, is provided by ra-ResponseWindow.

For Msg3/A PUSCH, a UE Tx beam can be up to UE implementation, or can be same as a UE Tx beam for Msg1/A PRACH, or can be same as a refined Rx beam that the UE used for Msg2/RAR reception.

For Msg3 PUSCH in 4-step RACH, an MCS is indicated in a RAR UL grant that is carried by Msg2/RAR PDSCH. For MsgA PUSCH in 2-step RACH, higher layer signaling such as SIB or RRC configures an MCS for MsgA-PUSCH.

For Msg4 PDSCH, UE can use a same UE Rx beam that the UE used for reception of the DL RS associated with PRACH. When detecting a DCI format in response to a PUSCH transmission scheduled by a RAR UL grant, or corresponding PUSCH retransmission scheduled by a DCI format 0_0 with CRC scrambled by a TC-RNTI provided in the corresponding RAR message, the UE may assume the PDCCH carrying the DCI format has the same DM-RS antenna port quasi co-location properties as for a SS/PBCH block the UE used for PRACH association, regardless of whether or not the UE is provided TCI-State for the CORESET where the UE receives the PDCCH with the DCI format.

For Msg4 PDSCH, an MCS is indicated in a scheduling DCI format 1_0 that is carried by Msg4 PDCCH.

PRACH enhancements can be considered, including multiple PRACH transmissions with the same beam, multiple PRACH transmissions with different beams, and PRACH enhancements with finer beam based on CSI-RS resources configured during initial access.

Msg4 PDSCH enhancements can be considered, including early CSI on Msg3 PUSCH for early link adaptation based on CSI-RS resources configured during initial access, scaling factor for TBS determination and PDSCH repetition.

Beam reporting during initial/random access procedure is intended to enhance Msg3 re-transmission, Msg4 initial transmission, Msg4 re-transmission and PDSCH out of RACH procedure while without dedicated RRC configuration. Beam reporting during initial/random access procedure can include reporting a best SSB beam, alternative SSB beam, or early CSI report in Msg3 PUSCH based on CSI-RS resources configured during initial access, as well as beam indication for the following steps for RACH procedure.

In certain embodiments, a UE (such as the UE 116) determines a transmission power for a PRACH, $P_{PRACH,b,f,c}(i)$, on active UL BWP b of carrier f of serving cell c based on DL RS for serving cell c in transmission occasion i as described in Equation (2).

$$P_{PRACH,b,f,c}(i) = \min\{P_{CMAX,f,c}(i), P_{PRACHtarget,f,c} + PL_{b,f,c}\} \text{ [dBm]} \quad (2)$$

Here, $P_{CMAX,f,c}(i)$, is the UE configured maximum output power defined in REF8, REF9, and REF10 for carrier f of serving cell c within transmission occasion i, $P_{PRACHtarget,f,c}$ is the PRACH target reception power PREAMBLE_RECEIVED_TARGET_POWER provided by higher layers REF5 for the active UL BWP b of carrier f of serving cell c, and $PL_{b,f,c}$ is a pathloss for the active UL BWP b of carrier f based on the DL RS associated with the PRACH transmission on the active DL BWP of serving cell c and calculated by the UE in dB as referenceSignalPower— higher layer filtered RSRP in dBm, where RSRP is defined in [TS 38.215] and the higher layer filter configuration is defined in REF6. If the active DL BWP is the initial DL BWP and for SS/PBCH block and CORESET multiplexing pattern 2 or 3, the UE determines $PL_{b,f,c}$ based on the SS/PBCH block associated with the PRACH transmission.

In certain embodiments, if a PRACH transmission from a UE is not in response to a detection of a PDCCH order by the UE, or is in response to a detection of a PDCCH order by the UE that triggers a contention based random access procedure, or is associated with a link recovery procedure where a corresponding index $q_{new}$ is associated with a SS/PBCH block, referenceSignalPower is provided by ss-PBCH-BlockPower.

If a PRACH transmission from a UE (such as the UE 116) is in response to a detection of a PDCCH order by the UE that triggers a contention-free random access procedure and depending on the DL RS that the DM-RS of the PDCCH order is quasi-collocated with, referenceSignalPower is provided by ss-PBCH-BlockPower or, if the UE is configured resources for a periodic CSI-RS reception or the PRACH transmission is associated with a link recovery procedure where a corresponding index $q_{new}$ is associated with a periodic CSI-RS configuration, referenceSignalPower is obtained by ss-PBCH-BlockPower and powerControlOffsetSS where powerControlOffsetSS provides an offset of CSI-RS transmission power relative to SS/PBCH block transmission power REF4. If powerControlOffsetSS is not provided to the UE, the UE assumes an offset of 0 dB. If the active TCI state for the PDCCH that provides the PDCCH order includes two RS, the UE expects that one RS is configured with qcl-Type set to 'typeD' and the UE uses the one RS when applying a value provided by powerControlOffsetSS.

If within a random access response window, the UE does not receive a random access response that contains a preamble identifier corresponding to the preamble sequence transmitted by the UE, the UE determines a transmission power for a subsequent PRACH transmission, if any, based on the power ramping procedure REF5. For example, the UE can set PREAMBLE_RECEIVED_TARGET_POWER as described in Equation (3)

$$\text{PREAMBLE\_RECEIVED\_TARGET\_POWER} = \quad (3)$$
$$preambleReceivedTargetPower + \text{DELTA\_PREAMBLE} +$$
$$(\text{PREAMBLE\_POWER\_RAMPING\_COUNTER} - 1) \times$$
$$\text{PREAMBLE\_POWER\_RAMPING\_STEP} +$$
$$\text{POWER\_OFFSET\_2STEP\_RA}$$

If prior to a PRACH retransmission, a UE changes the spatial domain transmission filter, Layer 1 notifies higher layers to suspend the power ramping counter as described in REF5.

If due to power allocation to PUSCH/PUCCH/PRACH/SRS transmissions, or due to power allocation in EN-DC or NE-DC or NR-DC operation, or due to slot format determination, or due to the PUSCH/PUCCH/PRACH/SRS transmission occasions are in the same slot or the gap between a PRACH transmission and PUSCH/PUCCH/SRS transmission is small, the UE does not transmit a PRACH in a transmission occasion, Layer 1 notifies higher layers to suspend the corresponding power ramping counter. If due to power allocation to PUSCH/PUCCH/PRACH/SRS transmissions, or due to power allocation in EN-DC or NE-DC or NR-DC operation, the UE transmits a PRACH with reduced power in a transmission occasion, Layer 1 may notify higher layers to suspend the corresponding power ramping counter.

In certain embodiments, if a UE (such as the UE 116) transmits a PUSCH on active UL BWP b of carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as described in Equation (4).

$$P_{PUSCH,b,f,c}(i,j,q_d,l) = \quad (4)$$
$$\min \begin{cases} P_{CMAX,f,c}(i) \\ P_{O_{PUSCH},b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i,l) \end{cases} [dBm]$$

In Equation (3), $P_{CMAX,f,c}(i)$ is the UE configured maximum output power defined in REF8, REF9, and REF10 for carrier f of serving cell c in PUSCH transmission occasion i. The expression, $P_{O_{PUSCH},b,f,c}(i)$ is a parameter composed of the sum of a component $P_{O\_NOMINAL\_PUSCH,f,c}(j)$ and a component $P_{O\_UE\_PUSCH,b,f,c}(j)$, where $j \in \{0, 1, \ldots, J-1\}$.

If a UE established dedicated RRC connection using a Type-1 random access procedure, and is not provided P0-PUSCH-AlphaSet or for a PUSCH (re)transmission corresponding to a RAR UL grant, then Equation (5), Equation (6), and Equation (7) are satisfied.

$$j=0 \quad (5)$$
$$P_{O\_UE\_PUSCH,b,f,c}(0)=0 \quad (6)$$
$$P_{O\_NOMINAL\_PUSCH,f,c}(0)=P_{O\_PRE}+\Delta_{PREAMBLE\_Msg3} \quad (7)$$

Here $P_{O\_PRE}$ is provided by preambleReceivedTargetPower REF5 and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell c.

If a UE established dedicated RRC connection using a Type-2 random access procedure, as described in Clause 8, and is not provided P0-PUSCH-AlphaSet, or for a PUSCH transmission for Type-2 random access procedure as described in Clause 8.1A, then Equation (8), Equation (9), and Equation (10) are satisfied.

$$j=0 \quad (8)$$
$$P_{O\_UE\_PUSCH,b,f,c}(0)=0 \quad (9)$$
$$P_{O\_NOMINAL\_PUSCH,f,c}(0)=P_{O\_PRE}+\Delta_{MsgA\_PUSCH} \quad (10)$$

Here $P_{O\_PRE}$ is provided by msgA-preambleReceivedTargetPower, or by preambleReceivedTargetPower if msgA-preambleReceivedTargetPower is not provided and $\Delta_{MsgA\_PUSCH}$ is provided by msgA-DeltaPreamble, or $\Delta_{MsgA\_PUSCH}=\Delta_{PREAMBLE\_Msg3}$ dB if msgA-DeltaPreamble is not provided, for carrier f of serving cell c.

This is also described in Syntax (6), below.

```
Syntax
    For α_{b,f,c}(j)
        For j = 0 ,
            if P_{O_NOMINAL_PUSCH,f,c}(0) = P_{O_PRE} + Δ_{MsgA_PUSCH} and msgA-Alpha is
              provided, α_{b,f,c}(0) is the value of msgA-Alpha
            elseif P_{O_NOMINAL_PUSCH,f,c}(0) = P_{O_PRE} + Δ_{PREAMBLE_Msg3} or msgA-Alpha is not
              provided, and msg3-Alpha is provided, α_{b,f,c}(0) is the value of msg3-Alpha
            else, α_{b,f,c}(0) = 1
```

In certain embodiments, if certain embodiments $PL_{b,f,c}(q_d)$ is a downlink pathloss estimate in dB calculated by the UE using RS index $q_d$ for a PUSCH transmission on the active DL BWP of carrier f of serving cell c. For example, if the UE is not provided PUSCH-PathlossReferenceRS and enableDefaultBeamPL-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB. For another example, if the PUSCH transmission is scheduled by a RAR UL grant, or for a PUSCH transmission for Type-2 random access procedure, the UE uses the same RS resource index $q_d$ as for a corresponding PRACH transmission In certain embodiments, if (i) the PUSCH transmission is scheduled by DCI format 0_0 on serving cell c, (ii) the UE is not provided a spatial setting for PUCCH resources on the active UL BWP of the primary cell REF5, and (iii) the UE is provided enableDefaultBeamPL-ForPUSCH0-0, then the UE determines a RS resource index $q_d$ providing a periodic RS resource configured with qcl-Type set to 'typeD' in the TCI state or the QCL assumption of a CORESET with the lowest index in the active DL BWP of the serving cell c.

In certain embodiments, if (i) the PUSCH transmission is scheduled by DCI format 0_0 on serving cell c, (ii) the UE is not provided PUCCH resources for the active UL BWP of serving cell c, and (iii) the UE is provided enableDefaultBeamPL-ForPUSCH0-0, then the UE determines a RS resource index $q_d$ providing a periodic RS resource configured with qcl-Type set to 'typeD' in the TCI state or the QCL assumption of a CORESET with the lowest index in the active DL BWP of the serving cell c.

In certain embodiments, if the PUSCH transmission is not scheduled by DCI format 0_0, and if the UE is provided enableDefaultBeamPL-ForSRS and is not provided PUSCH-PathlossReferenceRS and PUSCH-PathlossReferenceRS-r16, the UE uses the same RS resource index $q_d$ as for an SRS resource set with an SRS resource associated with the PUSCH transmission.

In certain embodiments, if the UE (i) is not provided pathlossReferenceRS or SRS-PathlossReferenceRS-Id, (ii) is not provided spatialRelationInfo, (iii) is provided enableDefaultBeamPL-ForSRS, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then the UE determines a RS resource index $q_d$ providing a periodic RS resource configured with qcl-Type set to 'typeD' in (a) the TCI state or the QCL assumption of a CORESET with the lowest index in the active DL BWP, if CORESETs are provided in the active DL BWP of serving cell c and (b) the active PDSCH TCI state with lowest ID REF4 in the active DL BWP, if CORESETs are not provided in the active DL BWP of serving cell c.

In certain embodiments, if the UE (i) is not provided pathlossReferenceRSs, (ii) is not provided PUCCH-SpatialRelationInfo, (iii) is provided enableDefaultBeamPL-ForPUCCH, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then the UE determines a RS resource index $q_d$ providing a periodic RS resource configured with qcl-Type set to 'typeD' in the TCI state or the QCL assumption of a CORESET with the lowest index in the active DL BWP of the primary cell. For a PUCCH transmission over multiple slots, a same $q_d$ applies to the PUCCH transmission in each of the multiple slots.

In certain embodiments, if a UE (i) is not provided pathlossReferenceRSs in PUCCH-PowerControl, (ii) is provided enableDefaultBeamPL-ForPUCCH, (iii) is not provided PUCCH-SpatialRelationInfo, and (iv) is not provided coresetPoolIndex value of 1 for any CORESET, or is provided coresetPoolIndex value of 1 for all CORESETs, in ControlResourceSet and no codepoint of a TCI field, if any, in a DCI format of any search space set maps to two TCI states REF2, then a spatial setting for a PUCCH transmission from the UE is same as a spatial setting for PDCCH receptions by the UE in the CORESET with the lowest ID on the active DL BWP of the PCell. For a PUCCH transmission over multiple slots, a same spatial setting applies to the PUCCH transmission in each of the multiple slots.

In certain embodiments, for the PUSCH power control adjustment state $f_{b,f,c}(i,l)$ for active UL BWP b of carrier f of serving cell c in PUSCH transmission occasion i, then $\delta_{PUSCH,b,f,c}(i,l)$ is a TPC command value included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI. Here, $l \in \{0,1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant.

If the UE receives a random access response message in response to a PRACH transmission or a MsgA transmission on active UL BWP b of carrier f of serving cell c, then Equation (11), as shown below can be satisfied.

$$f_{b,f,c}(0,l) = \Delta P_{rampip,b,f,c} + \delta_{msg2,b,f,c} \quad (11)$$

In Equation (11), l is equal to zero and $\delta_{msg2,b,f,c}$ is a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallbackRAR, on active UL BWP b of carrier f of serving cell c. Additionally, Equation (12) is described below $$\Delta P_{rampup,b,f,c} = \min\left\{\max\left(0, P_{CMAX,f,c} - \left(P_{O_{PUSCH},b,f,c}(0) + \alpha_{b,f,c}(0) \cdot PL_c(i) + \frac{10\log_{10}(2^\mu \cdot M_{RB,b,f,c}^{PUSCH}(i)) +}{\Delta_{TF,b,f,c}(i) + \delta_{msg2,b,f,c}}\right)\right)\right\}, \quad (12)$$

$$\Delta P_{rampuprequested,b,f,c}$$

Here, $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c If the UE transmits the PUSCH in PUSCH transmission occasion i on active UL BWP b of carrier f of serving cell c, $f_{b,f,c}(0,l) = \Delta P_{rampup,b,f,c}$, where l=0, Equation (13) below, and $\Delta P_{rampuprequested,b,f,c}$ is provided by higher layers and corresponds to the total power ramp-up requested by higher layers, $M_{RB,b,f,c}^{PUSCH}(i)$ is the bandwidth of the PUSCH resource assignment expressed in number of resource blocks, and $\Delta_{TF,b,f,c}(i)$ is the power adjustment of the PUSCH transmission in PUSCH transmission occasion i.

$$\Delta P_{rampup,b,f,c} = \qquad (13)$$

$$\min\left\{\left\{\max\left(0, P_{CMAX,f,c} - \begin{pmatrix} 10\log_{10}(2^\mu \cdot M_{RB,b,f,c}^{PUSCH}(i)) + \\ P_{O\_PUCCH,b,f,c}(0) + \alpha_{b,f,c}(0) \cdot PL_c(i) + \\ \Delta_{TF,b,f,c}(i) \end{pmatrix}\right)\right\}\right\},$$

$$\Delta P_{rampuprequested,b,f,c}$$

If a UE transmits a PUCCH on active UL BWP b of carrier f in the primary cell c using PUCCH power control adjustment state with index l, the UE determines the PUCCH transmission power $P_{PUCCH,b,f,c}(i,q_u,q_d,l)$ in PUCCH transmission occasion i as Equation (14), below.

$$P_{PUCCH,b,f,c}(i, q_u, q_d, l) = \qquad (14)$$

$$\min\left\{\begin{matrix} P_{CMAX,f,c}(i) \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F_{PUCCH}}(F) + \Delta_{TF,b,f,c}(i) + g_{b,f,c}(i,l) \end{matrix}\right\} [dBm]$$

indicated in a random access response grant corresponding to a PRACH transmission according to Type-1 random access procedure, or in a random access response grant corresponding to MsgA transmissions according to Type-2 random access procedure with RAR message(s) for fallback-RAR. Alternatively, $\delta_{b,f,c}$ is the TPC command value indicated in a successRAR corresponding to MsgA transmissions for Type-2 random access procedure. Alternatively, $\delta_{b,f,c}$ is the TPC command value in a DCI format with CRC scrambled by C-RNTI or MCS-C-RNTI that the UE detects in a first PDCCH reception in a search space set provided by recoverySearchSpaceId if the PUCCH transmission is a first PUCCH transmission after 28 symbols from a last symbol of the first PDCCH reception. Additionally, if the UE transmits PUCCH on active UL BWP b of carrier f of primary cell c, Equation (16) otherwise Equation (18) is provided by higher layers and corresponds to the total power ramp-up requested by higher layers from the first to the last preamble for active UL BWP b of carrier f of primary cell c, and $\Delta_{F\_PUCCH}(F)$ corresponds to PUCCH format 0 or PUCCH format 1.

$$G_{b,fg,c}(0, l) = \Delta P_{rampup,b,f,c} \qquad (15)$$

$$\Delta P_{rampup,b,f,c} = \min\left[\max\begin{pmatrix} 0, \\ P_{CMAX,f,c} - (P_{O\_PUCCH,b,f,c} + PL_{b,f,c}(q_d) + \\ \Delta_{F_{PUCCH}}(F) + \Delta_{TF,b,f,c}(i) + \delta_{b,f,c}) \end{pmatrix}\right] \qquad (16)$$
$$\Delta P_{rampuprequested,b,f,c}$$

$$\Delta P_{rampup,b,f,c} = \min\left[\max\begin{pmatrix} 0, \\ P_{CMAX,f,c} - (P_{O\_PUCCH,b,f,c} + PL_{b,f,c}(q_d)) \end{pmatrix}\right] \qquad (17)$$
$$\Delta P_{rampuprequested,b,f,c}$$

Here $P_{CMAX,f,c}(i)$ is the UE configured maximum output power defined in REF8, REF9, and REF10 for carrier f of primary cell c in PUCCH transmission occasion i. The expression $P_{O\_PUCCH,b,f,c}(q_u)$ is a parameter composed of the sum of a component $P_{O\_NOMINAL\_PUCCH}$, provided by p0-nominal, or $P_{O\_NOMINAL\_PUCCH}=0$ dBm if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0 \leq q_u < Q_u$. Here, $Q_u$ is a size for a set of $P_{O\_UE\_PUCCH}$ values provided by maxNrofPUCCH-P0-PerSet. The set of $P_{O\_UE\_PUCCH}$ values is provided by p0-Set. If p0-Set is not provided to the UE, $P_{O\_UE\_PUCCH}(q_u)=0$, where $0 \leq q_u < Q_u$ In certain embodiments, $PL_{b,f,c}(q_d)$ is a downlink pathloss estimate in dB calculated by the UE using RS resource index $q_d$ for the active DL BWP b of carrier f of the primary cell c. If the UE is not provided pathlossReferenceRSs or before the UE is provided dedicated higher layer parameters, the UE calculates $PL_{b,f,c}(q_d)$ using a RS resource obtained from an SS/PBCH block with same SS/PBCH block index as the one the UE uses to obtain MIB.

In Equation (15), below, where l=0 and $\delta_{b,f,c}$ one of the following. For example, $\delta_{b,f,c}$ is the TPC command value In certain embodiments, ff a UE determines that a Type 1 power headroom report for an activated serving cell is based on an actual PUSCH transmission then, for PUSCH transmission occasion i on active UL BWP b of carrier f of serving cell c, the UE computes the Type 1 power headroom report as described in Equation (18).

$$PH_{type1,b,f,c}(i,f,q_d,l) = P_{CMAX,f,c}(i) - \{P_{O\_PUUSCH,b,f,c}(j) + 10\log_{10}(2^\mu \cdot M_{RB,b,f,c}^{PUCCH}(i)) + \alpha_{b,f,c}(j) \cdot PL_{b,f,c}(q_d) + \Delta_{TF,b,f,c}(i) + f_{b,f,c}(i,l)\} \text{ [dB]} \qquad (18)$$

Here, In Equation, (18), $P_{CMAX,f,c}(i)$, $P_{O_{PUUSCH,b,f,c}}(j)$, $2^\mu \cdot M_{RB,b,f,c}^{PUCCH}(i)$, $\alpha_{b,f,c}(j)$, $PL_{b,f,c}(q_d)$, $\Delta_{TF,b,f,c}(i)$, and $f_{b,f,c}(i,l)$ are defined in REF3.

In certain embodiments, if a UE is configured with multiple cells for PUSCH transmissions, where a SCS configuration $\mu_1$ on active UL BWP $b_1$ of carrier $f_1$ of serving cell $c_1$ is smaller than a SCS configuration $\mu_2$ on active UL BWP $b_2$ of carrier $f_2$ of serving cell $c_2$, and if the UE provides a Type 1 power headroom report in a PUSCH transmission in a slot on active UL BWP $b_1$ that overlaps with multiple slots on active UL BWP $b_2$, the UE provides a Type 1 power headroom report for the first PUSCH, if any, on the first slot of the multiple slots on active UL BWP $b_2$ that fully overlaps with the slot on active UL BWP $b_1$. If a UE is configured with multiple cells for PUSCH transmissions, where a same SCS configuration on active UL BWP $b_1$ of carrier $f_1$ of serving cell $c_1$ and active UL BWP $b_2$ of carrier $f_2$ of serving cell $c_2$, and if the UE provides a Type 1 power headroom report in a PUSCH transmission in a slot on active UL BWP $b_1$, the UE provides a Type 1 power headroom report for the first PUSCH, if any, on the slot on active UL BWP $b_2$ that overlaps with the slot on active UL BWP $b_1$.

If a UE is configured with multiple cells for PUSCH transmissions and provides a Type 1 power headroom report in a PUSCH transmission with PUSCH repetition Type B having a nominal repetition that spans multiple slots on active UL BWP $b_1$ and overlaps with one or more slots on active UL BWP $b_2$, the UE provides a Type 1 power headroom report for the first PUSCH, if any, on the first slot of the one or more slots on active UL BWP $b_2$ that overlaps with the multiple slots of the nominal repetition on active UL BWP $b_1$.

For a UE configured with EN-DC/NE-DC and capable of dynamic power sharing, if E-UTRA Dual Connectivity PHR REF5 is triggered, the UE provides power headroom of the first PUSCH, if any, on the determined NR slot as described in REF3.

If a UE is configured with multiple cells for PUSCH transmissions, the UE does not consider for computation of a Type 1 power headroom report in a first PUSCH transmission that includes an initial transmission of transport block on active UL BWP $b_1$ of carrier $f_1$ of serving cell $c_1$, a second PUSCH transmission on active UL BWP $b_2$ of carrier $f_2$ of serving cell $c_2$ that overlaps with the first PUSCH transmission if (i) the second PUSCH transmission is scheduled by a DCI format in a PDCCH received in a second PDCCH monitoring occasion, and (ii) the second PDCCH monitoring occasion is after a first PDCCH monitoring occasion where the UE detects the earliest DCI format scheduling an initial transmission of a transport block after a power headroom report was triggered, or (i) the second PUSCH transmission is after the first uplink symbol of the first PUSCH transmission minus $T'_{proc,2}=T_{proc,2}$ where $T_{proc,2}$ is determined according to REF4 assuming $d_{2,1}=1$, $d_{2,2}=0$, and with $\mu_{DL}$ corresponding to the subcarrier spacing of the active downlink BWP of the scheduling cell for a configured grant if the first PUSCH transmission is on a configured grant after a power headroom report was triggered.

If the UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as described in Equation (19).

$$PH_{type1,b,f,c}(i,j,q_d,l) = \tilde{p}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [dB]} \quad (19)$$

Here, $\tilde{p}_{CMAX,f,c}(i)$ is computed assuming MPR=0 dB, A-MPR=0 dB, P-MPR=0 dB. $\Delta T_C=0$ dB. MPR, A-MPR, P-MPR and $\Delta T_C$ are defined in REF8, REF9, and REF10. The remaining parameters are defined in REF3 where $P_{O\_PUSCH,b,f,c}(j)$ and $\alpha_{b,f,c}(j)$ are obtained using $P_{O\_NOMINAL\_PUSCH,f,c}(0)$ and p0-PUSCH-AlphaSetId=0, $PL_{b,f,c}(q_d)$ is obtained using pusch-PathlossReferenceRS-Id=0, and l=0.

If a UE is configured with two UL carriers for a serving cell and the UE determines a Type 1 power headroom report for the serving cell based on a reference PUSCH transmission, the UE computes a Type 1 power headroom report for the serving cell assuming a reference PUSCH transmission on the UL carrier provided by pusch-Config. If the UE is provided pusch-Config for both UL carriers, the UE computes a Type 1 power headroom report for the serving cell assuming a reference PUSCH transmission on the UL carrier provided by pucch-Config. If pucch-Config is not provided to the UE for any of the two UL carriers, the UE computes a Type 1 power headroom report for the serving cell assuming a reference PUSCH transmission on the non-supplementary UL carrier.

Throughout the disclosure, the term "beam" or variants thereof such as "(UE) Rx beam" or "(UE) Tx beam" and so on, refer to spatial reception filter or spatial transmission filter that the UE can use for a downlink or uplink reference signal or channel. Accordingly, the UE can generate a spatial pattern to allocate/focus its transmission or reception power in a certain direction or area. A beam can refer to an analogue beam or a digital beam or a hybrid beam. The UE can generate a beam using one or multiple antenna elements/panels/arrays/sub-arrays along with the corresponding RF chain(s), phase shift operator(s), and so on. A beam or spatial filter can be based on or associated with a spatial filter that the UE used for reception or transmission of another downlink or uplink signal or channel. For example, a spatial transmission/reception for a first signal or channel can be based on a spatial relation, or a QCL assumption/relationship such as a QCL Type-D, or a TCI state such as a downlink/uplink/joint TCI state, associated with a second channel or signal, such as an SSB or CSI-RS or an SRS, or QCL assumptions of a CORESET, and so on.

Throughout the disclosure, the terms "(UE) panel(s)" and "(UE) antenna port group(s)" are used interchangeably to refer to one or multiple UE panels, wherein a panel can refer to e.g. an antenna panel, an antenna array, or an antenna sub-array and so on, consisting of a number of antenna elements. In one example, a panel can be a physical panel or a virtual panel based on a virtualization of a set of physical antenna elements to virtual transmission entities, wherein the virtualization details and schemes can be left to UE implementation and not disclosed to the gNB. In one realization, a UE panel can be a set of antennas that can generate an independent (or partially independent) spatial transmission/reception filter or beam. In one example, a panel can be a receiver "Rx" panel or a transmission "Tx" panel. In one example, the set of Rx panels and the set of Tx panels can have full or partial overlap or can be mutually exclusive. For example, the set of UE Tx panels can be a (strict) subset of the set of Rx panels. In one example, a UE panel can be identified and indicated by the network with an explicit or implicit identifier. For example, a Tx panel can be indicated by an uplink transmission entity (UTE) identifier, or an Rx panel can be indicated by a downlink transmission entity (DTE) identifier. In one example, a panel can be associated with a reference signal (RS), or an RS resource, or an RS resource set, or an RS resource group, wherein an RS can be a DL RS such as SSB or CSI-RS or an UL RS such as SRS. For example, at least for a UE in connected mode, a UE panel can be associated with an SRS resource set. In one example, a panel can be associated with a set or group of UE antenna ports. In one example, UE panels can have same or different features, such as same or different number of antenna ports, same or different number of RF chains or PAs or LNAs connected to them, same or different baseband chains connected to them, same or different output power levels such as peak/average/min/max EIRP or TRP, and so on. In one example, UE panels can be associated with different capabilities such as different (beam) switching delays or different processing capabilities or timelines, and so on. A UE can have one or multiple Rx panels and one or more Tx panels. The UE can have one or multiple activated Tx panels for transmission (e.g., with an associated PA being already "warmed up") at any point in time. In one realization, the UE can transmit with a single Tx panel at any point in time, wherein the single Tx panel is the only activated Tx panel at that time (referred to as slow panel selection), or is one out of multiple activated Tx panels at that time (referred to as fast panel selection) wherein a panel selection can be based on UE determination or gNB signaling. In another realization, the UE can transmit with two or multiple Tx panels at any point in time (referred to as simultaneous transmission on multiple panels "STxMP" or as simultaneous multi-panel transmission "SMPTx"). In yet another realization, the UE can both transmit and receive with two or multiple Tx/Rx panels at any point in time (referred to as simultaneous transmission and reception on multiple panels "STRxMP" or as simultaneous multi-panel transmission and reception "SMPTRx").

In one realization, in terms of RF functionality, a UE panel comprises a collection of TXRUs that is able to generate one analog beam (one beam may correspond to two antenna ports if dual-polarized array is used). A UE panels can constitute the same as well as different number of antenna ports, number of beams, and EIRP. No beam correspondence across different UE panels may be assumed. In some examples, each UE panel can comprise an independent unit of power control, FFT timing window, or timing advance. In some examples, the set of UE panels for UL transmission and the set of UE panels for DL receptions may be identical or at least partially shared, while in other examples, the two sets may be separate. In one example, UE's UL Tx panel(s) are assumed to be a same set or a subset of UE's DL Rx panel(s).

In one realization, a panel entity corresponds to one or more RS resources. For one RS resource, the corresponding panel entity may vary and is controlled by the UE, but a common understanding is maintained between gNB and UE about this correspondence. In one example, an RS resource can be mapped to multiple panels. In another example, the one or more RS resources may correspond to one or more RS resource set(s). For example, for CSI/beam reporting, the RS resource is an RS associated with measurement and/or reporting. In another example, for beam indication, the RS resource is a source RS for UL Tx spatial filter information.

To achieve uplink beam selection for multi-panel UEs, a set of UE panels can be activated, out of which a subset of activated UE panels can be selected for UE operation. For example, panel activation can refer to activation of L out of P available UE panel(s) at least for the purpose of DL and UL beam measurements, such as reception of DL measurement RS and transmission of SRS. Panel selection can refer to selection of 1 out of L activated UE panel(s) for the purpose of UL transmission. Fast uplink panel selection can be beneficial, for example, for MPE mitigation, UE power saving, UL interference management, supporting different configurations across panels, or UL multi-TRP operation. In some examples, the UE initiates an UL panel selection/activation. In other examples, the gNB initiates an UL panel selection/activation. In yet another example, combinations can be considered, for example, the UE performs panel selection and reports the activated UE panels to the gNB, and the gNB selects the UE panel for UL transmission.

In one realization, fast uplink panel selection can be via TCI state update, for example, based on MAC CE command only, or MAC CE command as well as a DCI format along with the necessary TCI state activation. In one example, an indication for an UL panel can be included in an UL TCI state. In one example, uplink panel selection can be based on a (previous) UE reporting, such as an UL panel indication as well as a UE reporting for a UE-panel state, for example, inactive, active for DL/UL measurement, active for DL reception only, active for UL transmission, or other combination(s) of UE-panel states.

The UE can configure its maximum output power. The configured UE maximum output power $P_{CMAX,f,c}$ for carrier f of a serving cell c is defined as that available to the reference point of a given transmitter branch that corresponds to the reference point of the higher-layer filtered RSRP measurement as specified in [TS 38.215].

The configured UE maximum output power $P_{CMAX,f,c}$ for carrier f of a serving cell c shall be set such that the corresponding measured peak EIRP $P_{UMAX,f,c}$ is within the following bounds as described in Equation (20) while the corresponding measured total radiated power $P_{TMAX,f,c}$ is bounded by $P_{TMAX,f,c} \leq TRP_{max}$.

$$P_{Powerclass} - \text{MAX}(\text{MAX}(MPR_{f,c}, A\text{-}MPR_{f,c}) + \Delta MB_{P,n},$$
$$P\text{-}MPR_{f,c}) - \text{MAX}\{T(\text{MAX}(MPR_{f,c}, A\text{-}MPR_{f,c})),$$
$$T(P\text{-}MPR_{f,c})\} \leq P_{UMAX,f,c} \leq EIRP_{max} \quad (20)$$

Here, $P_{Powerclass}$ being the UE power class, $EIRP_{max}$ being the applicable maximum EIRP, $\Delta MB_{P,n}$ being the peak EIRP relaxation, $TRP_{max}$ being the maximum TRP for the UE power class, and remaining parameters such as $MPR_{f,c}$ and $A\text{-}MPR_{f,c}$, all as specified in REF9. The Expression, maxUplinkDutyCycle-FR2, as defined in [TS 38.306], is a UE capability to facilitate electromagnetic power density exposure requirements. This UE capability is applicable to all FR2 power classes.

If the field of UE capability maxUplinkDutyCycle-FR2 is present and the percentage of uplink symbols transmitted within any 1 s evaluation period is larger than maxUplinkDutyCycle-FR2, the UE follows the uplink scheduling and can apply $P\text{-}MPR_{f,c}$.

If the field of UE capability maxUplinkDutyCycle-FR2 is absent, the compliance to electromagnetic power density exposure requirements are ensured by means of scaling down the power density or by other means.

It is noted that $P\text{-}MPR_{f,c}$ is the allowed maximum output power reduction. The UE shall apply $P\text{-}MPR_{f,c}$ for carrier f of serving cell c only for the cases described below. For UE conformance testing $P\text{-}MPR_{f,c}$ shall be 0 dB. Ensuring compliance with applicable electromagnetic power density exposure requirements and addressing unwanted emissions/self-defence requirements in case of simultaneous transmissions on multiple RAT(s) for scenarios not in scope of 3GPP RAN specifications. Additionally, ensuring compliance with applicable electromagnetic power density exposure requirements in case of proximity detection is used to address such requirements that require a lower maximum output power.

$P\text{-}MPR_{f,c}$ was introduced in the $P_{CMAX,f,c}$ equation such that the UE can report to the gNB the available maximum output transmit power. This information can be used by the gNB for scheduling decisions.

$P\text{-}MPR_{f,c}$ and maxUplinkDutyCycle-FR2 may impact the maximum uplink performance for the selected UL transmission path.

MPE P-MPR Reporting, as defined in [TS 38.306], is an optional UE capability to report $P\text{-}MPR_{f,c}$ when the reporting conditions configured by gNB are met. This UE capability is applicable to all FR2 power classes.

The tolerance $T(\Delta P)$ for applicable values of $\Delta P$ (values in dB) is specified in a Table in REF9.

Power headroom reports (PHR) are needed to provide support for power-aware packet scheduling. In NR, three types of reporting are supported: a first one for PUSCH transmission, a second one for PUSCH and PUCCH transmission in an LTE Cell Group in EN-DC (see TS 37.340

[21]) and a third one for SRS transmission on SCells configured with SRS only. In case of CA, when no transmission takes place on an activated SCell, a reference power is used to provide a virtual report. To allow network to detect UL power reduction, the PHR reports may also contain Power Management Maximum Power Reduction (P-MPR, REF9) information that UE uses to ensure UE compliance with the MPE exposure regulation for FR2, which is set for limiting RF exposure on human body. Power headroom reports are transmitted using MAC signalling.

MPE P-MPR is the power backoff to meet the MPE FR2 requirements for a Serving Cell operating on FR2. If mpe-Reporting-FR2 is configured, and mpe-ProhibitTimer is not running: (i) the measured P-MPR applied to meet FR2 MPE requirements as specified in REF9 is equal to or larger than mpe-Threshold for at least one activated FR2 Serving Cell since the last transmission of a PHR in this MAC entity; or (ii) the measured P-MPR applied to meet FR2 MPE requirements as specified in REF9 has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity. In which case the PHR is referred below to as 'MPE P-MPR report'.

The Single Entry PHR MAC CE is identified by a MAC subheader with LCID as specified in REF5. It has a fixed size and consists of two octets defined as follows. R is the Reserved bit, and set to 0. PH indicates the power headroom level. The length of the field is 6 bits. The reported PH and the corresponding power headroom levels are specified in REF5. The corresponding measured values in dB are specified in REF11.

If rive-Reporting-FR2 is configured and the Serving Cell operates on FR2, the MAC entity shall set the field P to 0 if the applied P-MPR value, to meet MPE requirements, as specified in REF9, is less than P-MPR_00 as specified in REF11 and to 1 otherwise. If mpe-Reporting-FR2 is not configured or the Serving Cell operates on FR1, this field indicates whether power backoff is applied due to power management (as allowed by P-MPR$_c$ as specified in REF8, REF9, and REF10). The MAC entity shall set the P field to 1 if the corresponding $P_{CMAX,f,c}$ field would have had a different value if no power backoff due to power management had been applied.

The field $P_{CMAX,f,c}$ indicates the $P_{CMAX,f,c}$ (as specified in REF3) used for calculation of the preceding PH field. The reported $P_{CMAX,f,c}$ and the corresponding nominal UE transmit power levels are specified in REF5. The corresponding measured values in dBm are specified in REF11.

MPE: If mpe-Reporting-FR2 is configured, and the Serving Cell operates on FR2, and if the P field is set to 1, the field MPE indicates the applied power backoff to meet MPE requirements, as specified in REF9. The MPE field indicates an index to Table 6.1.3.8-3 of REF5 (shown in Table (2), below) and the corresponding measured values of P-MPR levels in dB are specified in REF11. The length of the field is 2 bits. If mpe-Reporting-FR2 is not configured, or if the Serving Cell operates on FR1, or if the P field is set to 0, R bits are present instead. Table (2), shows the Effective power reduction for MPE P-MPR.

TABLE 2

| MPE | Measured P-MPR value |
|---|---|
| 0 | P-MPR_00 |
| 1 | P-MPR_01 |

TABLE 2-continued

| MPE | Measured P-MPR value |
|---|---|
| 2 | P-MPR_02 |
| 3 | P-MPR_03 |

Table 10.1.26.1-1 of REF11 defines the FR2 P-MPR report mapping. This is shown in Table (3), below, which describes mapping of FR2 P-MPR.

TABLE 3

| Reported value | Measured quantity value | Unit |
|---|---|---|
| P-MPR_00 | 3 ☐ PMP-R < 6 | dB |
| P-MPR_01 | 6 ☐ PMP-R < 9 | dB |
| P-MPR_02 | 9 ☐ PMP-R < 12 | dB |
| P-MPR_03 | PMP-R ≥ 12 | dB |

MPE reporting can also apply to multiple-entry PHR MAC CE, which is usually used for CA operation.

MPE mitigation can refer to minimizing the UL coverage loss due to the UE having to meet the MPE regulation. For MPE mitigation, one or more of the following operations may be needed: MPE event detection by the UE (or the gNB); UE reporting associated with an MPE and/or a potential/anticipated MPE event if the UE selects a certain UL spatial resource, e.g., corresponding to DL or UL RS; gNB signaling in response to the reported MPE event, such as indication of an alternative beam/panel selection, and UE behavior after receiving the gNB signaling, such as UL transmission from the alternative beam or panel.

A UE report of an MPE event can include an MPE metric along with an indication of a beam/panel on which the MPE event has occurred or is anticipated to occur. An MPE metric can include one or more of the following: P-MPR, virtual PHR, L1-RSRP/L1-SINR with and without MPE effect, estimated max UL RSRP, and so on. In some examples, an MPE metric can be beam-/panel-level or beam-/panel-specific. A beam/panel indication for an MPE event can include one or more of the following: SSB resource indicator (SSBRI), CRI, UL TCI state, joint TCI state, SRS resource set, PUCCH resource group, explicit panel ID, and so on. In some examples, if a UE initiates an MPE report or sends the MPE report based on an event/condition that the UE determines, the UE expects an acknowledgement from the gNB about reception of the UE MPE report. In one example, if the UE sends a single MPE report for multiple beams, the UE can use differential MPE reporting, such as an indication of differential MPE metrics in the same report.

MPE mitigation can be based on fast UL panel selection, initiated by the UE or indicated by the gNB. In one example, a fast UL panel selection can be based on a TCI states update, such as by a DCI format or a MAC CE command for beam indication.

Embodiments in the present disclosure are described with reference to MPE mitigation for FR2 but same mechanisms can be applied for handling and mitigation of any regulatory requirement(s) or network enforced limitation(s) that restrict(s) a transmission power for a UE or prevents the UE from a transmission in any frequency band/range, such as specific absorption rate (SAR) requirements in FR1, or MPE-like requirements for frequency bands/ranges beyond 52.6 GHz, such as FR2a, FR3, FR4, and so on. Such requirements or limitations can be towards a certain direction or in a certain area, for example, corresponding to a beam/panel, such as a UE Tx or Rx beam/panel, or associated with a downlink or uplink reference signal, such as an SSB index or an "SSB area", or a CSI-RS/SRS resource or resource set. In such cases and scenarios, references to "MPE" and variants thereof, such as "MPE state" or "MPE level" or "MPE threshold" and so on, can be replaced with the corresponding terms for the parameter/event that describes the requirements or limitations.

Various embodiments and enhancement examples described throughout the present disclosure can be applied to MPE handling for UL/SL channels or signals beyond PRACH, including before or after RRC connection, such as for PUSCH, PUCCH, SRS, PSSCH, PSFCH, and so on.

The following embodiments of the present disclosure, denoted as E-0, describe MPE determination for PRACH.

In certain embodiments, a UE (such as the UE 116) can determine an MPE issue or event for an UL transmission such as PRACH based on an MPE state or an MPE level, wherein the RSRP and the MPE state/level can be specific to a UE Tx beam-/panel. The UE can use various methods to determine an MPE issue for an UL transmission such as PRACH, such as an applicable P-MPR, an actual or virtual PH such as a PRACH PH, or a modified RSRP or SINR.

The MPE state, or exposure state, can refer to one attribute from a set of attributes such as "without MPE (issue)" or "with MPE (issue)" or "excessive/high/large MPE (issue)" or "intermediate MPE (issues)" or "small/low/mild MPE (issues)" and so on, wherein the attribute describes whether or not or qualitatively how much a transmission power for the PRACH as determined by a legacy PRACH power control formula would exceed regulatory limits, for example in terms of MPE, and would then require application of power back-off such as P-MPR. The MPE state can be beam-/panel specific, such as an MPE state corresponding to a UE Tx beam or a UE Tx panel. For example, a UE can have a MPE state as "with MPE issue" for PRACH transmission using a first Tx beam/panel, while the UE can have a MPE state as "without MPE issue" for PRACH transmission using a second Tx beam/panel. Herein, the first and second beams can correspond to a same DL RS, such as a same SSB or a same CSI-RS associated with the PRACH, or can correspond to different DL RSs. In such cases, an MPE state can be associated with an indication for the beam/panel, such as an SSBRI or a CRI or an ID for a panel entity, and so on. In one example, the UE determines an MPE state based on a comparison of an MPE level (as described next) with a threshold. For example, when an MPE level is below a threshold, the UE determines a first MPE state, and when the MPE level is above the threshold, the UE determines a second MPE state. The threshold can be predetermined in the specifications for system operation or can be provided by higher layer information such as by system information.

The MPE level can refer to a value, e.g., in dB, that captures a level of an MPE issue, such as a value by which a PRACH transmission power as determined by a legacy PRACH power control formula or without considering any (regulatory) restrictions would exceed regulatory limits. For example, an MPE level can correspond to a power back-off value such as a P-MPR value that a UE needs to apply to meet the regulatory limits. The MPE level can be beam-/panel specific, such as an MPE level corresponding to a UE Tx beam or a UE Tx panel. For example, a UE can have a MPE level equal to X dB for PRACH transmission using a first Tx beam/panel and a MPE level equal to Y dB for PRACH transmission using a second Tx beam/panel, wherein the values X and Y can be different. Herein, the first and second beams can correspond to a same DL RS, such as a same SSB or a same CSI-RS associated with the PRACH, or can correspond to different DL RSs. In such cases, an MPE level can be associated with an indication for the beam/panel, such as an SSBRI or a CRI or an ID for a panel entity, and so on. In one example, a beam-/panel-specific MPE level can correspond to a power back-off value such as a P-MPR value that a UE needs to apply to meet the regulatory limits in a certain direction associated with the beam/panel.

In one example, the MPE level is used only when a UE determines MPE issues for a beam/panel, such as when the UE determines an MPE state for a beam/panel to be "with MPE issue" or "excessive/high/large MPE (issue)" or "intermediate MPE (issues)"; a reference value such as zero (or minus infinity dB) can be used as MPE level otherwise.

In another example, the MPE level can be used also when a UE determines small/no MPE issues for a beam/panel, such as when the UE determines an MPE state for a beam/panel to be "without MPE issue" or with "small MPE (issues)", wherein the MPE can be such that, after power reduction, the beam/panel remains the preferred one for PRACH transmission. In the latter case, the MPE level refers to a value by which a transmission power for the PRACH as determined by a legacy PRACH power control formula is smaller from the regulatory limits and experiencing an MPE issue. In such cases, the MPE level can be a negative number.

In one example, the MPE level can correspond to a "virtual PRACH power headroom". For a PRACH transmission occasion i on active UL BWP b of carrier f of serving cell c, the UE computes the virtual Type 4 power headroom (PH) as described in Equation (21), below.

$$PH_{type4,b,f,c}(i) = \tilde{P}_{CMAX,f,c}(i) - \{P_{PRACH,target,f,c} + PL_{b,f,c}\} \text{ [dB]} \quad (21)$$

In Equation (22), $\tilde{P}_{CMAX,f,c}(i)$ is a reference UE configured maximum output power. In one example, $\tilde{P}_{CMAX,f,c}(i)$ is computed assuming only P-MPR=0 dB, while the UE determines the remaining parameters as in the legacy PRACH power control and PH formula. In another example, $\tilde{P}_{CMAX,f,c}(i)$ is computed assuming MPR=0 dB, A-MPR=0 dB, P-MPR=0 dB, and $\Delta T_C$=0 dB, wherein MPR, A-MPR, P-MPR and $\Delta T_C$ are defined in REF8, REF9, and REF10, and the UE determines the remaining parameters as in the legacy PRACH power control and PH formula. In yet another option, $\tilde{P}_{CMAX,f,c}(i)$ is computed assuming MPR=0 dB, A-MPR=0 dB, and $\Delta T_C$=0 dB, while P-MPR can have a possibly non-zero value as (actually) determined by the UE for the Msg3/A PUSCH transmission In one example, the UE determines the parameters in the above virtual PRACH PH in a beam-/panel-specific manner, such as beam-/panel-specific PRACH target reception power (including any power ramp-up value), or beam-/panel-specific pathloss (PL) value. The virtual PRACH PH can take a positive or negative value. Unlike other power headroom types, the UE may not report the virtual PRACH PH to the gNB, and only use it for UE-specific procedures such as MPE mitigation for PRACH transmission.

In another example, the MPE level can correspond to an "actual PRACH power headroom". For a PRACH transmission occasion i on active UL BWP b of carrier f of serving cell c, the UE computes the actual Type 4 power headroom (PH) as described in Equation (22), below.

$$PH_{type4,b,f,c}(i) = P_{CMAX,f,c}(i) - \{P_{PRACH,target,f,c} + PL_{b,f,c}\} \text{ [dB]} \quad (22)$$

In Equation (22), $P_{CMAX,f,c}(i)$ is a UE configured maximum output power as defined in REF8, REF9, and REF10. In particular, when determining $P_{CMAX,f,c}(i)$, the UE applies the actual P-MPR power back-off term as necessary to meet regulatory requirements such as MPE. Therefore, the $P_{CMAX,f,c}(i)$ value reflects the MPE situation at the UE for the corresponding beam/panel. In one example, the UE determines the parameters in the above actual PRACH PH in a beam-/panel-specific manner, such as beam-/panel-specific PRACH target reception power (including any power ramp-up value), or beam-/panel-specific pathloss (PL) value. The actual PRACH PH can take a positive or negative value. Unlike other power headroom types, the UE may not report the actual PRACH PH to the gNB, and only use it for UE-specific procedures such as MPE mitigation for PRACH.

When determining an MPE level based on actual or virtual PRACH PH, in one option, the UE determines the MPE level separately for the initial PRACH transmission and for any PRACH retransmissions, so that MPE is separately handled for each PRACH transmission. In another option, the UE determines the MPE level only for the initial PRACH transmission, and applies the determined MPE level, and any corresponding behaviors, for all PRACH retransmissions until the UE receives a random access response. In particular, any power ramping is not considered/applied when determining MPE levels via actual/virtual PRACH PH.

For example, an MPE level for initial/random access can correspond to actual or virtual Type-1 power headroom (PH), or a modified variation thereof, that is computed for a Msg3/A PUSCH or any later PUSCH transmission (before dedicated higher layer configuration). For example, a pathloss reference when determining a Type-1 PH can be based on a same SSB that the UE used for a corresponding PRACH transmission, or based on a different SSB that the UE determines for independent mitigation of MPE for the Msg3/A PUSCH transmission, as described in Embodiment E-1-0, below. In another example, a pathloss value can be Rx beam-/panel-specific, so taking possibly multiple different values for a same SSB corresponding to multiple Rx beams/panels. For a virtual Type-1 PH for Msg3/A PUSCH, in one option, $P_{CMAX,f,c}(i)$ is computed assuming MPR=0 dB, A-MPR=0 dB, P-MPR=0 dB, and $\Delta T_C$=0 dB. In another option, $\tilde{P}_{CMAX,f,c}(i)$ is computed assuming only P-MPR=0 dB, with other power back-off terms having possibly non-zero value as (actually) determined by the UE for the Msg3/A PUSCH transmission. In yet another option, $\tilde{P}_{CMAX,f,c}(i)$ is computed assuming MPR=0 dB, A-MPR=0 dB, and $\Delta T_C$=0 dB, while P-MPR can have a possibly non-zero value as (actually) determined by the UE for the Msg3/A PUSCH transmission.

In one example, a UE may report an actual or virtual PRACH PH or a Type-1 PH such as a Type-1 PH associated with a Msg3/A PUSCH, as part of MPE reporting during initial/random access, for example as described in Embodiment E-1-3, below.

In another realization, the MPE level can correspond to a modified signal quality such as a modified RSRP or modified SINR. An RSRP or SINR can refer to an L1/L3-filtered signal quality such as L1-RSRP, or L1-SINR, or L3-filtered RSRP or SINR. The RSRP or SINR can refer to a reference signal such as SSB or CSI-RS or SRS. The RSRP or SINR can be beam-/panel-specific, for example a first RSRP or SINR measured on/by a first UE beam/panel, and a second RSRP or SINR measured on/by a second UE beam/panel, wherein the first and second measurement values can be different even for a same reference signal. A modification of RSRP or SINR can refer to an operation to combine a measured RSRP or SINR with a power-back off term such as a P-MPR that the UE needs to apply to meet the regulatory requirements such as MPE. For example, the UE can determine a modified signal quality by addition or subtraction of a measured signal quality such as RSRP or SINR with an applicable P-MPE or power headroom (PH) value. For example, the UE can operate with mdf-RSRP=RSRP+P-MPR, or mdf-RSRP=RSRP−P-MPR, or in general, mdf-RSRP=RSRP+MPE, or mdf-RSRP=RSRP−MPE, or mdf-RSRP=RSRP+offset_MPE, or mdf-RSRP=RSRP−offset_MPE, wherein "mdf-RSRP" stands for the modified RSRP, and MPE can refer to any parameter that reflects the MPE level such as actual or virtual PH value and so on, and wherein offset_MPE stands for an offset value to capture the MPE effect, for example, based on the applicable P-MPR or PH value and so on. In another example, the UE can determine a modified RSRP or SINR by scaling, multiplication, or division of a measured signal quality such as RSRP or SINR with an applicable P-MPR or PH value, or with a scaling factor that is based on the applicable P-MPR or PH value. For example, mdf-RSRP=RSRP*a_MPE, wherein a_MPE stands for the scaling factor to capture the MPE effect, for example, based on the applicable P-MPR or PH value. Similar operations can be defined for SINR and other channel/signal quality metrics. The operation can be in the linear or dB scale. In one example, a modified RSRP or SINR can represent an UL RSRP estimate corresponding to the received signal/channel quality at the gNB.

In one example, the UE determines a modified RSRP based on an offset to a DL RSRP, or a scaling of DL RSRP, wherein the UE determines the offset or scaling factor based on a mapping. For example, higher layer information such as system information can provide a mapping among a set of MPE ranges and a set of offset values or scaling factors. For example, the mapping can be predetermined the specifications for system operation. For example, the UE applies a first values for the offset or scaling factor when the MPE level is in a first MPE range, and applies a second value for the offset or scaling factor when the MPE level is in a second MPE range.

In one example, an MPE level can be based on multiple values corresponding to multiple MPE metrics such as a pair or combination of several MPE metrics and corresponding values. For example, an MPE level can include both a P-MPR or PH and a (modified) RSRP.

In one example, the UE can use (or report) an MPE range instead of an MPE level. For example, the UE can be provided with N=4 MPE ranges, such as P-MPR ranges or power headroom ranges or (modified) RSRP ranges and so on. Herein, the MPE ranges can be predetermined in the specifications for the system operation or can be provided by higher layers such as by system information. For a measured/determined MPE level, the UE determines an MPE range from the multiple MPE ranges that includes the measured/determined MPE level. In one example, a UE behavior for MPE mitigation, such as those considered throughout the present disclosure, can be based on boundary values or min/max/median/average values of a corresponding MPE range. In another example, when the UE needs to report an MPE, the UE can report an index for an MPE range, or can report a representative value such as min/max/median/average values of a corresponding MPE range.

The following embodiments of the present disclosure, denoted as E-1, describe beam selection in presence of MPE.

This is described in the following examples and embodiments, such as those of FIGS. 6-10D.

Figure 6:
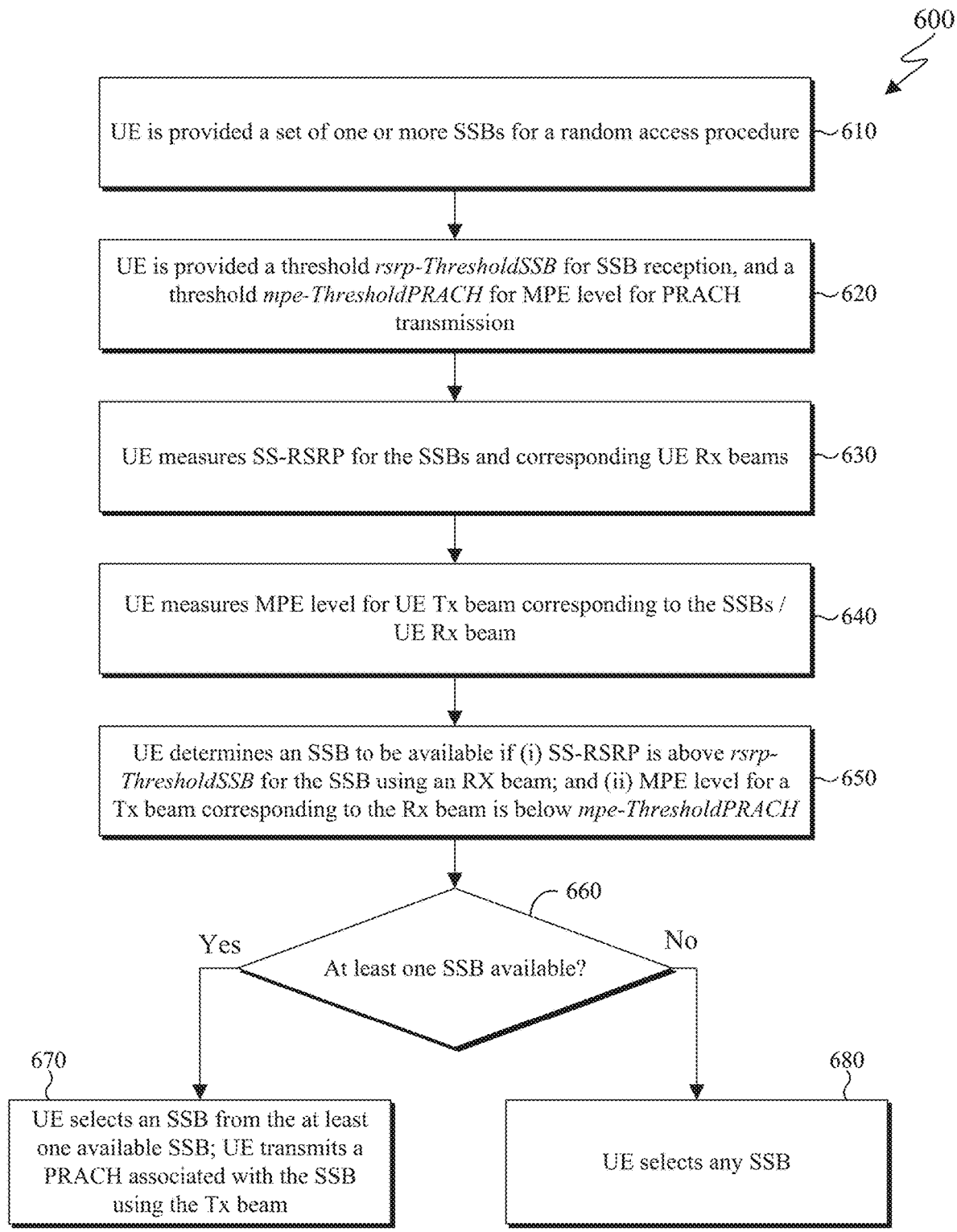
FIGS. 6-7 illustrate example methods for physical random access channel (PRACH) beam selection with considering a maximum permissible exposure (MPE) constraint according to embodiments of the present disclosure.
Figure 7:
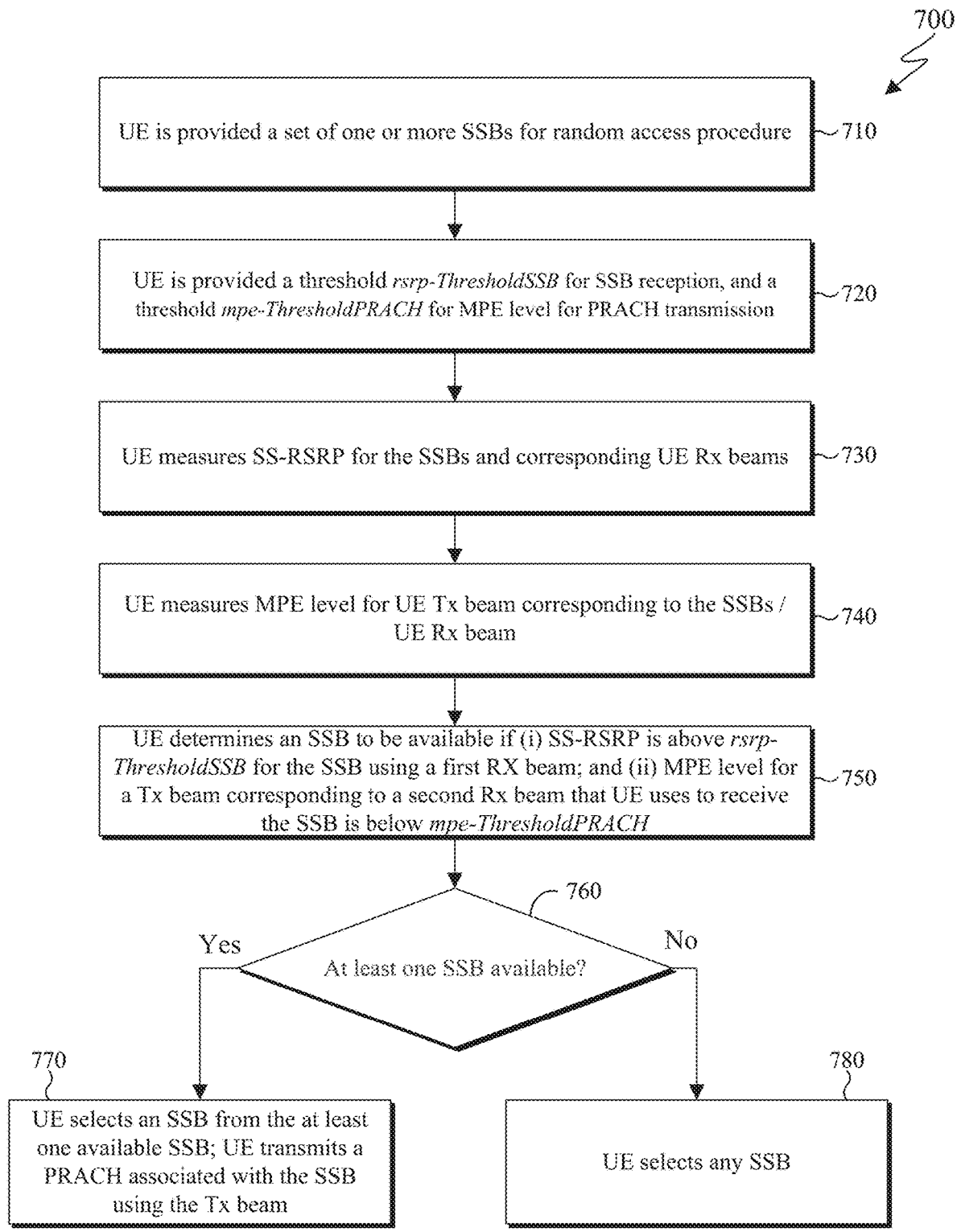
Figure 8:
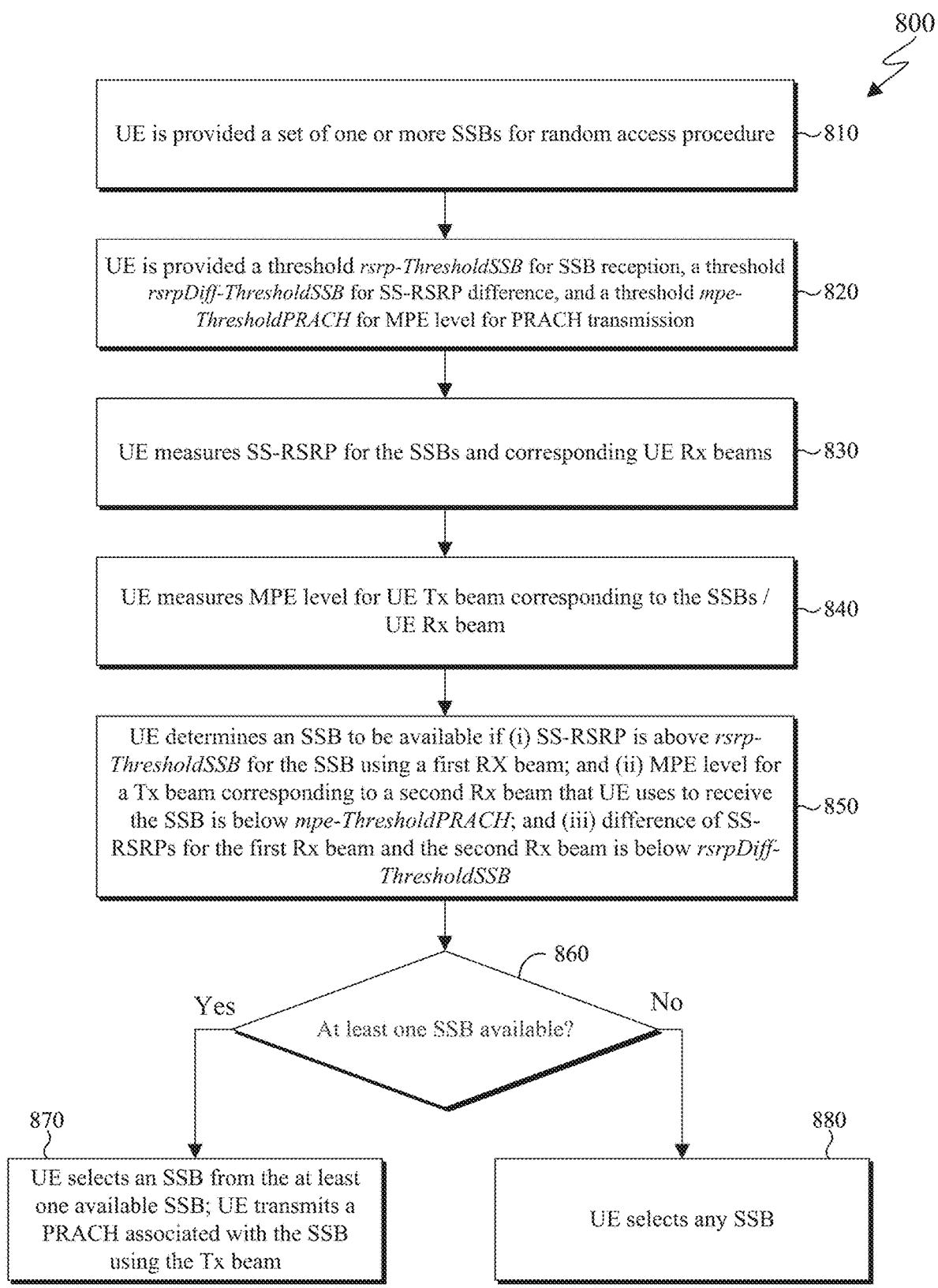
FIG. 8 illustrates an example method for PRACH beam selection when taking MPE into account according to embodiments of the present disclosure.
Figure 9:
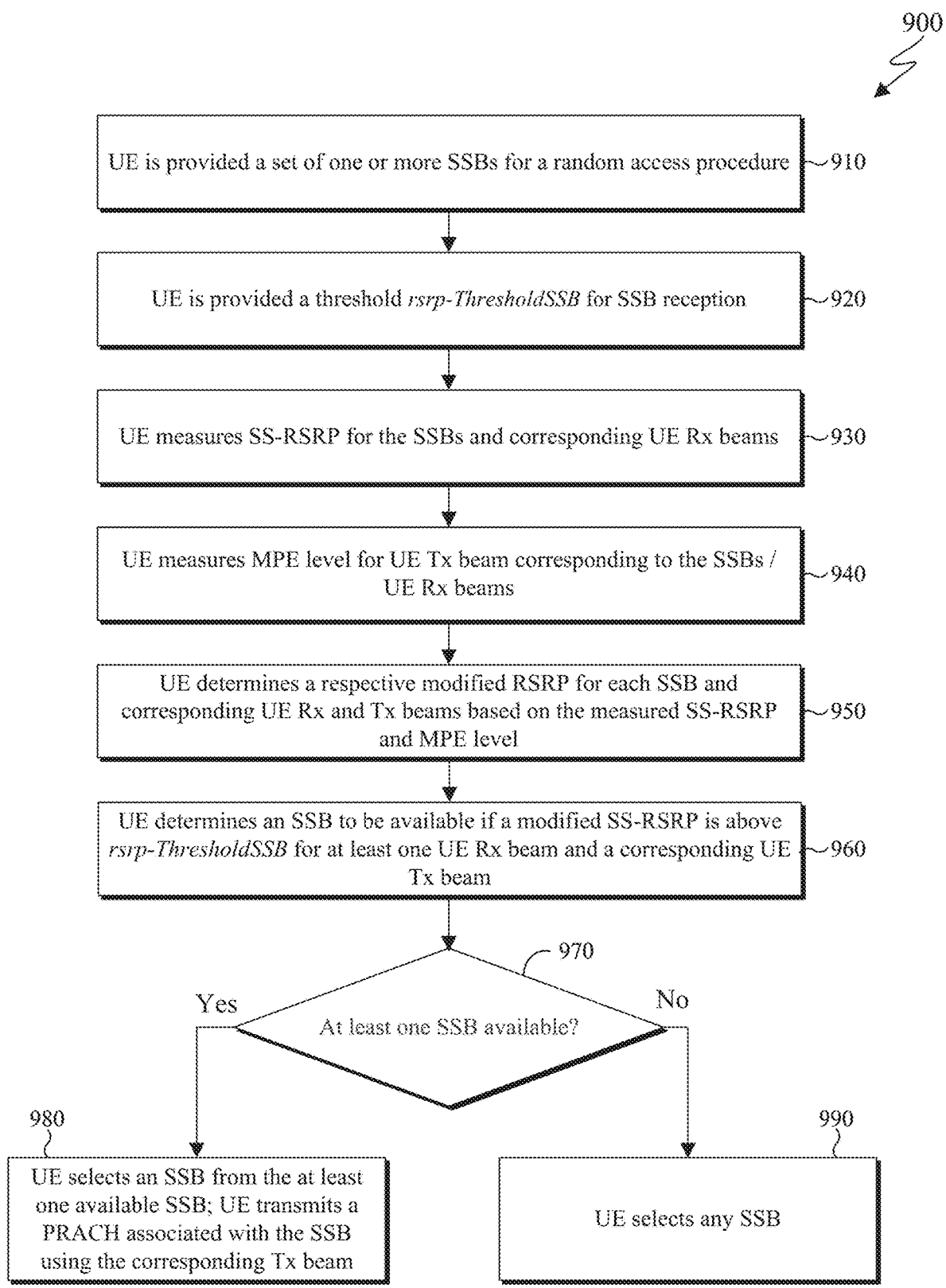
FIG. 9 illustrates an example method for PRACH beam selection when reference signal received power (RSRP) condition and the MPE constrain are considered jointly according to embodiments of the present disclosure.

FIGS. 6-7 illustrate example methods 600 and 700, respectively, for PRACH beam selection with considering a MPE constraint according to embodiments of the present disclosure. FIG. 8 illustrates an example method 800 for PRACH beam selection when taking MPE into account according to embodiments of the present disclosure. FIG. 9 illustrates an example method 900 for PRACH beam selection when RSRP condition and the MPE constrain are considered jointly according to embodiments of the present disclosure. FIGS. 10A-10D illustrate example scenarios 1000, 1010, 1020, and 1030, respectively, for beam selection according to embodiments of the present disclosure.

The steps of the method 600 of FIG. 6, the method 700 of FIG. 7, the method 800 of FIG. 8, and the method 900 of FIG. 9 can be performed by any of the UEs 111-119 of FIG. 1, such as the UE 116 of FIG. 3. The methods 600-900 and the diagrams 1000-1030 are for illustration only and other embodiments can be used without departing from the scope of the present disclosure.

It is noted that the embodiments are described with reference to PRACH transmission but same mechanisms are applicable to other transmissions associated with a random access procedure such as a Msg3 transmission or retransmission. A UE can determine a DL RS, such as an SSB or CSI-RS, associated with a PRACH based on an RSRP for reception of the DL RS and an MPE state/level for the PRACH transmission associated with the DL RS, wherein the RSRP and the MPE state/level can be specific to a UE Tx beam-/panel.

In certain embodiments, a UE (such as the UE 116) can determine a DL RS, such as an SSB or CSI-RS, associated with a PRACH based on one or more of the following: (i) Comparison of beam-/panel-specific RSRPs with a threshold; (ii) difference among beam-/panel-specific RSRPs; and (iii) difference of MPE levels among UE Tx beams/panels.

RSRP can refer to an SSB RSRP (also referred to as SS-RSRP) or a CSI-RS RSRP (also referred to as CSI-RSRP). Multiple beam-/panel-specific RSRPs can correspond to a same DL RS or different DL RS s, such as a same SSB or different SSBs. RSRPs can refer to a same UE panel or different UE panels.

In one approach, denoted as a first approach, if at least one of the SSBs is available with: (i) SS-RSRP above rsrp-ThresholdSSB for at least one UE Rx beam/panel that the UE can use to receive the SSB; and (ii) MPE level below a threshold for at least one UE Tx beam/panel corresponding to a UE Rx beam/panel from the at least one UE Rx beam/panel, then the UE (such as the UE 116) selects an SSB from the at least one of the SSBs for transmission of PRACH (or other UL transmissions during initial/random access before receiving dedicated higher layer configuration). Otherwise, the UE can select any SSB. The threshold for MPE level can be a predetermined value, such as zero, provided in the specifications for system operation, or can be a parameter such as mpe-ThresholdPRACH provided by higher layer signaling such as by system information. In one example, a parameter mpe-ThresholdPRACH can be same as or can have a same value as a parameter mpe-Threshold used for MPE P-MPR reporting. In another example, the parameter mpe-ThresholdPRACH can be configured separately from the parameter mpe-Threshold used for MPE P-MPR reporting.

It is noted that the first approach can apply in several scenarios. In one scenario (referred to as scenario "S1" and described in FIG. 10A), the UE has a UE Tx beam without MPE issues that corresponds to a best UE Rx beam for reception of the best SSB, namely, with highest SS-RSRP that is above the threshold configured by rsrp-ThresholdSSB. In one example, the UE Tx beam and the best UE Rx beam correspond to a same UE panel. In this scenario, the UE transmits a PRACH corresponding to the first/best SSB using the UE Tx beam. If there are multiple such UE Tx beams, the UE can use any UE Tx beam from the multiple such UE Tx beams for PRACH transmission.

In another scenario (referred to as scenario "S2" and described in FIG. 10B) for the first approach, the UE has a first Tx beam with MPE issues that corresponds to the best UE Rx beam for reception of the best SSB, namely, the SSB with highest SS-RSRP that is above the threshold configured by rsrp-ThresholdSSB. However, the UE has a second Tx beam without MPE issues that corresponds to a second UE Rx beam for reception of the same best SSB with a SS-RSRP that is still above the threshold configured by rsrp-ThresholdSSB, but smaller than the highest SS-RSRP. In one example, the second Tx beam can correspond to a same UE panel as or a different UE panel from the first Tx beam or the best UE Rx beam. In this scenario, the UE transmits a PRACH corresponding to the first/best SSB using the second Tx beam. If there are multiple such second Tx beams, the UE can use any UE Tx beam from the multiple such second Tx beams for PRACH transmission.

In yet another scenario (referred to as scenario "S3" and described in FIG. 10C) for the first approach, the UE has a first Tx beam with MPE issues that corresponds to the best UE Rx beam for reception of a first/best SSB, namely, with highest SS-RSRP that is above the threshold configured by rsrp-ThresholdSSB. In addition, the UE has a second Tx beam without MPE issues that corresponds to a second Rx beam for reception of the same first/best SSB, for example with a second highest SS-RSRP for the first/best SSB that is below the threshold configured by rsrp-ThresholdSSB. The UE also has a third UE Tx beam without MPE issues that corresponds to a third UE Rx beam for reception of a second SSB, namely, with a third SS-RSRP that is smaller than the first SS-RSRP, but is above the threshold configured by rsrp-ThresholdSSB. In one example, the third UE Tx beam can correspond to a same UE panel as or a different UE panel from the first Tx beam or the best UE Rx beam. In this scenario, the UE transmits a PRACH corresponding to the second SSB and using the third UE Tx beam. If there are multiple such third Tx beams, the UE can use any Tx beam from the multiple such third Tx beams for PRACH transmission. The UE may not transmit a PRACH corresponding to the first SSB. It is noted that, a legacy UE can select an SSB among the first SSB and the second SSB, but a UE under the first approach may not select the second SSB.

The method 600 of FIG. 6 describes an example procedure for the first approach for PRACH beam selection when considering an MPE constraint In step 610, a UE (such as the UE 116) is provided a set of one or more SSBs for random access procedure. In step 620, the UE is provided a threshold rsrp-ThresholdSSB for SSB reception, and a threshold mpe-ThresholdPRACH for MPE level for PRACH transmission. For example, the information can be provided by system information.

In step 630, the thresholds can be provided by higher layer configuration or can be predetermined in the specifications for system operation. The UE measures SS-RSRP for the SSBs and corresponding UE Rx beams. In step 640, the UE measures MPE level for UE Tx beam corresponding to the SSBs/UE Rx beam. In step 650, the UE determines an SSB to be available if (i) SS-RSRP is above rsrp-ThresholdSSB for the SSB using an RX beam; and (ii) MPE level for a Tx beam corresponding to the Rx beam is below mpe-ThresholdPRACH.

In step 660, the E determines whether at least one SSB is available. In response to at least one SSB being available (as determined in step 660), the UE in step 670 selects an SSB from the at least one available SSB, and transmits a PRACH associated with the SSB using the Tx beam. In response to no SSB being available (as determined in step 660), the UE in step 680 selects any SSB for PRACH association.

In another approach, denoted as the second approach, if at least one of the SSBs is available with (i) SS-RSRP above rsrp-ThresholdSSB for a first Rx beam/panel that the UE can use to receive the SSB; and (ii) MPE level below a threshold for at least one UE Tx beam/panel corresponding to a second Rx beam/panel that the UE can use to receive the same SSB, then the UE selects an SSB from the at least one of the SSBs. Otherwise, the UE selects any SSB. Unlike the first approach, the UE need not use a UE Tx beam for PRACH transmission corresponding to the first Rx beam that the UE used for SSB reception and achieved an SS-RSRP above rsrp-ThresholdSSB. For example, a second Rx beam corresponding to the UE Tx beam with MPE level below the threshold can have an SS-RSRP below rsrp-ThresholdSSB.

Similar to the first approach, the threshold for MPE level can be a predetermined value, such as zero, provided in the specifications for system operation, or can be a parameter such as mpe-ThresholdPRACH provided by higher layer signaling.

For example, in the same scenario "S3" (and described in FIG. 10C) as above, unlike the UE behavior described earlier under the first approach, the UE can transmit a PRACH corresponding to the first SSB using the second Tx beam, per the second approach. In such a case, the RSRP requirement for the Rx beam receiving the SSB is decoupled from MPE requirement for the Tx beam transmitting the PRACH, as long as the Tx beam corresponds to the same SSB. In particular, the UE Rx beam for SSB reception can be different from the UE Tx beam for PRACH transmission. The UE can use power control enhancements to compensate for the reduced signal quality/lower RSRP of the Rx beam corresponding to the second Tx beam. The UE can be allowed to transmit a PRACH corresponding to the second SSB using the third UE Tx beam.

In another scenario (referred to as scenario "S4" and described in FIG. 10D) for the second approach, the UE has a first Tx beam with MPE issues that corresponds to the best UE Rx beam for reception of a first/best SSB, namely, with highest SS-RSRP that is above the threshold configured by rsrp-ThresholdSSB. In addition, the UE has a second Tx beam without MPE issues that corresponds to a second Rx beam for reception of the same first/best SSB, for example, with a second highest SS-RSRP for the first/best SSB, but below the threshold configured by rsrp-ThresholdSSB. Moreover, all other/third UE Tx beams without MPE issues that correspond to a different/second SSB achieve a third SS-RSRP (using a corresponding third UE Rx beam) that is below the threshold configured by rsrp-ThresholdSSB. A legacy UE would select the first SSB in association with the PRACH transmission. An enhanced UE with a UE behavior as in the first approach can select any SSB from among the first SSB and all other second SSB(s). An enhanced UE with a UE behavior as in the second approach selects the first SSB, since the first Rx beam achieves an SS-RSRP above the threshold configured by rsrp-ThresholdSSB, and the second Tx beam associated with the first SSB has no MPE issues.

Such distinction between the UE Rx beam for SSB reception and the UE Tx beam for PRACH transmission can also apply to scenarios in which the beam-specific SS-RSRP is above rsrp-ThresholdSSB. For example, in Scenario "S2" as described earlier, the UE can transmit the PRACH using the second Tx beam that meets the MPE requirement and the UE can continue to receive the SSB using the first Rx beam that has a higher SS-RSRP. Although such separation of the UE Tx beam from the UE Rx beam can be up to UE implementation, the UE can use power control enhancements to compensate for the reduced signal quality/lower RSRP of the Rx beam corresponding to the second Tx beam. Such power control enhancements would therefore consider the separation of UE Rx beam from UE Tx beam.

The method 700, as illustrated in FIG. 7 describes the second approach for PRACH beam selection when considering an MPE constraint.

In step 710, a UE (such as the UE 116) is provided a set of one or more SSBs for a random access procedure. In step 720, the information can be provided by higher layer configuration such as by system information. The UE is provided a threshold rsrp-ThresholdSSB for SSB reception, and a threshold mpe-ThresholdPRACH for MPE level for PRACH transmission. In step 730, the thresholds can be provided by higher layer configuration or can be predetermined in the specifications for system operation. The UE measures SS-RSRP for the SSBs and corresponding UE Rx beams. In step 740, the UE measures MPE level for UE Tx beam corresponding to the SSBs/UE Rx beam. In step 750, the UE determines an SSB to be available if (i) SS-RSRP is above rsrp-ThresholdSSB for the SSB using a first RX beam; and (ii) MPE level for a Tx beam corresponding to a second Rx beam that UE uses to receive the SSB is below mpe-ThresholdPRACH.

In step 760, the UE determines whether at least one SSB is available. In response to at least one SSB being available (as determined in step 760), the UE in step 770 selects an SSB from the at least one available SSB, and transmits a PRACH associated with the SSB using the Tx beam. Alternatively, in response to no SSB being available (as determined in step 760), the UE in step 780 selects any SSB for PRACH association.

In another approach, denoted as the third approach, if at least one of the SSBs is available with: (i) SS-RSRP above rsrp-ThresholdSSB for a first Rx beam/panel that the UE can use to receive the SSB; (ii) MPE level below a threshold for a UE Tx beam/panel corresponding to a second Rx beam/panel that the UE can use to receive the same SSB; and (iii) Difference of SS-RSRP for the first Rx beam/panel from SS-RSRP for the second Rx beam/panel smaller than a threshold, then the UE selects an SSB from the at least one of the SSBs. Otherwise, the UE selects any SSB.

Unlike the first approach and similar to the second approach, the UE need not use a UE Tx beam for PRACH transmission corresponding to the UE Rx beam that the UE used for SSB reception and achieved an SS-RSRP above rsrp-ThresholdSSB. For example, a UE Rx beam corresponding to the UE Tx beam with MPE level below the threshold can have an SS-RSRP below rsrp-ThresholdSSB. However, unlike the second approach, another threshold is applied so that the UE ensures the SS-RSRP for the UE Rx beam corresponding to the UE Tx beam without MPE issue is not too low. Such restriction can be beneficial, for example, in scenarios where the UE cannot compensate the very low SS-RSRP of the SSB, even using enhanced power control mechanisms. Therefore, rather than a specification mandate for such SSB selection, the UE is allowed to select any (other) SSB, for example based on other criteria per UE implementation decisions. In that sense, the third approach can be considered as a variation or enhancement of the second approach.

The method 800 as illustrated in FIG. 8 describes an example procedure for the second approach for PRACH beam selection when taking MPE constraint into account.

In step 810, a UE (such as the UE 116) UE is provided a set of one or more SSBs for a random access procedure. In step 820, the information can be provided by higher layer configuration such as by system information. The UE is provided a threshold rsrp-ThresholdSSB for SSB reception, a threshold rsrpDiff-ThresholdSSB for SS-RSRP difference, and a threshold mpe-ThresholdPRACH for MPE level for PRACH transmission. In step 830, the thresholds can be provided by higher layer configuration or can be predetermined in the specifications for system operation. The UE measures SS-RSRP for the SSBs and corresponding UE Rx beams. In step 840, the UE measures MPE levels for UE Tx beams corresponding to the SSBs/UE Rx beams. In step 850, the UE determines an SSB to be available if (i) SS-RSRP is above rsrp-ThresholdSSB for the SSB using a first RX beam; and (ii) MPE level for a Tx beam corresponding to a second Rx beam that UE uses to receive the SSB is below mpe-ThresholdPRACH; and (iii) difference of SS-RSRPs for the first Rx beam and the second Rx beam is below rsrpDiff-ThresholdSSB.

In step 860, the UE determines whether at least one SSB is available. In response to at least one SSB being available (as determined in step 860), the UE in step 870 selects an SSB from the at least one available SSBs and transmits a PRACH associated with the SSB using the Tx beam. Alternatively, in response to no SSB being available (as determined in step 860), the UE in step 880 selects any SSB for PRACH association.

Variations of the second or third approach can be considered where the UE (such as the UE 116) can prioritize SSBs based on the corresponding SS-RSRP values or corresponding MPE levels. For example, an SSB with higher SS-RSRP and corresponding to a UE Tx beam/panel with a lower MPE level can be prioritized over an SSB with lower SS-RSRP and corresponding to a UE Tx beam/panel with a higher MPE level. Accordingly, the UE can prioritize or select SSBs based on difference of SS-RSRPs or difference of MPE levels, or combinations thereof, possibly involving comparison thresholds for such differences.

In all approaches considered above (such as the first, second and third approach), it can be assumed that a desired level for MPE corresponding to a UE Tx beam/panel is a low MPE level. For example, the above approaches consider conditions such as "MPE level is below a threshold . . . " for SSB/beam selection. This is because a MPE level is assumed to be based on, for example, a P-MPR power back-off term that the UE needs to apply to meet the regulatory requirements. In such cases, a lower P-MPR back-off is desired. However, if MPE level is determined based on, for example, actual or virtual PRACH power headroom (PH), then a high PRACH PH value may be desired, which can be due to a lower P-MPR and thereby a higher $P_{CMAX,f,c}(i)$ or $\tilde{P}_{CMAX,f,c}(i)$, and/or due to a lower RSRP or pathloss value. Therefore, the MPE conditions such as "MPE level is below a threshold . . . " can be replaced by "MPE level is above a threshold . . . ". For example, a variant of the first approach can be considered as follows: for each Tx/Rx beam pair and for each SSB, the UE determines the Rx beams/SSBs having an RSRP that exceeds a threshold. The UE calculates the corresponding pathloss $PL_{b,f,c}$ corresponding to the Rx beam. The UE determines $P_{CMAX,f,c}(i)$ taking into account the MPE effect. The UE selects the Tx/Rx/SSB that has the largest PH for the initial PRACH transmission, namely, the largest $P_{CMAX,f,c}(i) - \{P_{PRACH,target,f,c} + PL_{b,f,c}\}$. In this manner, a largest margin for PRACH power ramping can be available to the UE. In another example, the selection can be left to a UE implementation as long as the PH is positive or is greater than a predetermined/configured value.

In all approaches considered above (such as the first, second and third approach), the UE can select an SSB and corresponding Rx and Tx beams/panel if some conditions on RSRP values and MPE levels are met. When multiple SSBs and/or multiple Rx or Tx beams/panels satisfy the conditions, in one option, it can be up to the UE implementation to select one SSB and one Rx/Tx beam/panel pair from the multiple SSBs and/or multiple Rx or Tx beams/panels. In another option, specifications for system operation mandate the UE to follow a certain selection. For example, the UE shall select one SSB and one Rx/Tx beam/panel pair that achieves the largest RSRP or SINR, or achieves the smallest/largest MPE level, such as the smallest P-MPR or the largest actual/virtual PRACH PH.

In all approaches considered above (such as the first, second and third approach), when one or more of the main conditions for SSB selection are not satisfied, namely, when the "Otherwise, the UE selects any SSB" part is used, the UE can be restricted to use any SSB for PRACH association only when a UE Tx beam for the PRACH transmission corresponding to the SSB satisfies the regulatory requirements. For example, the statement "Otherwise, the UE selects any SSB" can be replaced by: "Otherwise, the UE selects any SSB that results to: MPE level below a threshold for at least one UE Tx beam/panel corresponding to a UE Rx beam/panel that the UE can use to receive the SSB."

Therefore, even when the UE is not considering signal quality conditions such as SS-RSRP or CSI-RSRP condition, the UE still needs to satisfy the MPE requirement for PRACH transmission.

In all approaches considered above (such as the first, second and third approach), the signal quality/RSRP condition and the MPE condition can be combined into a single condition for SSB selection or UE Rx/Tx beam or panel selection. For example, the UE can determine a modified RSRP, based on a measured RSRP and a determined MPE value, using addition or subtraction or scaling operations, such as mdf-RSRP=RSRP+MPE, or mdf-RSRP=RSRP−MPE, or mdf-RSRP=RSRP*a_MPE, as described in embodiment E-0. Since the MPE value can be beam-/panel-specific, a modified RSRP can be also beam-/panel-specific. Accordingly, the UE selects an SSB for PRACH association if the modified RSRP is above a threshold. For example, the first/second/third approach in Embodiment E-1 can be expressed as follows. In a first approach, if at least one of the SSBs is available with: modified SS-RSRP above rsrp-ThresholdSSB (for at least one UE beam/panel), then the UE selects an SSB from the at least one of the SSBs. Otherwise, the UE can select any SSB. In a second approach, if at least one of the SSBs is available with: modified SS-RSRP above rsrp-ThresholdSSB (for at least one UE Rx-Tx beam/panel pair), then the UE selects an SSB from the at least one of the SSBs. Otherwise, the UE can select any SSB. In a third approach, if at least one of the SSBs is available with: (i) modified SS-RSRP above rsrp-ThresholdSSB for at least one UE Rx-Tx beam/panel pair; and (ii) difference of SS-RSRPs (or modified SS-RSRPs) between the Rx beam/panel and the Tx beam/panel corresponding to the at least one UE Rx-Tx beam/panel pair smaller than a threshold, then the UE selects an SSB from the at least one of the SSBs. Otherwise, the UE selects any SSB.

The method 900, as illustrated in FIG. 9, describes an example procedure for a simplified PRACH beam selection method when the RSRP condition and the MPE constraint are considered jointly via a modified RSRP parameter.

In step 910, a UE (such as the UE 116) is provided a set of one or more SSBs for a random access procedure. In step 920, the UE is provided a threshold rsrp-ThresholdSSB for SSB reception. In step 930, the UE measures SS-RSRP for the SSBs and corresponding UE Rx beams. In step 940, the UE measures MPE level for UE Tx beam corresponding to the SSBs/UE Rx beams. In step 950, the UE determines an SSB to be available if a modified SS-RSRP is above rsrp-ThresholdSSB for at least one UE Rx beam and a corresponding UE Tx beam. In step 960, the UE determines an SSB to be available if a modified SS-RSRP is above rsrp-ThresholdSSB for at least one UE Rx beam and a corresponding UE Tx beam.

In step 970, the UE determines whether at least one SSB is available. In response to the UE determining that at least one SSB is available (as determined in step 970), the UE in step 980 selects an SSB from the at least one available SSB, and transmits a PRACH associated with the SSB using the corresponding Tx beam. In response to the UE determining that no such SSB is available (as determined in step 970), the UE in step 990 selects any SSB for PRACH association.

In all approaches considered above, SSB can be replaced with CSI-RS or in general any DL RS or TCI state associated with a PRACH transmission. Accordingly, SS-RSRP can be replaced with CSI-RSRP or corresponding RSRP for the DL RS or TCI state.

In all approaches considered above, RSRP can be replaced with other signal quality metrics such as SINR, SNR, RSRQ, RSSI, and so on. Furthermore, the UE can use L1 metrics such as L1-RSRP or L1-SINR, or higher layer filtered metrics such as L3-filtered RSRP or L3-filters SINR, and so on.

For all approaches described above, the UE can implement various search algorithms to identify an SSB and a corresponding UE Tx beam for a PRACH transmission corresponding to the SSB that meets the described conditions, wherein the algorithms aim for efficient/optimized searching to achieve reduced search space, complexity, and completion time.

FIGS. 10A-10D illustrate example diagrams 100, 1010, 1020, and 1030 realizations for the previously described scenarios for beam selection for SSB reception and associated PRACH transmission based on SS-RSRP and MPE levels.

As illustrated in FIGS. 10A-10D an example UE (such as the UE 116) with two panels is considered, wherein each panel can generate two UE Tx/Rx beams, namely, beams #1 and #2 associated with a first/top panel and beams #3 and #4 associated with a second/side panel. The UE performs SSB reception from and transmits PRACH to a gNB/TRP, wherein the gNB/TRP is transmits (from the UE perspective) two SSB indexes, namely SSB #1 and SSB #2.

Various icons are used in the FIGS. 10A-10D to reflect the various events. The "smiling face" indicates that the UE beam has SS-RSRP above the configured threshold for SSB reception and has no MPE issues for PRACH transmission. The 'X' symbol indicates that the UE beam has MPE issues for PRACH transmission (while SS-RSRP may be above the configured threshold). The "question mark" symbol indicates that the UE beam has no MPE issues for PRACH transmission but SS-RSRP is below the configured threshold for SSB reception.

The diagram 1000 (of FIG. 10A), also denoted as example Scenario "S1" refers to a case wherein the UE beam #2 is best for reception of SSB #1 and also has no MPE issues. The UE can transmit a PRACH associated with SSB #1 using UE beam #2.

The diagram 1010 (of FIG. 10B), also denoted as example Scenario "S2" refers to a case wherein the UE beam #2 is best for reception of SSB #1, but has MPE issues. However, the UE beams #1 and #3 are good for reception of SSB #1, although with lower SS-RSRP compared to UE beam #2, but they have no MPE issues. The UE can transmit a PRACH associated with SSB #1 using either UE beam #1 or UE beam #3.

The diagram 1020 (of FIG. 10C), also denoted as example Scenario "S3" refers to a case wherein the UE beam #2 is best for reception of SSB #1, but has MPE issues. The UE beams #1 and #3 have no MPE issues, but they are not strong enough for reception of SSB #1 since the corresponding SS-RSRP is below the configured threshold. The UE beam #4 is good for reception of SSB #2, although with a lower SS-RSRP compared to UE beam #2, and has no MPE issues. Under the legacy UE behavior, the UE can transmit a PRACH associated with either SSB #1 or SSB #2. Under the enhanced UE behavior in the first approach, the UE can transmit a PRACH associated with SSB #2 using UE beam #4. Under the enhanced UE behavior in the second or third approach, the UE can transmit a PRACH associated with SSB #1 using UE beam #1 or UE beam #3 (along with enhanced PRACH power control), or associated with SSB #2 using UE beam #4. Under the third approach, the UE may not transmit a PRACH associated with SSB #1 using UE beam #1 or UE beam #3 if a corresponding SS-RSRP is too low.

The diagram 1030 (of FIG. 10D), also denoted as example Scenario "S4" refers to a case wherein the UE beam #2 is best for reception of SSB #1, but has MPE issues. The UE beams #1 and #3 have no MPE issues, but they are not strong enough for reception of SSB #1 since the corresponding SS-RSRP is below the configured threshold. Similar, the UE beam #4 has no MPE issue but it is not strong enough for reception of SSB #2 since the corresponding SS-RSRP is below the configured threshold. Under the legacy UE behavior, the UE can transmit a PRACH associated with SSB #1 since only SS-RSRP is concerned. Under the enhanced UE behavior in the first approach, the UE has no "good" SSBs so can select any SSB, thereby the UE can transmit a PRACH associated with SSB #1 using UE beam #1 or UE beam #3, or associated with SSB #2 using UE beam #4, and also apply enhanced PRACH power control. Under the enhanced UE behavior in the second approach, the UE can transmit a PRACH associated with SSB #1 using UE beam #1 or UE beam #3, since they have no MPE issues and although UE beams #1 and #3 have an SS-RSRP for SSB #1 below the configured threshold, UE beam #2 that receives the same SSB #1 achieves an SS-RSRP above the threshold. The UE can apply enhanced PRACH power control to compensate such lower SS-RSRP. Under the enhanced UE behavior in the third approach, the mandate for selection of SSB #1 may be removed when the corresponding SS-RSRP for UE beam #1 or UE beam #3 is too low. In such a case, the UE will have no "good" SSBs so can select any SSB, therefore the UE can operate similar to the first approach.

In the example scenarios as illustrated in FIGS. 10A-10D, the UE beam #4 that the UE uses to receive SSB #2 is from a second/side panel, different from a first/top panel where the UE generates UE beams #1, #2, and #3 that the UE uses to receive SSB #1. However, the UE may also generate two beams from a same UE panel that the UE can use to receive two SSBs. In general, the UE may have only one antenna panel.

Embodiments, approaches, and examples described so far consider single-beam PRACH transmission, in which the UE can transmit a PRACH using a single UE beam/panel at each time. All embodiments, approaches, and examples can be generalized to the case of multi-beam PRACH, in which the UE can transmit a PRACH using two or more UE beams/panels at the same time or in overlapping occasions. A multi-beam PRACH operation can correspond to a single random access procedure (although it can also correspond to multiple concurrent random access procedures). For such multi-beam PRACH operation, the UE can identify pairs or combinations of UE beams from same or different UE panels such that both SS-RSRP conditions and MPE requirements are met, for example using extensions of the first/second/third approaches described earlier.

Although FIG. 6 illustrates the method 600, FIG. 7 illustrates the method 700, FIG. 8 illustrates the method 800, and FIG. 9 illustrates the method 900 various changes may be made to FIGS. 6-9. For example, while the method 600, 700, 800, and 900 are shown as a series of steps, various steps could overlap, occur in parallel, occur in a different order, or occur multiple times. In another example, steps may be omitted or replaced by other steps. For example, steps of the method 600, the method 700, the method 800, and the method 900 can be executed in a different order.

The following embodiments of the present disclosure, denoted as E-1-0, describe beam management for other UL transmissions during random access in presence of MPE.

In the presence of MPE issues, a UE can determine a spatial transmission filter for other uplink transmissions during initial/random access, after Msg1/A PRACH, based on a DL RS associated with the corresponding PRACH transmission, a beam-/panel-specific RSRP for reception of the DL RS and an MPE state/level associated with the UE Tx beam(s)/panel(s) that the UE can use for the UL transmission.

The other uplink transmissions during initial/random access, after Msg1/A PRACH, include one or more of an initial transmission or any retransmission(s) of Msg3/A PUSCH that is scheduled by a RAR uplink grant, a PUCCH transmission that includes a HARQ-ACK feedback in response to a Msg4/B PDSCH, and any uplink (re-)transmission(s) until the UE receives dedicated RRC configuration for one or more of: reference signals for CSI/beam measurement, PUCCH/PUSCH resources including for CSI/beam reporting, dedicated SRS configuration, and so on.

In a first realization, in presence of MPE issues, the UE can transmit such uplink transmissions using a same spatial transmission filter or UE Tx beam/panel that the UE determines/uses for a corresponding PRACH transmission in the presence of MPE issues. For example, the UE can transmit a Msg3/A PUSCH that is scheduled by a RAR uplink grant or a PUCCH transmission that includes a HARQ-ACK feedback in response to a Msg4/B PDSCH, with a same spatial transmission filter that the UE used for the corresponding PRACH transmission in the presence of MPE. Such behavior can be applicable, for example, when MPE issues/events are considered to occur/span on a long-term scale, such as several (tens of) milliseconds, or when a UE has a small speed or no/limited mobility.

In a second realization, the UE can transmit such uplink transmissions using a second spatial transmission filter or UE Tx beam/panel compared to a first spatial transmission filter or UE Tx beam/panel that the UE determines/uses for a corresponding PRACH transmission in the presence of MPE issues, so long as the first beam/panel and the second beam/panel correspond to a same DL RS such as a same SSB. Herein, the first beam/panel can be different from the second beam/panel. For example, the UE determines an SSB associated with a PRACH transmission, so that the UE transmits the PRACH in an RO that is mapped to the SSB. In this example, the UE can transmit the Msg1/A PRACH using a first spatial transmission filter, and transmit the Msg3/A PUSCH using a second spatial transmission filter, and transmit the PUCCH that includes the HARQ-ACK feedback in response to the Msg4/B PDSCH using a third spatial transmission filter. In this example, the first and second and third spatial transmission filters can be different, while they correspond to respective spatial reception filters that the UE uses to receive the same SSB. The UE determines a spatial transmission filter for an uplink transmission before dedicated higher layer configuration by comparing an MPE level/state corresponding to the spatial transmission filter/beam/panel with a threshold, such as a predetermined threshold or a higher layer configured parameter mpe-ThresholdUL, wherein the spatial transmission filter corresponds to the SSB associated with the PRACH. Such behavior can be applicable, for example, when MPE issues/events are considered to occur/span in a short time scale, such as a fraction of a millisecond or a few OFDM symbols or slots in a reference SCS, or when a UE has moderate to high speed or mobility. Therefore, the UE cannot assume a same MPE state/level for all uplink transmission before dedicated higher layer configuration. Therefore, the UE needs to determine the MPE state/level for each transmission occasion separately. However, for consistent operation during the initial/random access procedure and to simplify the gNB operation, the UE selects spatial transmission filters for all such UL transmissions such that they are associated with the same SSB.

In one example, in presence of MPE issues, a combination of the first and second realizations above may be used. Accordingly, a UE can use a same spatial transmission filter for a first uplink transmission and a second uplink transmission if a time separation/gap between the first and second UL transmissions is less than N symbols/slots in a reference SCS, or less than X milliseconds. Herein, parameters N or X can be predetermined in the specifications for system operation or can be configured by higher layers such as by system information. For example, for a MsgA PUSCH transmission, the UE uses a same spatial transmission filter as a corresponding PRACH, since a time separation/gap between a RO and a corresponding PUSCH occasion (PO) is short, and the UE can assume a same MPE effect. In another example, the UE can use a same spatial transmission filter for a PUCCH that includes the HARQ-ACK feedback in response to the Msg4/B PDSCH as a last Msg3/A PUSCH transmission. However, compared to the Msg1/A PRACH transmission, the UE can use a different spatial transmission filter for Msg3 PUSCH or for a PUCCH that includes the HARQ-ACK feedback in response to the Msg4/B PDSCH, since a time separation/gap between a RO and a transmission occasion for the Msg3 PUSCH or the PUCCH corresponding to Msg4/B.

In a third realization, in presence of MPE issues, the UE can determine a spatial transmission filter or Tx beam/panel separately for each of the UL transmissions before dedicated higher layer configuration, using methods such as those in the first/second/third approach in Embodiment E-1. Accordingly, the UL transmissions can correspond to same or different DL RS, such as same or different SSB. For example, the UE can transmit a Msg1/A PRACH using a first spatial transmission filter and in an RO associated with a first SSB, while the UE transmits a Msg3/A PUSCH using a second spatial transmission filter corresponding to a second SSB, and transmits a PUCCH that includes the HARQ-ACK feedback in response to the Msg4/B PDSCH using a third spatial transmission filter corresponding to a third SSB, wherein the first and second and third SSB can be different. This can be due to different beam-/panel-specific SS-RSRP measurements or different beam-/panel-specific MPE states/levels in the three corresponding transmission occasions.

The following embodiments of the present disclosure, denoted as E-1-1, describe association of DL and UL transmissions with different SSBs in presence of MPE. This is described in the following examples and embodiments, such as those of FIG. 11.

Figure 11:
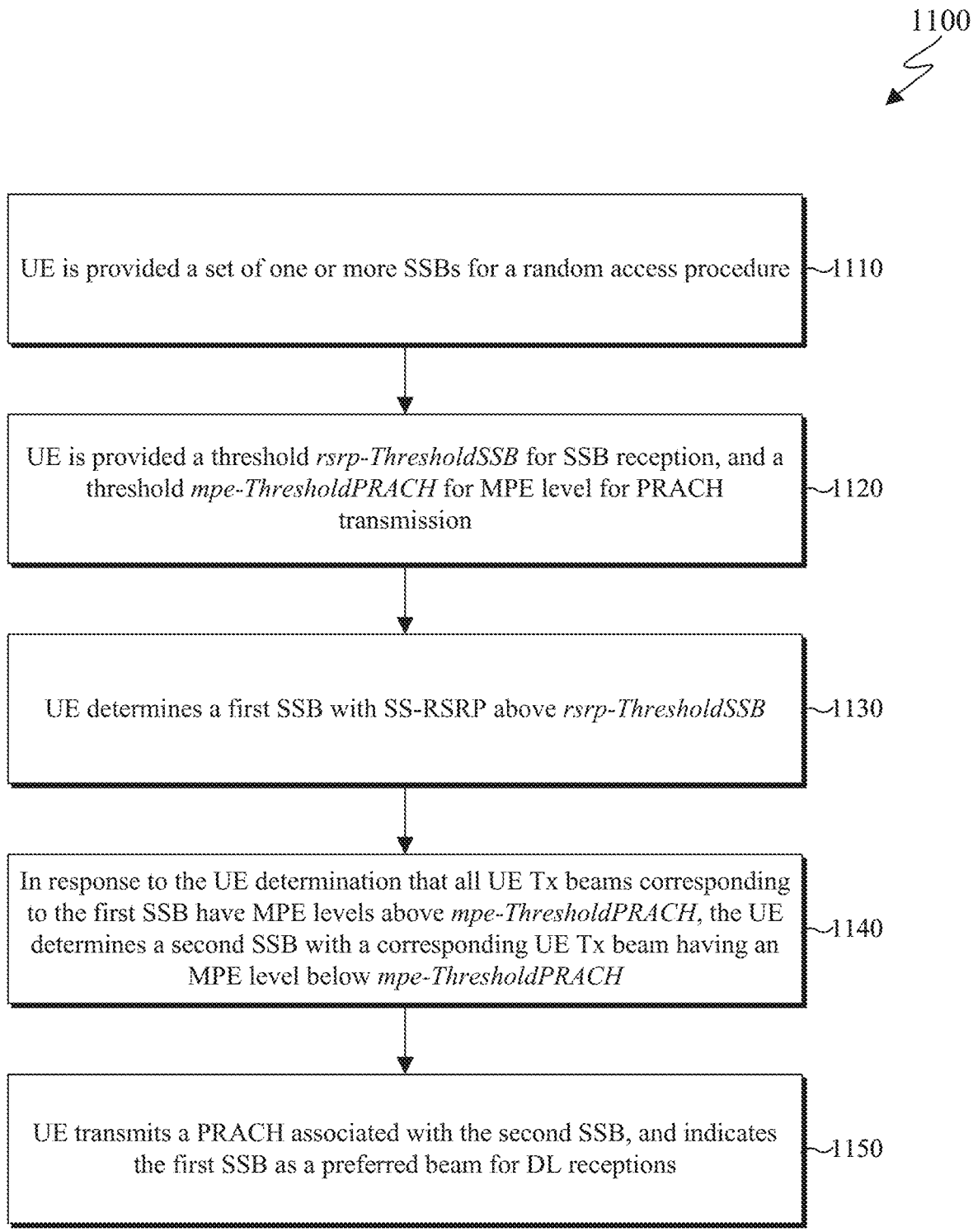
FIG. 11 illustrates an example method for indicating preferences for configuring separate synchronized signal physical broadcast channel block (SSB) beams for downlink (DL) receptions compared to uplink (UL) transmissions according to embodiments of the present disclosure.

FIG. 11 illustrates an example method 1100 for indicating preferences for configuring separate SSB beams for DL receptions compared to UL transmissions according to embodiments of the present disclosure.

The steps of the method 1100 of FIG. 11 can be performed by any of the UEs 111-119 of FIG. 1, such as the UE 116 of FIG. 3. The method 1100 is for illustration only and other embodiments can be used without departing from the scope of the present disclosure.

In certain embodiments, a UE (such as the UE 116) can indicate a preference for association of downlink receptions and uplink transmission with different DL RSs. For example, the UE indicates a preference for association of downlink receptions to a first SSB, and association of uplink transmission to a second SSB, wherein the first SSB is different from the second SSB.

Herein, a DL reception can refer to, for example, a PDSCH, a PDCCH, a periodic or semi-persistent or aperiodic CSI-RS, and so on. An UL transmission can refer to, for example, a PUSCH, a PUCCH, a periodic or semi-persistent or aperiodic SRS, and so on. Herein, an association for an uplink transmission or a downlink reception to a DL RS, such as an SSB, refers to a higher layer configuration or an L1/L2 signaling for spatial filter or TCI state of a DL/UL signal or channel. Such beam configuration or indication can be via an RRC configuration or MAC CE activation of a beam/TCI state/spatial relation for the DL/UL signal or channel, or can be as part of a scheduling decision such as in a DCI format for PDSCH or PUSCH, or a DCI format for beam indication.

A distinction in SSB association for DL receptions compared to UL transmissions can be beneficial, for example, when a first SSB corresponds to a strong beam with high SS-RSRP and suitable for DL receptions, but UE Tx beams/panels corresponding to the first SSB have MPE issues. Therefore, the UE can operate with a second SSB for UL transmissions, wherein the second SSB has sufficient SS-RSRP (above a threshold) and the UE has at least one UE Tx beam/panel corresponding to the second SSB without MPE issues. Such operation can be beneficial, for example immediately after the initial access, when the UE is not yet configured with dedicated resources for measurements and reporting associated with CSI or beam management.

A UE (such as the UE 116) can indicate such preference for association of downlink receptions and uplink transmission with different SSBs using, for example, mechanisms for early CSI reporting on PRACH. For example, a UE can transmit a PRACH associated with a second SSB, for example, with ROs determined based on the second SSB, while the UE indicates the first SSB as an alternative beam in the early CSI reported on the Msg1/A PRACH or Msg3/A PUSCH. To indicate the first SSB as an alternative beam in the early CSI report on PRACH, the UE can use various mechanisms such as a RO/BWP/preamble group or cyclic shift or phase modulation on Msg1/MsgA PRACH, or a MAC-CE or UCI-like multiplexing on Msg3/MsgA PUSCH. For example, the UE categorizes the set of available time/frequency resources, or the set of available ROs, or the set of available PRACH preambles into multiple groups. The UE is provided with a mapping among each group of time/frequency resources/ROs/preambles, and a set of SSB indexes. The UE indicates an index for a preferred SSB for DL reception from the set of SSB indexes by transmitting a PRACH using a time/frequency resource/RO/preamble from a group of time/frequency resources/ROs/preambles that corresponds to the preferred SSB index, based on the configured mapping. The mapping can be provided by higher layer configuration such as by system information.

In one example, a number of resource/RO/preamble groups can be smaller than a number of SSB indexes. Therefore, there cannot be a one-to-one mapping available between the resource/RO/preamble groups and the set of SSB indexes. In such cases, the UE can indicate a subset of preferred SSB indexes instead of a single preferred SSB index for DL reception. For example, if the UE is provided with 64 SSBs and 16 preamble groups, each preamble group can be mapped to a subset of 4 SSBs. For example, a first preamble group maps to SSB indexes 0-3, a second preamble group maps to SSB indexes 4-7, and so on. Accordingly, a UE can transmit a PRACH with a preamble randomly selected from among the preambles in the second preamble group to indicate that a UE's preferred SSB for DL reception is an SSB index from the SSB indexes 4-7.

In one example, the gNB can configure the mapping such that the gNB can determine a single preferred SSB index from the indicated subset of SSB indexes and the SSB index associated with the PRACH transmission. For example, the gNB can "interleave" the SSB indexes corresponding to each SSB subset such that all SSBs with "adjacent" SSB index compared to an SSB index associated with a PRACH transmission are grouped in different SSB subsets. For example, the gNB can configure SSB subsets in the following manner: a first SSB subset including {0, 16, 32, 48} mapped to a first PRACH preamble group, a second SSB subset including {1, 17, 33, 49} mapped to a second PRACH preamble group, a third SSB index including {2, 18, 34, 50} mapped to a third PRACH preamble group, and so on. It is assumed that the gNB gradually sweeps the beam directions for SSBs, so if a difference of two SSB indexes is small, the two SSB indexes correspond to beams with "closer" beam directions. However, if a difference of two SSB indexes is large, the two SSB indexes correspond to beams with "farther" beam directions. In one example, the difference of two SSB indexes can be modulo the total number of SSB indexes, for example N=64, so that SSB indexes 0 and 63 correspond to beams with "close" beam directions. It is further assumed that a UE preferred SSB index for DL reception is likely to have a closer beam direction, rather than a farther beam direction, compared to a beam direction for an SSB associated with the PRACH transmission. Accordingly, if a PRACH transmission is associated, for example, with an SSB index 1, and a UE preferred SSB index for DL reception is SSB index 2, then the UE can transmit a PRACH in an RO associated with SSB index 1, and indicate a preferred SSB subset to be the third SSB subset, for example, by transmitting a PRACH preamble from the third preamble group. Since third PRACH preamble group maps to the third SSB subset including SSB indexes {2, 18, 34, 50}, the gNB determines a UE preferred SSB index for DL reception is SSB index 2. This is because SSB index 2 is the closest SSB index from the SSB subset {2, 18, 34, 50} to the SSB index 1 associated with the RO used for the PRACH transmission.

Once a UE (such as the UE 116) indicates a preference for association of downlink receptions and uplink transmissions with different DL RSs, it can be up to the gNB whether or how to consider the UE's preference. For example, the gNB may decide to accept the UE's preference and configure/schedule downlink receptions for the UE using the first SSB, and configure/schedule uplink transmissions for the UE using the second SSB. In another example, the gNB may accept the UE's preference only partially, for example, by configuring/scheduling both UL transmissions and DL receptions using the second SSB, or to configure/schedule some, but not all DL receptions using the first SSB. In one example, a gNB decision for accepting the UE's preference can be based on a time separation between/gap, such as a number of symbols/slots in a reference SCS between two consecutive downlink and uplink transmissions, related to a UE beam switching. For example, if a number of symbols/slots in a reference SCS between two consecutive downlink and uplink transmissions is smaller than a threshold, then the gNB uses a same SSB for association with downlink receptions and uplink transmissions. The threshold can be in terms of a minimum number of symbols/slots below which a UE is not capable of timely beam switching to follow different SSBs for the two consecutive DL and UL transmission. The threshold can be predetermined in the specifications for system operation or can be configured by higher layers such as by system information. After RRC connection, the threshold can be based on a UE capability report from among a number of predetermined/configured The method 1100 as illustrated in FIG. 11 describes an example procedure for indication of UE preference for configuration of separate SSB beams for DL receptions compared to UL transmissions.

In step 1110, a UE (such as the UE 116) is provided a set of one or more SSBs for a random access procedure. In step 1120, the UE is provided a threshold rsrp-ThresholdSSB for SSB reception, and a threshold mpe-ThresholdPRACH for MPE level for PRACH transmission. In step 1130, the UE determines a first SSB with SS-RSRP above rsrp-ThresholdSSB. In response to the UE determination that all UE Tx beams corresponding to the first SSB have MPE levels above mpe-ThresholdPRACH. The UE in step 1140 determines a second SSB with a corresponding UE Tx beam having an MPE level below mpe-ThresholdPRACH. In step 1150, the UE transmits a PRACH associated with the second SSB, and indicates the first SSB as a preferred beam for DL receptions.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

The following embodiments of the present disclosure, denoted as E-1-2, describe uplink carrier (NUL/SUL) selection for the RA procedure in presence of MPE. This is described in the following examples and embodiments, such as those of FIG. 12.

Figure 12:
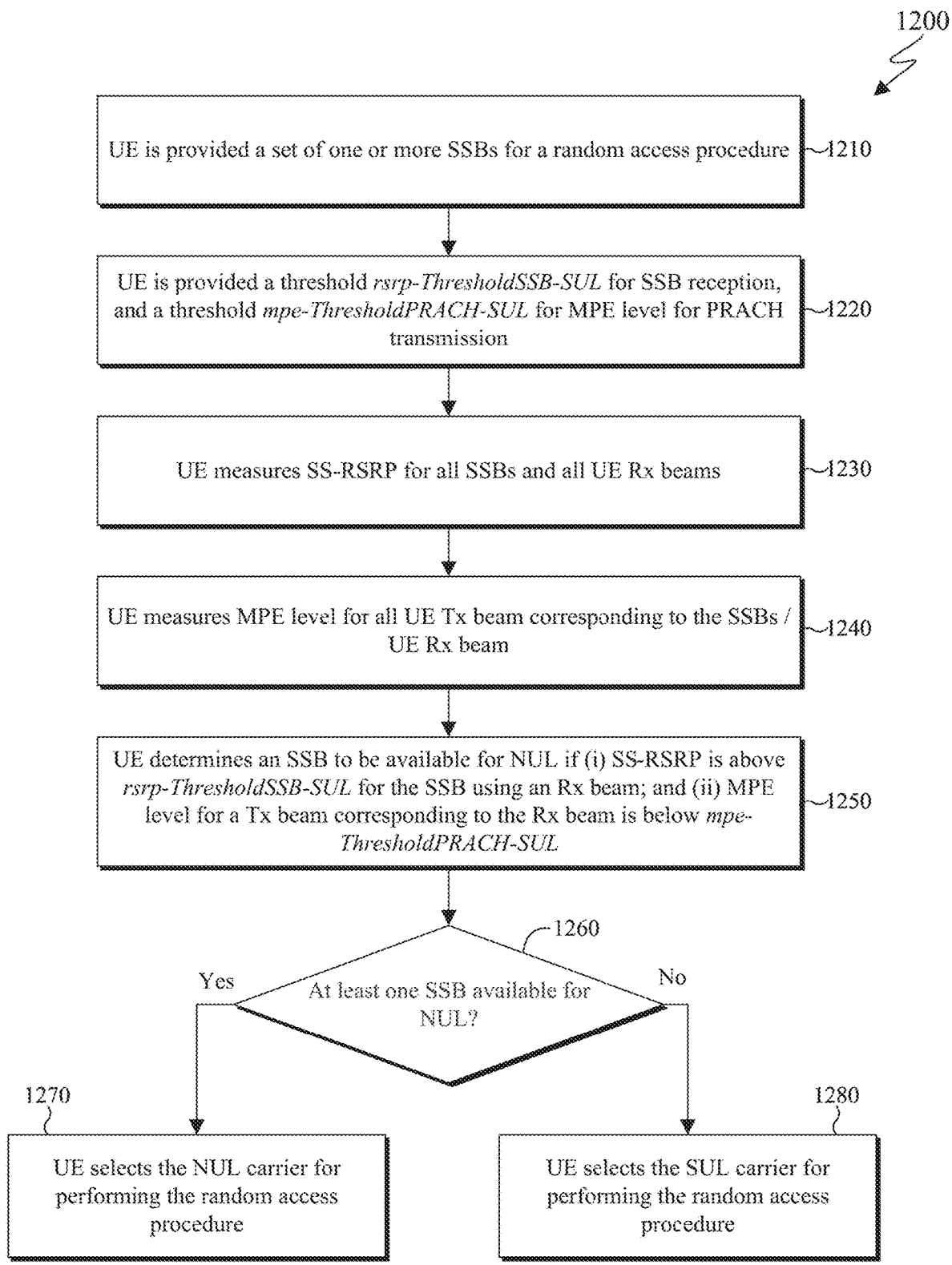
FIG. 12 illustrates an example method for determining UL carrier (normal uplink (NUL) carrier and a supplementary uplink (SUL)) for performing a random access (RA) proceeding when taking MPE constraint into account according to embodiments of the present disclosure.

FIG. 12 illustrates an example method 1200 for determining UL carrier (NUL or SUL) for performing a random access proceeding when taking MPE constraint into account according to embodiments of the present disclosure.

The steps of the method 1200 of FIG. 11 can be performed by any of the UEs 111-119 of FIG. 1, such as the UE 116 of FIG. 3. The method 1200 is for illustration only and other embodiments can be used without departing from the scope of the present disclosure.

In certain embodiments, when a UE (such as the UE 116) is configured with both a NUL carrier and a SUL carrier for a cell, the UE determines an uplink carrier, namely NUL or SUL, for a random access procedure based on a beam-/panel-specific RSRP and an MPE state/level for the corresponding UE Tx beam/panel.

In a first example, if the RSRP of the downlink pathloss reference (PL RS) for all UE Rx beams/panels corresponding to the PL RS is less than rsrp-ThresholdSSB-SUL, the UE selects the SUL carrier for performing the random access procedure. However, if there is at least one UE Rx beam/panel with an RSRP for the PL RS greater than rsrp-ThresholdSSB-SUL, the UE selects the NUL carrier for performing the random access procedure.

In a second example, if all UE Rx beams/panel corresponding to the PRACH PL RS are such that: (i) either the RSRP of the downlink pathloss reference (PL RS) for a UE Rx beam/panel corresponding to the PL RS is less than rsrp-ThresholdSSB-SUL, or (ii) an MPE level for a UE Tx beam/panel corresponding to the UE Rx beam/panel is greater than mpe-ThresholdPRACH-SUL, then the UE selects the SUL carrier for performing the random access procedure. However, if there is at least one UE Rx beam/panel corresponding to the PL RS such that: (i) an RSRP for the PL RS using the UE Rx beam/panel is greater than rsrp-ThresholdSSB-SUL, and (ii) an MPE level for a UE Tx beam/panel corresponding to the UE Rx beam/panel is less than mpe-ThresholdPRACH-SUL, then the UE selects the NUL carrier for performing the random access procedure.

The method 1200 as illustrated in FIG. 12 describes an example procedure for the second example for determining the uplink carrier (NUL or SUL) for performing the random access procedure when taking MPE constraint into account.

In step 1210, a UE (such as the UE 116) is provided a set of one or more SSBs for a random access procedure. In step 1220, the E is provided a threshold rsrp-ThresholdSSB-SUL for SSB reception, and a threshold mpe-ThresholdPRACH-SUL for MPE level for PRACH transmission. In step 1230, the UE measures SS-RSRP for all SSBs and all UE Rx beams. In step 1240, the UE measures MPE level for all UE Tx beam corresponding to the SSBs/UE Rx beam. In step 1250, the UE determines an SSB to be available for NUL if (i) SS-RSRP is above rsrp-ThresholdSSB-SUL for the SSB using an Rx beam; and (ii) MPE level for a Tx beam corresponding to the Rx beam is below mpe-ThresholdPRACH-SUL.

In step 1260, the UE determines whether at least one SSB is available for NUL. In response to the UE determining that at least one SSB is available for NUL (as determined in step 1260), the UE in step 1270 selects the NUL carrier for performing the random access procedure. Alternatively, in response to the UE determining that no SSB is available for NUL (as determined in step 1260), the UE in step 1280 selects the SUL carrier for performing the random access procedure.

In a third example, if all UE Rx beams/panel corresponding to the PRACH PL RS are such that: (i) either the RSRP of the downlink pathloss reference (PL RS) for a UE Rx beam/panel corresponding to the PL RS is less than rsrp-ThresholdSSB-SUL, or (ii) an MPE level for any UE Tx beam/panel corresponding to a UE Rx beam/panel that the UE can use to receive the same PL RS as the UE Rx beam is greater than mpe-ThresholdPRACH-SUL, then the UE selects the SUL carrier for performing the random access procedure. However, if there is at least one UE Rx beam/panel corresponding to the PL RS such that: (i) an RSRP for the PL RS using the UE Rx beam/panel is greater than rsrp-ThresholdSSB-SUL, and (ii) an MPE level for a UE Tx beam/panel that the UE can use to receive the same PL RS as the UE Rx beam is less than mpe-ThresholdPRACH-SUL, then the UE selects the NUL carrier for performing the random access procedure.

It is noted that this first example does not consider MPE. The second example considers MPE on each UE Tx beam/panel corresponding to the UE Rx beam/panel. The third example also considers MPE issues while allowing a decoupling of UE Tx beam without MPE issues for PRACH transmission from UE Rx beam quality for PL RS/SSB reception, as long as the UE Tx beam and the UE Rx beam correspond to a same PL RS/SSB. In one example, restrictions can be applied on such separation of the UE Tx beam/panel from the UE Rx beam/panel, e.g., in terms of corresponding RSRP differences, similar to what was considered in the third approach described in Embodiment E-1, above.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

The following embodiments of the present disclosure, denoted as E-1-3, describe MPE reporting and mitigation during initial/random access procedure.

In certain embodiments, a UE (such as the UE 116) can indicate an existing or anticipated MPE issue for an uplink transmission during initial/random access procedure by MPE reporting to the gNB (such as the BS 102) and selecting an alternative Tx beam/panel with low/no MPE issues based on gNB response. An MPE reporting and corresponding gNB response during initial/random access procedure can be beneficial, for example, to inform the gNB of a necessary adjustment or update to spatial transmission/reception settings when the UE operates with a default beam, or for future configuration and scheduling of the UE in RRC_CONNECTED state.

As in Embodiment E-1-0, described above, uplink transmission(s) during initial/random access procedure, after Msg1/A PRACH, include one or more of an initial transmission or any retransmission(s) of Msg3/A PUSCH that is scheduled by a RAR uplink grant, a PUCCH transmission that includes a HARQ-ACK feedback in response to a Msg4/B PDSCH, and any uplink (re-)transmission(s) until the UE receives dedicated RRC configuration for one or more of: reference signals for CSI/beam measurement, PUCCH/PUSCH resources including for CSI/beam reporting, dedicated SRS configuration, and so on.

An MPE report can include an indication of an MPE state/level, as described in Embodiment E-0 (described above), using one of various MPE metrics such as P-MPR, actual or virtual PRACH PH, RSRP/SINR or modified variants thereof, and so on. The MPE report including the MPE state/level can be specific to one or more Tx beams/panels. Accordingly, the MPE report can include a beam/panel indication such an indication for an RS associated with the MPE report, such as an SSB or CSI_RS or SRS resource index or resource set index, or an ID for a UE panel entity.

In one realization, the UE can transmit an MPE report on Msg3/A PUSCH. For example, the UE can transmit the MPE report in a MAC CE included in the Msg3/A PUSCH. In another example, the UE can multiplex the MPE report, similar to a CSI report or other UCI types, on the data/transport block included in the Msg3/A PUSCH. Herein, Msg3/A PUSCH can refer to an initial transmission or any (re-)transmission(s) of Msg3/A PUSCH. In case of any Msg3/A PUSCH retransmission(s), the MPE report on a retransmission can be same as or different from an MPE report included in the initial transmission of Msg3/A PUSCH. In another example, the UE can use similar methods to include an MPE report on any later PUSCH (re-)transmission(s) before dedicated higher layer configuration.

In another realization, the UE can transmit an MPE report on a Msg1/A PRACH using mechanism similar to those described in Embodiment E-1-1 (described above) for indication of different SSBs for DL reception and uplink transmission. For example, the UE can be provided a mapping among multiple groups of time/frequency resources, or RO groups, or preambles groups, or multiple BWPs, or multiple cyclic shifts or multiple root sequence groups, or multiple phase modulations of the PRACH preamble sequence, and so on, with multiple values for the MPE report. Accordingly, the UE can transmit a PRACH using one out of multiple groups of said parameters, to indicate a respective value for the MPE report. For example, the UE can be configured with a mapping among N=4 groups of said parameters, with N=4 MPE levels/ranges. Such mapping can be provided by higher layer configuration such as by system information.

In yet another realization, the UE can transmit an MPE report on a PUCCH transmission that includes a HARQ-ACK feedback in response to a Msg4/B PDSCH, wherein the UE can multiplex the MPE report as a new type of UCI with the HARQ-ACK feedback information, using methods for UCI multiplexing. The UE can use similar methods to include an MPE report on any later PUCCH before dedicated higher layer configuration.

An MPE reporting during initial/random access can be initiated by the UE or can be triggered by the gNB. In one realization, the UE initiates an MPE report when a triggering condition/event for MPE reporting occurs. The triggering condition/event can be per UE implementation decision, or can be provided by specifications for the system operation. For example, a triggering condition/event can be when the UE determines an MPE level, such as an applicable P-MPR or power headroom or (modified) RSRP or SINR, to be below (or above) a threshold.

In another realization, the gNB can initiate an MPE report. For example, the UE can receive a trigger for MPE reporting by an indication included in one of the following: (i) a DCI format 1_0 with CRC scrambled by an RA-RNTI or MsgB-RNTI that the UE detects in response to a PRACH transmission and schedules a RAR PDSCH, also referred to as a Msg2/B PDSCH, such as a new/additional field in the DCI format 1_0 that re-uses some of the reserved bits; (ii) a RAR uplink grant, such as a CSI request field or a new/additional field for MPE request/trigger; or (iii) a downlink MAC-CE included in the Msg2/4/B PDSCH or any later PDSCH before receiving dedicated higher layer configuration.

A gNB (such as the BS 102) response to an MPE report during initial/random access can include an indication for: (i) a new DL RS such as an alternative SSB that can/shall be associated with UL transmissions from the UE; (ii) an alternative spatial filter that the UE can/shall use for one or more later uplink transmissions during initial/random access such as for transmission of Msg3 PUSCH or PUCCH that includes a HARQ-ACK feedback information in response to Msg4/B PDSCH; or (iii) (an update to) a default beam that the UE can use for UL transmissions, until receiving dedicated higher layer configuration.

For example, the UE can receive an explicit indication of an SSBRI or a CRI that refers to the alternative SSB that can/shall be associated with UL transmissions from the UE. In another example, the UE can determine a spatial transmission filter for one or more later uplink transmissions implicitly based on QCL (Type-D) properties of a DM-RS of a PDCCH that includes a DCI format 1_0 in response to a corresponding PRACH (namely, the RAR PDCCH). For example, the QCL (Type-D) properties of the DM-RS of the RAR PDCCH can correspond to a second SSB that is different from a first SSB associated with the RO that the UE used for the corresponding PRACH transmission. In another example, the QCL (Type-D) properties of the DM-RS of the RAR PDCCH can correspond to one from multiple "narrow" beams that correspond to a same "wide" beam, such as one from multiple CSI-RS s that correspond to a same SSB, to indicate an alternative spatial filter to be used for UL transmission by the UE. In yet another example, the UE receives an indication for (an update to) a spatial setting for PDCCH receptions by the UE (in the CORESET with index 0 or) in a CORESET with a lowest ID on (an initial DL BPW or) an active DL BWP of the serving cell (such as PCell), that the UE can use/follow for PUSCH/PUCCH transmissions. In one example, the spatial settings can be based on a periodic RS resource configured with qcl-Type set to 'typeD' in the TCI state or the QCL assumption of the CORESET. In another example, the UE receives an indication for (an update to) a periodic RS resource configured with qcl-Type set to 'typeD' in an active PDSCH TCI state with lowest ID in (an initial DL BPW or) the active DL BWP of the serving cell (such as PCell).

The gNB can use various downlink transmission signals/ channels to respond to an MPE report that the UE transmits during initial/random access. For example, the UE can receive the gNB response via a DCI format 1_0 that is included in the RAR PDCCH, or as a field in the RAR UL grant included in the Msg2/B RAR PDSCH, or via (a MAC CE in) the Msg2/4/B PDSCH, or any later PDCCH or PDSCH. In another example, the UE can receive a separate DCI format for beam indication, such as a DCI format 1_0 that does not schedule a PDSCH. For example, the UE can receive a DCI format 1_0 with CRC scrambled with TC-RNTI or C-RNTI, in which one or more fields are set to default values, such as one or more of: redundancy version (RV), or HARQ process number (HPN), or downlink assignment index (DAI), or frequency domain resource allocation. Then, the UE can re-interpret the remaining fields in the DCI format such as time domain resource allocation and so on as the gNB response to the MPE report.

The following embodiments of the present disclosure, denoted as E-1-4, describe selection of random access type (2-step or 4-step) in presence of MPE. This is described in the following examples and embodiments, such as those of FIG. 13.

Figure 13:
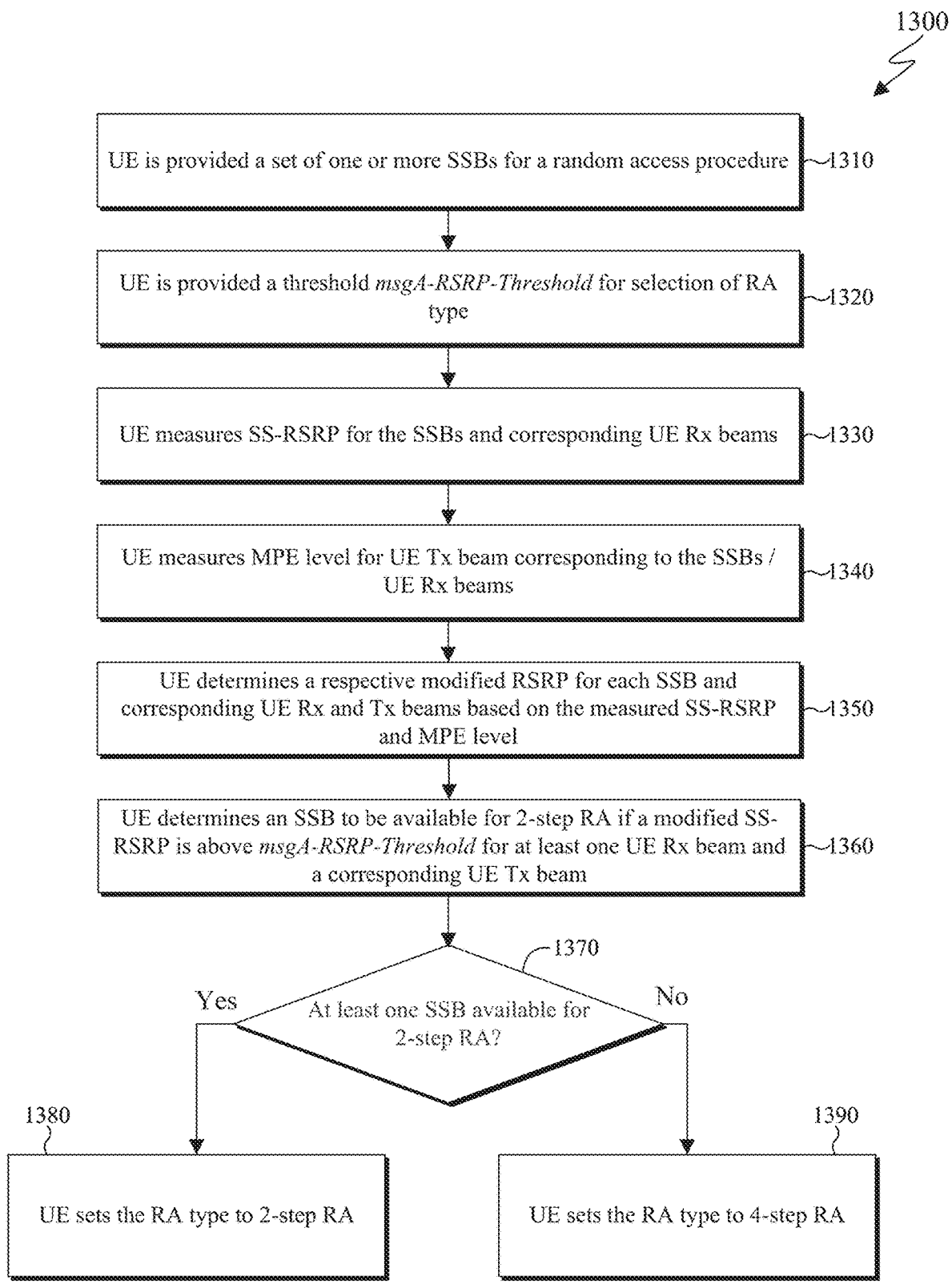
FIG. 13 illustrates an example method for determining the RA type (2-step or 4-step) for performing the random access procedure when taking MPE constraint into account according to embodiments of the present disclosure.

FIG. 13 illustrates an example method 1300 for determining the RA type (2-step or 4-step) for performing the random access procedure when taking MPE constraint into account according to embodiments of the present disclosure;

The steps of the method 1300 of FIG. 13 can be performed by any of the UEs 111-119 of FIG. 1, such as the UE 116 of FIG. 3. The method 1300 is for illustration only and other embodiments can be used without departing from the scope of the present disclosure.

In certain embodiments, a UE (such as the UE 116) can determine a random access type between 4-step RA, also referred to as Type-1 RA, and 2-step RA, also referred to as Type-2 RA, based on both a signal quality such for a DL RS associated with the RA procedure, as well as a MPE state/ level corresponding to a Tx beam/panel that the UE uses for a PRACH transmission corresponding to the RA procedure.

Such UE operation can be beneficial, for example, to operate with a RA procedure type that is consistent with an UL coverage of the UE that is based on, not only downlink measurements for SS-RSRP, but also an allowed/possible transmission power that a UE can use for PRACH and other uplink transmissions, considering restrictions due to MPE issues.

In a first realization, if (i) a BWP selected for a RA procedure is configured with both 2-step and 4-step RA type Random Access Resources; (ii) an RSRP of the downlink pathloss reference is above msgA-RSRP-Threshold for at least one UE Rx beam/panel that the UE can use to receive the SSB; and (iii) an MPE is level below/above a threshold for at least one UE Tx beam/panel corresponding to a UE Rx beam/panel from the at least one UE Rx beam/panel, then the UE sets the RA_TYPE to 2-stepRA.

In certain embodiments, that the first realization can be simplified using a modified RSRP, as described in embodiment E-0, to merge the latter two conditions: (i) a BWP selected for a RA procedure is configured with both 2-step and 4-step RA type Random Access Resources; and (ii) a modified RSRP of the downlink pathloss reference (for at least one UE beam/panel) is above msgA-RSRP-Threshold, then the UE sets the RA_TYPE to 2-stepRA.

The method 1300 as illustrated in FIG. 13 describes an procedure for determining the RA type (2-step or 4-step) for performing the random access procedure when taking MPE constraint into account.

In step 1310, a UE (such as the UE 116) is provided a set of one or more SSBs for a random access procedure. In step 1320, the UE is provided a threshold msgA-RSRP-Threshold for selection of RA type. In step 1330, the UE measures SS-RSRP for the SSBs and corresponding UE Rx beams. In step 1340, the UE measures MPE level for UE Tx beam corresponding to the SSBs/UE Rx beams. In step 1350, the UE determines an SSB to be available if a modified SS-RSRP is above msgA-RSRP-Threshold for at least one UE Rx beam and a corresponding UE Tx beam. In step 1360, the UE determines an SSB to be available if a modified SS-RSRP is above msgA-RSRP-Threshold for at least one UE Rx beam and a corresponding UE Tx beam.

In step 1370, the UE determines whether at least one SSB is available for performing 2-step RA. In response to the UE determining that at least one SSB is available for 2-step RA operation (as determined in step 1370), the UE in step 1380 sets the RA type to 2-step RA. Alternatively, in response to the UE determining that no such SSB is available for 2-step RA operation (as determined in step 1370), the UE in step 1390 sets the RA type to 4-step RA.

In a second realization, if (i) a BWP selected for a RA procedure is configured with both 2-step and 4-step RA type Random Access Resources; (ii) an RSRP of the downlink pathloss reference is above msgA-RSRP-Threshold for a first Rx beam/panel that the UE can use to receive the SSB; and (ii) an MPE level is below a threshold for at least one UE Tx beam/panel corresponding to a second Rx beam/panel that the UE can use to receive the same SSB, then the UE sets the RA_TYPE to 2-stepRA.

In certain embodiments, the second realization can be also simplified using a modified RSRP, as described in Embodiment E-0, to merge the latter two conditions: (i) a BWP selected for a RA procedure is configured with both 2-step and 4-step RA type Random Access Resources; and (ii) a modified RSRP of the downlink pathloss reference (for at least one UE Rx-Tx beam/panel pair) is above msgA-RSRP-Threshold, then the UE sets the RA_TYPE to 2-stepRA.

In a third realization, if: (i) a BWP selected for a RA procedure is configured with both 2-step and 4-step RA type Random Access Resources; (ii) a modified RSRP of the downlink pathloss reference is above msgA-RSRP-Threshold for at least one UE Rx-Tx beam/panel pair; and (iii) difference of SS-RSRPs (or modified SS-RSRPs) between the Rx beam/panel and the Tx beam/panel corresponding to the at least one UE Rx-Tx beam/panel pair is smaller than a threshold, then the UE sets the RA_TYPE to 2-stepRA. The third realization is expressed in terms of the modified RSRP to simplify the conditions. In one example, the conditions can be expanded to describe the RSRP conditions and the MPE conditions separately.

For example, a selection of RA type may not be impacted by existing or anticipated MPE events, and the UE can compensate for a decreased transmission power for PRACH and other UL transmissions due to MPE issues, by other coverage enhancement methods such as repetition schemes. For example, when the SS-RSRP of the downlink pathloss reference is above msgA-RSRP-Threshold, the UE can set the RA type to 2-step RA, even if the MPE condition is not satisfied (or simply, even if the modified RSRP for the same downlink pathloss reference is below msgA-RSRP-Threshold). Such behavior can be beneficial, for example, when MPE events are assumed to be on a short time scale or when the UE has moderate or high speed/mobility. Therefore, the UE expects to be outside an existing MPE event after few PRACH attempts and can still benefit from 2-step RA once the MPE issues are resolved.

For another example, a selection of RA type can change based on any change to the MPE state. For example, a UE can set a RA type to be 4-step RA due to MPE issues, but can revert the RA type to 2-step RA after the MPE issues are resolved. In another example, a UE can set a RA type to 2-step RA despite MPE issues, but if the MPE issues/events persist, for example continue to exist for more than N such as N=2 or 4 PRACH attempts, the UE needs to revert to 4-step RA.

Although FIG. 13 illustrates the method 1300 various changes may be made to FIG. 13. For example, while the method 1300 is shown as a series of steps, various steps could overlap, occur in parallel, occur in a different order, or occur multiple times. In another example, steps may be omitted or replaced by other steps. For example, steps of the method 1300 can be executed in a different order.

The following embodiments of the present disclosure, denoted as E-2, describe Enhancements to PDCCH-order PRACH in presence of MPE.

In certain embodiments, for a UE in RRC_CONNECTED state, when the UE receives a PDCCH order to trigger a random access procedure, and the PDCCH order indicates an SSB (or CSI-RS) with a corresponding UE Tx beam(s) that have MPE issues, or directly indicates a UE Tx beam/panel that has MPE issues, the UE can mitigate the PRACH MPE issues by temporarily or completely stopping the random access procedure or by selecting an alternative SSB or Tx beam without MPE issues and reporting the selected SSB/beam.

An indication for the SSB (or CSI-RS) by the PDCCH order can be by a field in a DCI format that is included in the PDCCH order, or can be determined by the UE based on the DM-RS antenna port quasi co-location properties of the PDCCH order.

The UE can apply such mitigation methods for a first PRACH transmission if there is an MPE issue at the beginning of the random access procedure, or for a later PRACH transmission if the MPE issues occur after a number of PRACH transmissions.

In a first realization, the UE reports an MPE issue and stops the random access procedure, with an indication to the higher layers.

In a second realization, the UE pauses the random access procedure and refrains from any PRACH transmission, until the DL RS or the UE Tx beam/panel indicated by the PDCCH order has no MPE issues.

In a third realization, the UE pauses the random access procedure and refrains from any PRACH transmission, until the UE receives a new indication for a new DL RS or a new UE Tx beam/panel associated with the PRACH. The indication can be via a new PDCCH order or can be via other TCI state update mechanisms, such as a DCI format or a MAC-CE for beam indication. A new PDCCH order can indicate whether the UE needs to resume/continue the previous random access procedure with a new DL RS or a new UE Tx beam, or whether the UE needs to discard the previous RA procedure and start a new RA procedure.

In a fourth realization, the UE can select an alternative Tx beam/panel, if any, associated with the same SSB or CSI-RS that was indicated in the PDCCH order and transmit the PRACH. In one example, the UE can report the alternative beam/panel selection to the gNB. Such report can be on a MAC-CE or as an information "modulated" on the PRACH transmission, by applying a phase modulation or cyclic shift and so on.

For a UE in RRC_CONNECTED state, PRACH MPE reporting can be supported to mitigate MPE issues. The PRACH MPE reporting can be based on an MPE reporting and mitigation mechanism for PUSCH/PUCCH/SRS, or can be a new MPE reporting for PRACH purposes only. The UE can report PRACH MPE using a MAC CE or other methods as described in Embodiment E-1-3.

In one example, the UE can report a PRACH MPE based on a P-MPR value/range that the UE needs to apply for a PRACH transmission associated with an SSB (or CSI-RS) or a UE Tx beam/panel that is indicated to the UE by the PDCCH order. In another example, the UE can report a PRACH MPE based on a "PRACH PH" such as an actual or virtual "PRACH PH" or an actual or virtual Type-1 PH for Msg3/A PUSCH as described in Embodiment E-0. In another example, the UE can alternatively or additionally report an RSRP or SINR for the SSB (or CSI-RS) or a UE Tx beam/panel indicated by the PDCCH order. In yet another example, PRACH MPE report can additionally include an indication for a new candidate beam without MPE issues, along with a corresponding RSRP or SINR value.

Various methods described throughout the present disclosure can also apply for MPE mitigation during a RA procedure for a UE in RRC_CONNECTED state, such as a CFRA, or a RA procedure triggered for BFR, scheduling request (SR), or consistent LBT issues, and so on.

The following embodiments of the present disclosure, denoted as E-3, describe enhancements to PRACH power control in presence of MPE.

In certain embodiments, a UE (such as the UE 116) determines a PRACH transmission power based on UE Tx beam-/panel-specific power control parameters (such as UE Tx beam-/panel-specific PRACH preamble power ramping, pathloss value, or additional power offset value), or MPE state/level for the PRACH transmission using a certain UE Tx beam/panel.

The UE can use such enhanced PRACH power control, for example, to compensate for application of a UE Tx beam without MPE issues that achieves a lower RSRP instead of a UE Tx beam with MPE issues that achieves a higher RSRP. Such compensation can be based on: (i) UE Tx beam/panel-specific RSRP, such as SS-RSRP or CSI-RSRP for a given SSB or CSI-RS; (ii) Difference of UE Tx beam/panel-specific RSRPs, such as SS-RSRPs or CSI-RSRPs, among multiple different SSBs or CSI-RS s; and/or (iii) Difference of MPE states/levels among different UE Tx beams/panels that the UE can use for PRACH transmission.

The UE aims to achieve a comparable/equal PRACH reception power at the gNB, regardless of the Tx beam, the corresponding RSRP values, or the corresponding MPE states/levels.

The following embodiments of the present disclosure, denoted as E-3-1, describe enhancements to PRACH pathloss in presence of MPE. This is described in the following examples and embodiments, such as those of FIG. 14.

Figure 14:
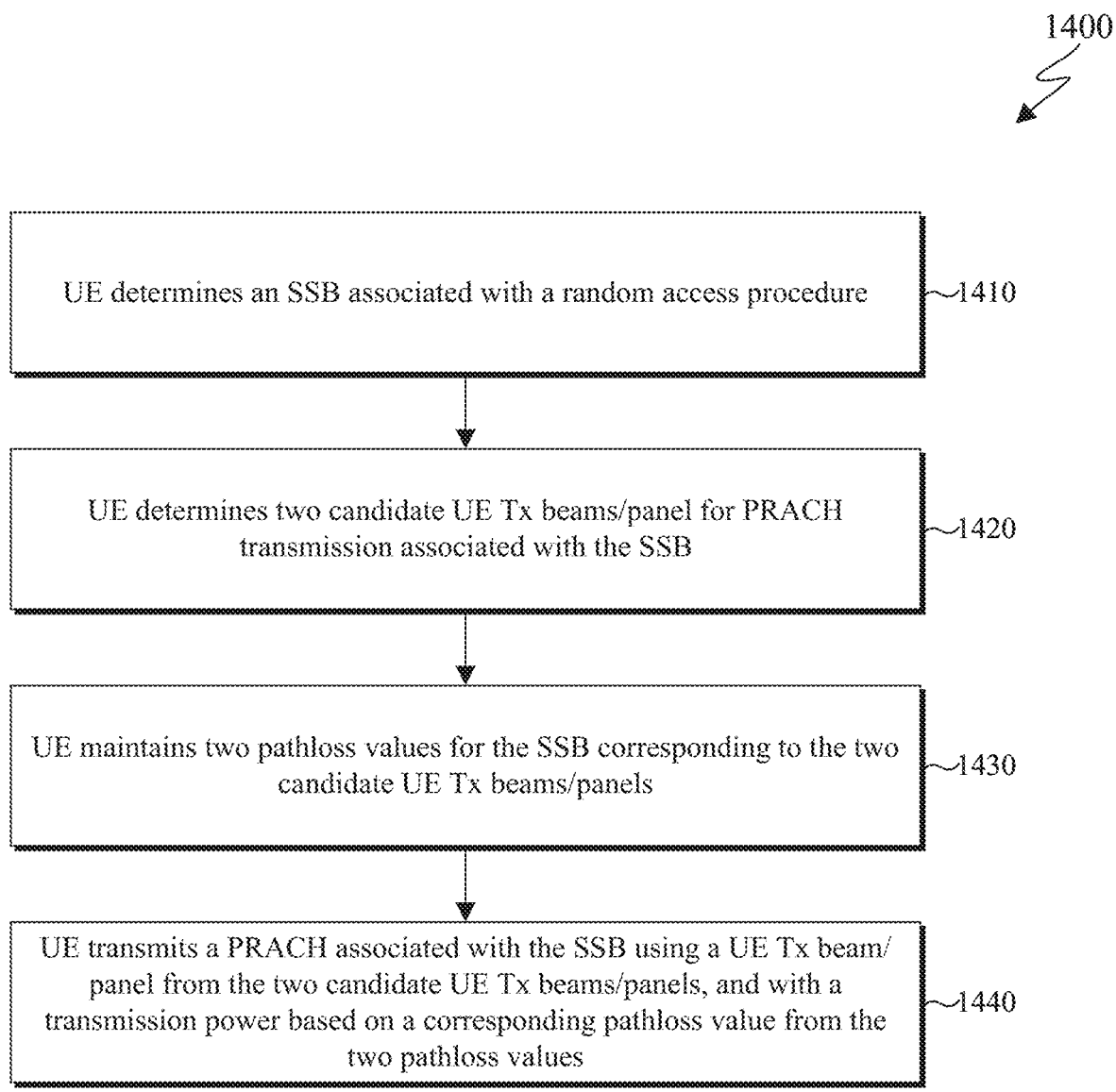
FIG. 14 illustrates an example method for maintaining multiple beam-/panel-specific pathloss values for a same SSB according to embodiments of the present disclosure.

FIG. 14 illustrates an example method 1400 for maintaining multiple beam-/panel-specific pathloss values for a same SSB according to embodiments of the present disclosure.

The steps of the method 1400 of FIG. 14 can be performed by any of the UEs 111-119 of FIG. 1, such as the UE 116 of FIG. 3. The method 1400 is for illustration only and other embodiments can be used without departing from the scope of the present disclosure.

In one realization, a UE (such as the UE 116) can maintain and operate multiple values/processes for one or more PRACH PC parameters, such as multiple pathloss values, corresponding to multiple UE Tx beams/panels, even when a parameter corresponds to a same DL RS such as a same SSB or a same CSI-RS. In this sense, the PRACH PC parameters can be UE Tx beam-/panel-specific, such as UE Tx beam-/panel-specific pathloss.

For example, if the UE can receive an SSB with two UE Rx beams with different SS-RSRP values (e.g., due to usage of two antenna panels at the UE, or due to multi-path channel effect such as line-of-sight versus non-line-of-sight beams, and so on), the UE can maintain a first pathloss value for the SSB corresponding to a first Rx beam/panel and maintain a second pathloss value for the same SSB corresponding to a second Rx beam/panel. Accordingly, the UE can apply the first pathloss value for the SSB when the UE transmits a PRACH using a first Tx beam/panel corresponding to the first Rx beam/panel, and apply the second pathloss value for the SSB when the UE transmits a PRACH using a second Tx beam/panel corresponding to the second Rx beam/panel. Similar UE behavior can apply to other PRACH PC parameters, such as for example a target PRACH received power.

In one realization, the UE considers a linkage or mapping between the UE Rx beam for SSB reception and the UE Tx beams for an associated PRACH transmission. Accordingly, the UE calculates a different pathloss value corresponding to a UE Rx/Tx beam/panel pair that are used for SSB reception and associated PRACH transmission, respectively. The UE can calculate multiple different pathloss values corresponding to a same SSB for each associated PRACH for corresponding UE Rx/Tx beam/panel pairs.

In various examples, there can be a one-to-one linkage or mapping between the UE Rx beams and the UE Tx beams, so that each Tx beam has a unique corresponding Rx beam. In one example, a linkage or mapping between Tx/Rx beams can be based on a UE capability for beam correspondence. For example, the UE uses a same beam/spatial filter for PRACH transmission as the UE used for SSB reception, so that the UE Tx beam corresponds to the UE Rx beam. In one example, the UE Rx beam and the UE Tx beam are from a same physical/virtual antenna panel. In one example, the UE Tx beam and the UE Rx beam may not be identical, but similar physical characteristics in time/frequency/spatial domain, similar to the notion of QCL relationship among signals/channels. In such examples, the UE calculates power control parameters, such as the pathloss value, for an SSB associated with a PRACH transmission based on the Rx beam or panel associated with the Tx beam or panel. Herein, the UE Rx beam/panel is used for SSB reception and the UE Tx beam/panel is used for PRACH transmission.

In some examples, the UE may not support a capability for beam correspondence. In one instance, there can be a one-to-multiple linkage or mapping between the UE Rx beams and the UE Tx beams, so that each UE Rx beam is linked with multiple UE Tx beams. In such a case, for two Tx beams/panels linked to a same Rx beam/panel, the UE calculates a same pathloss value based on SS-RSRP measurements on the Rx beam/panel corresponding to the SSB associated with the PRACH transmission. However, for two Tx beams/panels linked to different Rx beams/panels, the UE calculates two pathloss values based on two (sets of) SS-RSRP measurements on the two Rx beams/panels corresponding to the SSB associated with the PRACH transmission.

In one example, it is possible that a UE Tx beam is linked to two or more UE Rx beams that are used for reception of a same SSB or different SSBs. In such cases, the UE can apply different PRACH transmission power levels corresponding to different Rx beams/panels, even when using a single Tx beams, and even when the different Rx beams/panel correspond to a same SSB.

The method 1400 as illustrated in FIG. 14 describes an example procedure for maintaining multiple beam-/panel-specific pathloss values for a same SSB.

In step 1410, a UE (such as the UE 116) determines an SSB associated with a random access procedure. In step 1420, the UE determines two candidate UE Tx beams/panel for PRACH transmission associated with the SSB. In step 1430, the UE maintains two pathloss values for the SSB corresponding to the two candidate UE Tx beams/panels. In step 1440, the UE transmits a PRACH associated with the SSB using a UE Tx beam/panel from the two candidate UE Tx beams/panels, and with a transmission power based on a corresponding pathloss value from the two pathloss values. In one example, a selection of a UE Tx beam/panel from the two UE Tx beams/panels can be based on UE determination and comparison of MPE states/levels among the two candidate UE beams/panel. For example, the UE selects a beam/panel with little/no MPE issues for PRACH transmission associated with the SSB.

Although FIG. 14 illustrates the method 1400 various changes may be made to FIG. 14. For example, while the method 1400 is shown as a series of steps, various steps could overlap, occur in parallel, occur in a different order, or occur multiple times. In another example, steps may be omitted or replaced by other steps. For example, steps of the method 1400 can be executed in a different order.

The following embodiments of the present disclosure, denoted as E-3-2, describe enhancements to PRACH preamble power when facing MPE. This is described in the following examples and embodiments, such as those of FIGS. 15 and 16.

Figure 15:
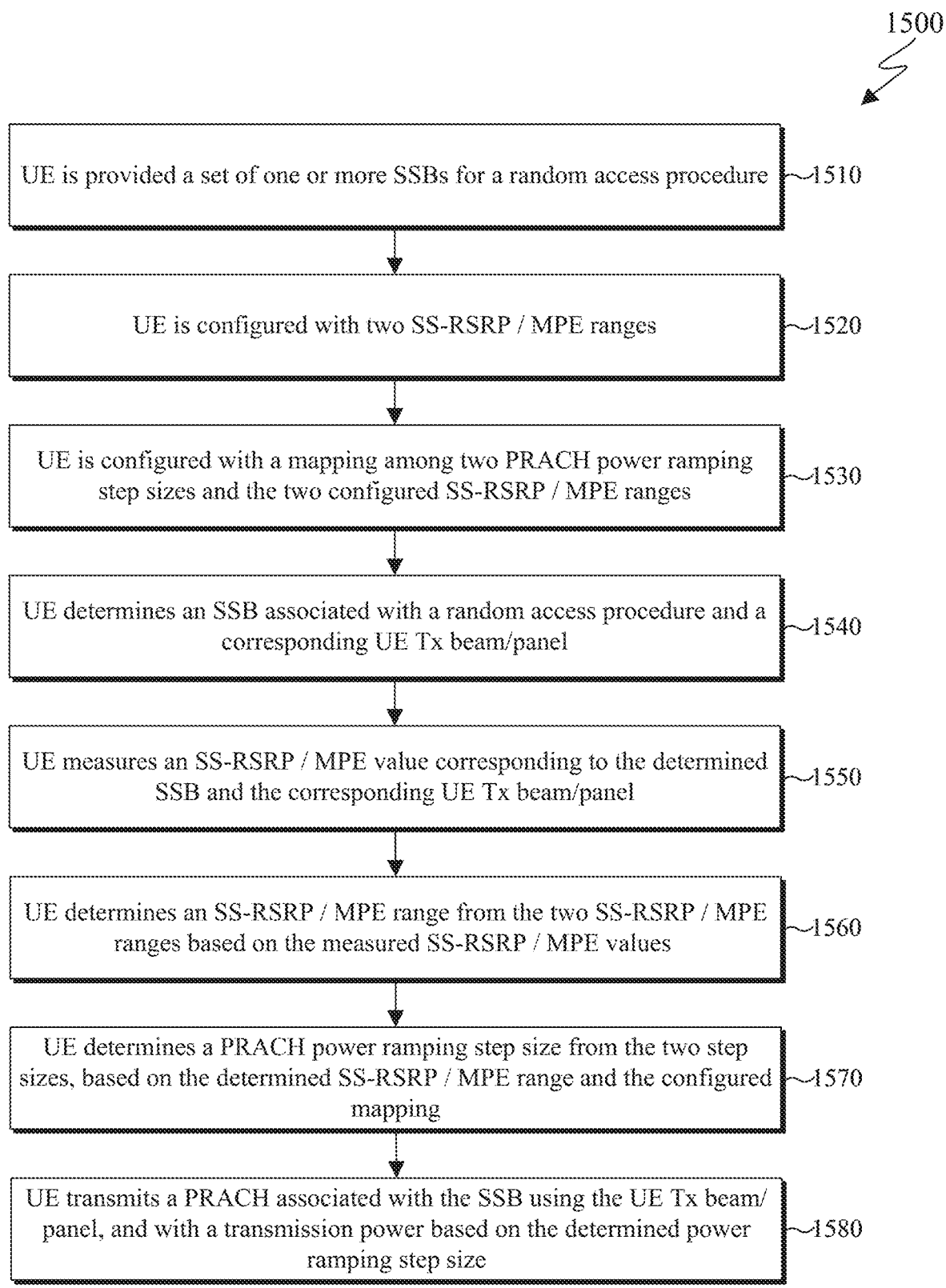
FIG. 15 illustrates an example method for configuring two PRACH power ramping step sizes corresponding to two synchronized signal (SS)—RSRPs ranges and/or two MPE ranges according to embodiments of the present disclosure.
Figure 16:
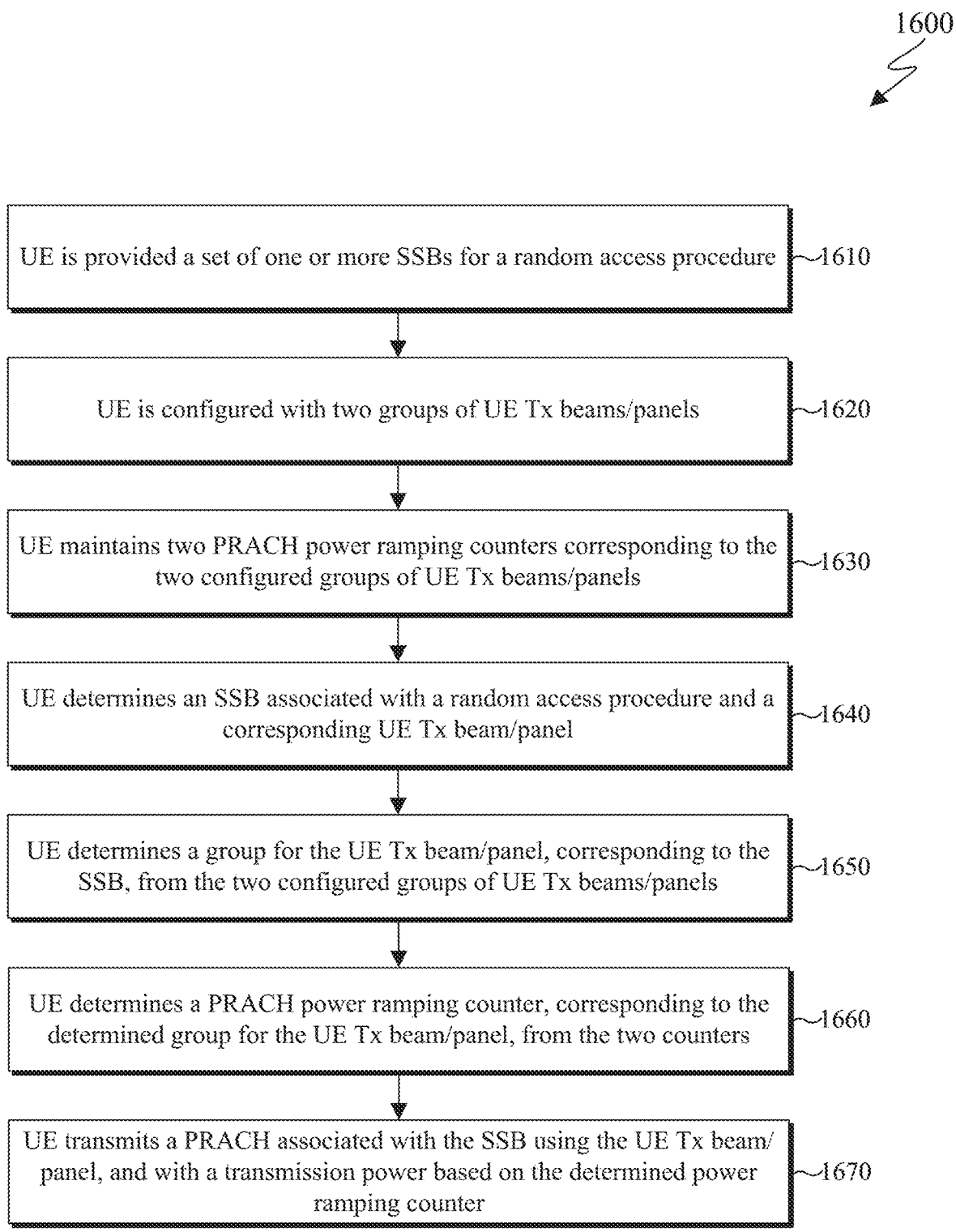
FIG. 16 illustrates an example method for maintaining two PRACH power ramping counters corresponding to two groups of UE transmit beams/panels according to embodiments of the present disclosure.

FIG. 15 illustrates an example method 1500 for configurating two PRACH power ramping step sizes corresponding to two SS-RSRPs ranges and/or two MPE ranges according to embodiments of the present disclosure. FIG. 16 illustrates an example method 1600 for maintaining two PRACH power ramping counters corresponding to two groups of UE transmit beams/panels according to embodiments of the present disclosure.

The steps of the method 1500 of FIG. 15 and the method 1600 of FIG. 16 can be performed by any of the UEs 111-119 of FIG. 1, such as the UE 116 of FIG. 3. The methods 1500 and 1600 are for illustration only and other embodiments can be used without departing from the scope of the present disclosure.

In one realization, a PRACH preamble power ramping step value such as PREAMBLE_POWER_RAMPING_STEP or MSGA_PREAMBLE_POWER_RAMPING_STEP can depend on the MPE state/level or a beam-/panel-specific RSRP corresponding to a UE Tx beam/panel used for the PRACH transmission.

In one example, the UE (such as the UE 116) can be configured with multiple power ramping values, wherein each value is mapped to an MPE state/level or an SS-RSRP range. For example, the UE can be configured with N=4 ranges of MPE states/levels or N=4 ranges of SS-RSRP difference. Accordingly, the UE can be configured with N=4 different power ramping values. For example, the UE applies a first power ramping value when the UE's MPE state/level corresponds to "excessive" MPE issues or highest MPE levels, or when the UE transmits the PRACH with a UE Tx beam corresponding to the highest SS-RSRP or CSI-RSRP. The UE applies a second power ramping value, for example larger than the first power ramping value, when the UE's MPE state/level corresponds to a lower MPE level such as a second/"intermediate" MPE range, or when the UE transmits the PRACH with a UE Tx beam corresponding to a lower SS-RSRP or CSI-RSRP such as a second/"intermediate" RSRP range. Therefore, if the UE needs to transmit a PRACH with a second Tx beam without MPE issues but with less SS-RSRP to avoid usage of a first Tx beam with higher/highest SS-RSRP but with MPE issues, the UE can apply a higher power ramping value to compensate for the reduced RSRP.

In one example, at least one power ramping value is shared with legacy UEs. In another example, instead of a configuration with N=4 absolute values for power ramping, the UE can be configured with a baseline power ramping value, and be provided with N−1=3 offset/differential values that the UE needs to apply to the baseline power ramping to determine the power ramping value for each MPE range or RSRP range. The baseline power ramping can be the value shared with legacy UEs. In one example, the baseline power ramping value can correspond to the highest MPE range or the highest RSRP range, or can correspond to no MPE. In one example, the offset/differential values for power ramping can be predetermined values provided in the specifications for the system operation or can be configured by higher layers such as by system information. In another example, the UE determines the offset/differential values by calculating the minimum/maximum/average difference between an MPE range or RSRP range with the baseline MPE value/range or baseline RSRP value/range. In yet another example, the UE determines the offset/differential values by calculating the difference of an actual/instantaneous MPE value or RSRP value (namely, the actual value within an MPE/RSRP range, and not the boundary values of MPE/RSRP range) for the UE Tx beam/panel that is used for PRACH transmission from a baseline MPE value/range or baseline RSRP value/range. In the latter case, it is possible to configure only one baseline MPE value/range or RSRP value/range, and the UE determines the power ramping for the UE Tx beam/panel based on the difference of an actual/instantaneous MPE value or actual RSRP value from the baseline MPE or RSRP value/range.

The method 1500, as illustrated in FIG. 15, describes an example procedure for configuration of two PRACH power ramping step sizes corresponding to two SS-RSRPs ranges and/or two MPE ranges.

In step 1510, a UE (such as the UE 116) UE is provided a set of one or more SSBs for a random access procedure. In the step 1520, the UE is configured with two SS-RSRP/MPE ranges. In the step 1530, the UE is configured with a mapping among two PRACH power ramping step sizes and the two configured SS-RSRP/MPE ranges. In the step 1540, the UE determines an SSB associated with a random access procedure and a corresponding UE Tx beam/panel. In the step 1550, the UE measures an SS-RSRP/MPE value corresponding to the determined SSB and the corresponding UE Tx beam/panel. In the step 1560, the UE determines an SS-RSRP/MPE range from the two SS-RSRP/MPE ranges based on the measured SS-RSRP/MPE values. In the step 1570, the UE determines a PRACH power ramping step size from the two step sizes, based on the determined SS-RSRP/MPE range and the configured mapping. In the step 1580, the UE transmits a PRACH associated with the SSB using the UE Tx beam/panel, and with a transmission power based on the determined power ramping step size.

In one realization, a UE can operate with multiple power ramping accumulation processes across different PRACH transmission occasions. For example, the UE can be configured with multiple power ramping counters such as multiple PREAMBLE_POWER_RAMPING_COUNTER so that when the UE needs to apply a power ramping value to determine a PRAH preamble target power for a new PRACH transmission occasion, the UE applies the power ramping based on the value of the corresponding counter. The multiple power ramping counters can correspond to multiple groups of UE Tx beams/panels. In one example, the multiple power ramping counters correspond to the multiple ranges for MPE state/level or multiple ranges for RSRP such as SS-RSRP. For example, the UE applies a first counter for a first MPE/RSRP range, and applies a second counter for a second MPE/RSRP range. The UE applies the power ramping based on the most recent value of the PRACH preamble target power within the same group, corresponding to the same counter. According to this example, it is possible that a group of UE Tx beams that are associated with a same power ramping counter correspond to different UE panels. Alternatively, different UE Tx beams of a same UE panel can be associated with different power ramping counters, due to different MPE states/levels. In one example, the UE can operate with two power ramping counters: one counter for UE Tx beams without MPE issues, and another counter for UE Tx beams with MPE issues. In another example, the multiple power ramping counters can correspond to multiple UE panels such as multiple UE Tx panels. For example, the UE applies a first power ramping counter for a first panel, and a second counter for a second panel. Such grouping can be beneficial, for example, when all UE Tx beams corresponding to a same UE panel are expected to have similar MPE states/levels or similar RSRP.

The method 1600, as illustrated in FIG. 1600, describes an example procedure for UE maintaining two PRACH power ramping counters corresponding to two groups of UE Tx beams/panels, such as Tx beams/panel with or without MPE issues.

In step 1610, a UE (such as the UE 116) UE is provided a set of one or more SSB s for a random access procedure. In step 1620, the UE is configured with two groups of UE Tx beams/panels. In step 1630, the two groups can refer to two UE Tx panels or can refer to MPE states/values, such UE Tx beams/panels with MPE issues and UE Tx beams/panels without MPE issues. The UE maintains two PRACH power ramping counters corresponding to the two configured groups of UE Tx beams/panels. In step 1640, the UE determines an SSB associated with a random access procedure and a corresponding UE Tx beam/panel. In step 1650, the UE determines a group for the UE Tx beam/panel corresponding to the SSB, from the two configured groups of UE Tx beams/panels. In step 1660, the UE determines a PRACH power ramping counter, corresponding to the determined group for the UE Tx beam/panel, from the two power ramping counters. In step 1670, the UE transmits a PRACH associated with the SSB using the UE Tx beam/panel, and with a transmission power based on the determined power ramping counter.

In one realization, the UE can/may suspend a power ramping counter when the UE uses a Tx beam/panel for PRACH transmission that experiences MPE issues, for which the UE needs to apply power back-off such as P-MPR. In such cases, Layer 1 can/may notify higher layers to suspend the corresponding power ramping counter. In one example, the UE can/may suspend the power ramping counter when the MPE state/level exceeds a threshold. The threshold can be predetermined the specifications for the system operation or can be provided by higher layers. Such operation can be beneficial, for example, when the UE operates with a single power ramping counter for all UE Tx beams with or without MPE issues.

Although FIG. 15 illustrates the method 1500 and FIG. 16 illustrates the method 1600 various changes may be made to FIGS. 15 and 16. For example, while the method 1500 and the method 1600 are shown as a series of steps, various steps could overlap, occur in parallel, occur in a different order, or occur multiple times. In another example, steps may be omitted or replaced by other steps. For example, steps of the method 1500 and the method 1600 can be executed in a different order.

The following embodiments of the present disclosure, denoted as E-3-3, describe additional power offset for PRACH when facing MPE.

In one realization, the UE can apply a power offset to the PRACH power control formula to compensate for a potentially reduced RSRP when using a UE Tx beam/panel without MPE issues. For example, the PRACH power control formula can be updated as described in Equation (23).

$$P_{PRACH,b,f,c}(i) = \min\{P_{CMAX,f,c}(i), P_{PRACH,target,f,c} + PL_{b,f,c} + P_{offset,b,f,c}\} \text{ [dBm]} \quad (23)$$

In Equation (23), the power offset term $P_{offset,b,f,c}$ can be based on a difference of RSRPs such as SS-RSRP for a second Tx beam without MPE issues compared to a first/best UE Tx beam with MPE issues. Various methods for determination of the power offset value can be considered, for example, based on MPE ranges or RSRP ranges or actual/instantaneous MPE or RSRP values, and so on, similar to what was described earlier in Embodiment E-3-2 for a power offset applied to the power ramping value, and are not repeated here for brevity. However, the distinction between the power offset considered here with the power offset considered in embodiment E-3-2 for power ramping is that, when an offset is applied to the power ramping step value, the offset will accumulate across different PRACH transmission occasions based on the power ramping counter value. However, the present power offset is an individual/"one-time" offset term that will not accumulate, regardless of the number of PRACH attempts.

Another method for capturing the above power offset term is to include it as an individual offset term such as POWER_OFFSET_MPE in the formula for PRACH preamble target power as described in Equation (24).

$$\text{PREAMBLE\_RECEIVED\_TARGET\_POWER} = \quad (24)$$

$$preambleReceivedTargetPower + \text{DELTA\_PREAMBLE} +$$

$$(\text{PREAMBLE\_POWER\_RAMPING\_COUNTER} - 1) \times$$

$$\text{PREAMBLE\_POWER\_RAMPING\_STEP} +$$

$$\text{POWER\_OFFSET\_2STEP\_RA} + \text{POWER\_OFFSET\_MPE}.$$

With this method, the PRACH transmission power formula can be maintained as the legacy formula without any changes or new parameters, as described in Equation (25).

$$P_{PRACH,b,f,c}(i) = \min\{P_{CMAX,f,c}(i), P_{PRACH,target,f,c} + PL_{b,f,c}\} \text{ [dBm]} \quad (25)$$

Using any of the methods above for capturing a power offset term, the UE ensure that a same/similar (or even higher) transmission power is achieved for an alternative UE Tx beam/panel compared to the case that an original strong UE TX beam/panel with MPE issues would be used, even when discarding the required power back-off term such as P-MPR.

In another example, such a power compensation can be achieved by updating the power control formula to include a "fractional" pathloss compensation factor as described in Equation (26). This includes the case with $\alpha > 1$, which would lead to an increased PRACH transmission power level. The factor $\alpha$ can depend on the MPE state/level/range or RSRP level/range. Again, various methods can be considered for determination of the factor $\alpha$, similar to what was described earlier in embodiment E-3-2 for a power offset applied to the power ramping value. The application of a MPE-/beam-/panel-specific factor $\alpha$ can be beneficial, for example, when the UE maintains a single pathloss value for each DL RS, irrespective of the UE Rx beam/panel that is used for DL RS reception or the Tx beam/panel that is used for PRACH transmission.

$$P_{PRACH,b,f,c}(i) = \min\{P_{CMAX,f,c}(i), P_{PRACH,target,f,c} + \alpha_{b,f,c} * PL_{b,f,c}\} \text{ [dBM]} \quad (26)$$

The following embodiments of the present disclosure, denoted as E-3-4, describe multiple PRACH power control processes in presence of MPE.

In one realization, a UE can operate with more than one PRACH power control processes, wherein each process corresponds to a group of UE Tx beams/panels. The UE transmits a first PRACH using a first Tx beam with a first transmission power determined from a corresponding first PRACH power control process, and transmits a second PRACH using a second Tx beam with a second transmission power determined from a corresponding second PRACH power control process. The different PRACH power control processes can be independent.

In one example, a group of UE Tx beams corresponding to a same PRACH power control process can include a set of UE Tx beam (from same or different UE panels) whose MPE state/level or RSRP value belong to a same MPE/RSRP range. In another example, a PRACH power control process maps to a UE panel, so that all UE Tx beams from a same panel share a same PRACH power control process. Each PRACH power control process can have a corresponding PRACH target power, including a corresponding power ramping step size and counter, as well as a corresponding PRACH pathloss reference/value.

A configuration of two or multiple PRACH power control processes can be beneficial, for example, to avoid "double-counting" or "double-compensation" when handling MPE issues. Embodiments E-3, E-3-1, E-3-2, and E-3-3 already provide various PRACH power control enhancement methods for power boosting of a UE Tx beam/panel without MPE issue that achieves a lower RSRP compared to a UE Tx beam/panel with higher RSRP but suffers from MPE issues. However, it is essential to avoid any "double-counting" or "double-compensation" when handling MPE issues. So, specification may support only one or some of the methods described above. Configuration of multiple independent PRACH power control processes can be an alternative method for this matter.

In one realization, when a UE is provided with non-zero-power (NZP) CSI-RS configuration during initial access, the two or multiple PRACH power control processes can correspond to two or multiple NZP CSI-RS resources, wherein the two or multiple NZP CSI-RS resources may be associated with a same/single SSB associated with the PRACH. In one example, a UE Tx beam/panel can correspond to one or more such NZP CSI-RSs. In another example, a PRACH pathloss reference before RRC connection can be each of the more than one NZP CSI-RSs. This can be another method for maintaining multiple pathloss values for a same SSB, wherein the UE maintains one pathloss value for each NZP CSI-RS associated with the SSB. Similar, a determination of MPE event/state/value as well as any corresponding compensation mechanisms can be based on the more than one NZP CSI-RSs. For example, the UE can apply a different power offset value (or a power ramping value or a power ramping counter and so on) corresponding to an MPE state/level/range or CSI-RSRP value/range associated with each NZP CSI-RS.

The NZP CSI-RS resources can be configured, for example, to enable early CSI reporting during initial/random access procedure using Msg1/MsgA PRACH or using Msg3/MsgA PUSCH. In one example, more than one NZP CSI-RS resources may be associated with a single SSB. For example, the UE may assume that the gNB transmits the SSB with a wider beam and transmits the NZP CSI-RS resource with narrower beams that are within the wider SSB beam. In another example, the UE can use a first wider UE Rx beam for SSB reception, while the UE can use two or multiple narrower UE Rx beams for reception of the two or multiple NZP CSI-RS resources, wherein the two or multiple narrower UE Rx beams are within the first wider UE Rx beam. The configuration for NZP CSI-RS resource that are used for early CSI reporting can be provided to the UE by higher layer configuration such as by system information.

The following embodiments of the present disclosure, denoted as E-3-5, describe RS-specific (e.g., SSB-specific) configuration of PRACH preamble target power. This is described in the following examples and embodiments, such as those of FIG. 17.

Figure 17:
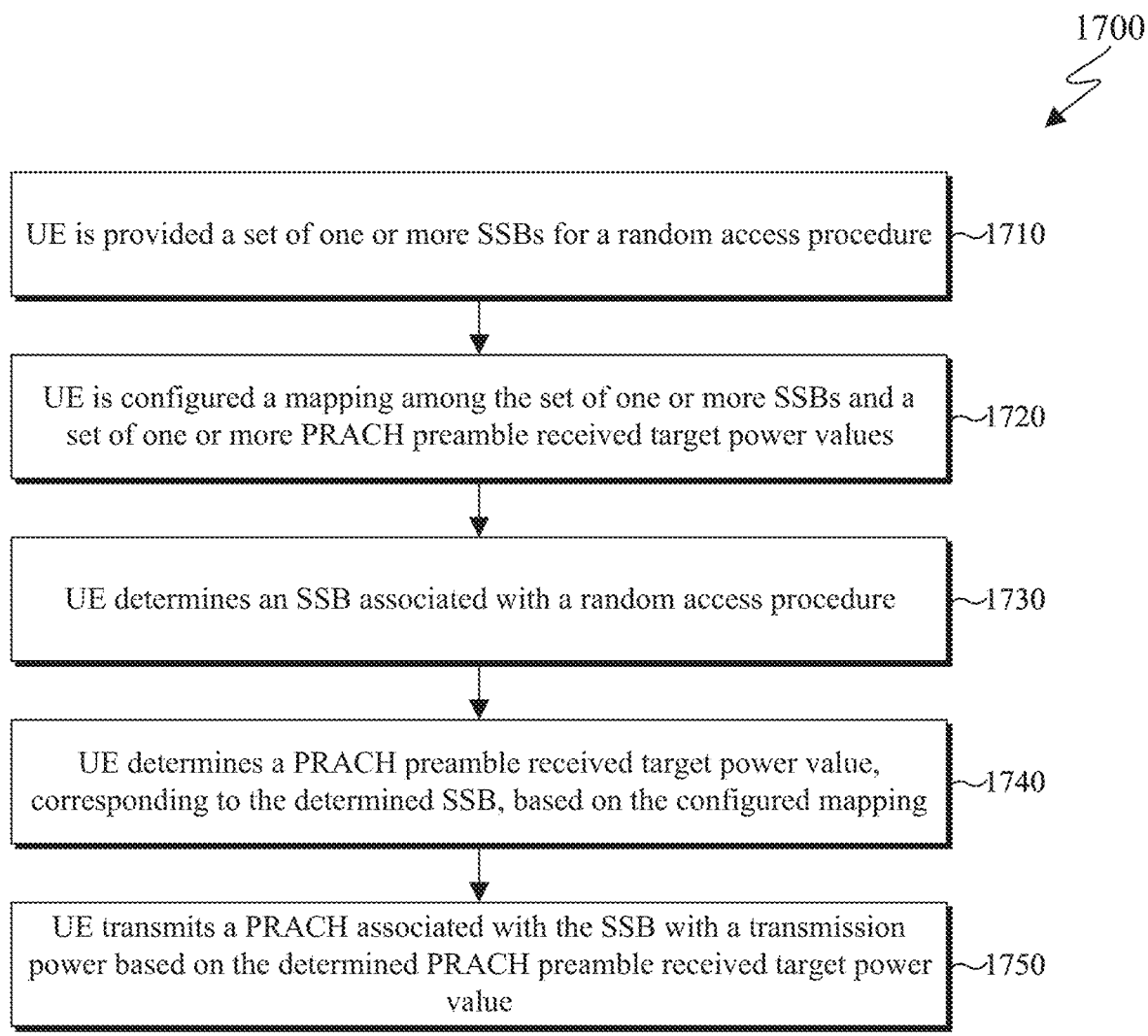
FIG. 17 illustrates an example method for configuring SSB-specific values for a PRACH preamble received target power, before application of any power ramping, according to embodiments of the present disclosure.

FIG. 17 illustrates an example method 1700 for configuring SSB-specific values for a PRACH preamble received target power, before application of any power ramping, according to embodiments of the present disclosure.

The steps of the method 1700 of FIG. 17 can be performed by any of the UEs 111-119 of FIG. 1, such as the UE 116 of FIG. 3. The method 1700 is for illustration only and other embodiments can be used without departing from the scope of the present disclosure.

In one realization, a UE can be configured with multiple values for PRACH preamble received target power as provided by a higher layer parameter preambleReceivedTargetPower, corresponding to multiple SSBs associated with PRACH transmission.

For example, the UE can be provided via higher layer signaling, such as by system information, a first PRACH preamble received target power for a first SSB and a second PRACH preamble received target power for a second SSB, wherein the first and second SSBs are associated with PRACH transmission.

In legacy operation, the PRACH preamble received target power is common to all UEs per cell or per carrier. The enhancement considered herein generalizes the configuration to allow SSB-level configuration of the PRACH preamble received target power. Therefore, all UEs within a same "SSB area" (for example, a geographical area in a cell that is covered by an SSB beam, as defined in [TS 38.423]) can be configured with a same PRACH preamble received target power value. However, UEs in different SSB areas can be configured with different PRACH preamble received target power values. An SSB-specific configuration of PRACH preamble received target power can be beneficial, for example, when different SSB areas have different UL interference situations. For example, significance and magnitude of the UL interference caused by a PRACH transmission can be different for different beam directions and areas. For example, a first SSB with a beam targeting a cell-center area can be configured with a smaller (or larger) PRACH preamble received target power value, while a second SSB with a beam targeting a cell-edge area can be configured with a larger (or smaller) PRACH preamble received target power value, for example, depending on the congestion of the UEs in the cell-center vs. cell-edge or based on coordination of PRACH resources among neighboring cells. It is noted, this embodiment is a general PRACH enhancement that can apply to all UEs with or without MPE issues.

The method 1700, as illustrated in FIG. 17, describes an example procedure for configuration of SSB-specific values for the [baseline] PRACH preamble received target power (before application of any power ramping).

In step 1710, a UE (such as the UE 116) is provided a set of one or more SSBs for a random access procedure. In step 1720, the UE is configured a mapping among the set of one or more SSBs and a set of one or more PRACH preamble received target power values, before application of any power ramping. In step 1730, the UE determines an SSB associated with a random access procedure. In step 1740, the UE determines a PRACH preamble received target power value, corresponding to the determined SSB, based on the configured mapping. In step 1750, UE transmits a PRACH associated with the SSB with a transmission power based on the determined PRACH preamble received target power value.

Although FIG. 17 illustrates the method 1700 various changes may be made to FIG. 17. For example, while the method 1700 is shown as a series of steps, various steps could overlap, occur in parallel, occur in a different order, or occur multiple times. In another example, steps may be omitted or replaced by other steps. For example, steps of the method 1700 can be executed in a different order.

The following embodiments of the present disclosure, denoted as E-3-6, describe power control enhancements for other UL transmissions during random access procedure in presence of MPE.

Various power control enhancement methods described in the previous embodiments in the context of PRACH power control can also apply for MPE mitigation for other UL and SL signals and channels, including later UL transmission after PRACH until receiving dedicated higher layer configuration, and even after RRC connection. For example, maintaining multiple UE Tx beam-/panel-specific pathloss values for a same DL RS can be used for PUSCH/PUCCH/SRS in a similar manner. Also, application of power offset values to compensate for reduced RSRP of alternative beams without MPE issues can be used for PUSCH/PUCCH/SRS.

In one example, when the UE determines a second SSB to be associated with spatial transmission filter for a Msg3/A PUSCH, that is different from a first SSB that the UE used to obtain the MIB or used to determine a RO for a corresponding Msg1/A PRACH transmission, the UE determines a pathloss reference for the Msg3/A PUSCH to be the second SSB. Such behavior can be beneficial, for example, when MPE issues/events occur on a short time scale or when the UE has a moderate/high speed or mobility.

In one example, when a UE is configured with NZP CSI-RS resources for early CSI reporting or MPE reporting during initial/random access, the UE determines a pathloss reference for a Msg3/A PUSCH based on a NZP CSI-RS resource that the UE uses for reception of a RAR PDCCH or RAR PDSCH or for transmission of Msg3/A PUSCH.

In one example, a parameter $\Delta_{PREAMBLE\_Msg3}$ that is provided by msg3-DeltaPreamble, or a parameter $\Delta_{MsgA\_PUSCH}$ that is provided by msgA-DeltaPreamble, can be SSB-specific. Accordingly, the UE can be configured with multiple values for msg3-DeltaPreamble or msgA-DeltaPreamble corresponding to the multiple SSB indexes of a serving cell. Therefore, a first SSB is mapped to a first value for msg3-DeltaPreamble or msgA-DeltaPreamble and a second SSB index is mapped to a second value for msg3-DeltaPreamble or msgA-DeltaPreamble. If a UE determines the second SSB to be associated with a Msg3/A PUSCH transmission, for spatial relation or as a pathloss reference, that is separate from the first SSB that a UE used for RO association for PRACH transmission, the UE applies the second value for msg3-DeltaPreamble or msgA-DeltaPreamble, when determining a transmission power for the Msg3/A PUSCH. Similar behaviour can apply to a parameter for fractional pathloss compensation such as msg3-Alpha or msgA-Alpha.

Similar behavior and methods as described above for Msg3/A PUSCH can apply to a PUCCH that includes a HARQ-ACK feedback information in response to a Msg4/B PDSCH, or any later PUSCH or PUCCH that the UE transmits until receiving dedicated higher layer configuration.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a channel or signal, the method comprising:
   receiving first information for a set of downlink reference signals (DL RSs);
   identifying second information for first and second thresholds;
   determining a first spatial filter corresponding to a first DL RS from the set of DL RSs, wherein:
      a first reference signal received power (RSRP) for the first DL RS is larger than the first threshold, and
      a first exposure level corresponding to the first spatial filter is smaller than the second threshold; and
   transmitting the channel or signal using the first spatial filter, wherein:
      the channel is a physical random access channel (PRACH), a physical uplink shared channel (PUSCH), or a physical uplink control channel (PUCCH), or
      the signal is a sounding reference signal (SRS).

2. The method of claim 1, wherein the set of DL RSs includes one of:
   a synchronization signal and physical broadcast channel (SS/PBCH) block, or
   a non-zero-power channel state information reference signal (CSI-RS).

3. The method of claim 1, wherein:
   the first exposure level is a value, or a value range, for at least one of:
      a power management maximum power reduction (P-MPR), and
      an actual or virtual power headroom (PH) for the transmission of the PRACH, the PUSCH, or the PUCCH.

4. The method of claim 1, further comprising
   determining a second spatial filter corresponding to the first DL RS; and
   determining a second exposure level corresponding to the second spatial filter, wherein the second exposure level is different from the first exposure level.

5. The method of claim 1, wherein:
the first RSRP further corresponds to the first spatial filter,
the first RSRP is determined by applying an offset or a scaling to a second RSRP,
the second RSRP corresponds to the first DL RS,
the offset or the scaling is based on the first exposure level corresponding to the first spatial filter, and
the second threshold is infinity.

6. The method of claim 1, further comprising:
receiving third information for:
   first random access channel occasions (ROs) corresponding to the first DL RS,
   first sets of PRACH preambles corresponding to the first ROs, and
   a mapping among the first sets of PRACH preambles and subsets of the set of DL RSs; and
determining:
   a second DL RS from the set of DL RSs,
   a subset of DL RSs from the subsets of the set of DL RSs that includes the second DL RS, and
   a set of PRACH preambles from first sets of PRACH preambles that is mapped to the subset of DL RSs,
wherein transmitting the PRACH comprises transmitting the PRACH using a PRACH preamble from the set of PRACH preambles in an RO from the first ROs.

7. The method of claim 1, further comprising:
identifying third information for third and fourth thresholds; and
determining a carrier for the PRACH transmission to be a supplementary uplink (SUL) carrier when:
   the first RSRP is smaller than the third threshold, or
   the first exposure level is larger than the fourth threshold.

8. The method of claim 1, further comprising:
identifying third information for third and fourth thresholds; and
determining a random access procedure associated with the PRACH transmission and the PUSCH transmission to be a Type-2 RA procedure comprising the PRACH transmission and the PUSCH transmission prior to a random access response (RAR) reception when:
   the first RSRP is larger than the third threshold, and
   the first exposure level is smaller than the fourth threshold.

9. A user equipment (UE) comprising:
a transceiver configured to receive first information for a set of downlink reference signals (DL RSs); and
a processor operably coupled to the transceiver, the processor configured to:
   identify second information for first and second thresholds;
   determine a first spatial filter corresponding to a first DL RS from the set of DL RSs, wherein:
     a first reference signal received power (RSRP) for the first DL RS is larger than the first threshold, and
     a first exposure level corresponding to the first spatial filter is smaller than the second threshold,
wherein the transceiver is further configured to transmit a channel or signal using the first spatial filter, and wherein:
   the channel is a physical random access channel (PRACH), a physical uplink shared channel (PUSCH), or a physical uplink control channel (PUCCH), or
   the signal is a sounding reference signal (SRS).

10. The UE of claim 9, wherein the set of DL RSs includes one of:
a synchronization signal and physical broadcast channel (SS/PBCH) block, or
a non-zero-power channel state information reference signal (CSI-RS).

11. The UE of claim 9, wherein:
the first exposure level is a value, or a value range, for at least one of:
   a power management maximum power reduction (P-MPR), and
   an actual or virtual power headroom (PH) for the transmission of the PRACH, the PUSCH, or the PUCCH.

12. The UE of claim 9, wherein the processor is further configured to:
determine a second spatial filter corresponding to the first DL RS; and
determine a second exposure level corresponding to the second spatial filter, wherein the second exposure level is different from the first exposure level.

13. The UE of claim 9, wherein
the first RSRP further corresponds to the first spatial filter,
the first RSRP is determined by applying an offset or a scaling to a second RSRP,
the second RSRP corresponds to the first DL RS,
the offset or the scaling is based on the first exposure level corresponding to the first spatial filter, and
the second threshold is infinity.

14. The UE of claim 9, wherein:
the transceiver is further configured to receive third information for:
   first random access channel occasions (ROs) corresponding to the first DL RS,
   first sets of PRACH preambles corresponding to the first ROs, and
   a mapping among the first sets of PRACH preambles and subsets of the set of DL RSs;
the processor is further configured to determine:
   a second DL RS from the set of DL RSs,
   a subset of DL RSs from the subsets of the set of DL RSs that includes the second DL RS, and
   a set of PRACH preambles from first sets of PRACH preambles that is mapped to the subset of DL RSs; and
the transceiver is further configured to transmit the PRACH using a PRACH preamble from the set of PRACH preambles in an RO from the first ROs.

15. The UE of claim 9, wherein the processor is further configured to:
identify third information for third and fourth thresholds; and
determine a carrier for the PRACH transmission to be a supplementary uplink (SUL) carrier when:
   the first RSRP is smaller than the third threshold, or
   the first exposure level is larger than the fourth threshold.

16. The UE of claim 9, wherein the processor is further configured to:
identify third information for third and fourth thresholds; and
determine a random access procedure associated with the PRACH transmission and the PUSCH transmission to be a Type-2 RA procedure comprising the PRACH transmission and the PUSCH transmission prior to a random access response (RAR) reception when:
the first RSRP is larger than the third threshold, and
the first exposure level is smaller than the fourth threshold.

17. A base station comprising:
a processor; and
a transceiver operably coupled with the processor, the transceiver configured to:
transmit first information for a set of downlink reference signals (DL RSs),
transmit second information for first and second thresholds, and
receive a channel or signal,
wherein the channel or signal is transmitted using a first spatial filter corresponding to a first DL RS from the set of DL RSs,
wherein a first reference signal received power (RSRP) for the first DL RS is larger than the first threshold,
wherein a first exposure level corresponding to the first spatial filter is smaller than the second threshold, and
wherein:
the channel is a physical random access channel (PRACH), a physical uplink shared channel (PUSCH), or a physical uplink control channel (PUCCH), or
the signal is a sounding reference signal (SRS).

18. The base station of claim 17, wherein the set of DL RSs includes one of:
a synchronization signal and physical broadcast channel (SS/PBCH) block, or
a non-zero-power channel state information reference signal (CSI-RS).

19. The method of claim 4, further comprising:
determining a second RSRP for the first DL RS, wherein:
the first RSRP for the first DL RS is associated with the first spatial filter,
the second RSRP for the first DL RS is associated with the second spatial filter, and
the second RSRP is different from the first RSRP.

20. The UE of claim 12, wherein:
the processor is further configured to determine a second RSRP for the first DL RS,
the first RSRP for the first DL RS is associated with the first spatial filter,
the second RSRP for the first DL RS is associated with the second spatial filter, and
the second RSRP is different from the first RSRP.

* * * * *